(12) United States Patent
Endo et al.

(10) Patent No.: US 9,058,098 B2
(45) Date of Patent: Jun. 16, 2015

(54) DISPLAY CONTROL DEVICE

(75) Inventors: Kosuke Endo, Tokyo (JP); Takamoto Tsuda, Kanagawa (JP); Yutaka Shiba, Tokyo (JP)

(73) Assignees: Sony Corporation, Tokyo (JP); Sony Mobile Communications AB, Lund (SE)

(*) Notice: Subject to any disclaimer, the term of this patent is extended or adjusted under 35 U.S.C. 154(b) by 607 days.

(21) Appl. No.: 13/354,858

(22) Filed: Jan. 20, 2012

(65) Prior Publication Data

US 2012/0206481 A1    Aug. 16, 2012

Related U.S. Application Data

(60) Provisional application No. 61/442,514, filed on Feb. 14, 2011.

(51) Int. Cl.
  *G09G 5/00* (2006.01)
  *G06F 3/033* (2013.01)
  *G06F 3/0485* (2013.01)
  *G06F 3/0481* (2013.01)
  *G06F 3/0482* (2013.01)
  *G06F 3/0484* (2013.01)
  *G06F 3/0488* (2013.01)
  *G06F 17/30* (2006.01)

(52) U.S. Cl.
  CPC ............ *G06F 3/0485* (2013.01); *G06F 3/0481* (2013.01); *G06F 3/0482* (2013.01); *G06F 3/04847* (2013.01); *G06F 3/0488* (2013.01); *G06F 17/30064* (2013.01); *G06F 17/30274* (2013.01); *G06F 2203/04806* (2013.01)

(58) Field of Classification Search
  CPC .............. G06F 3/0481; G06F 3/04847; G06F 17/30064; G06F 17/30244; G06F 17/30274
  USPC .......................................... 345/619; 715/785
  See application file for complete search history.

(56) References Cited

U.S. PATENT DOCUMENTS

2010/0110228 A1    5/2010   Ozawa et al.
2010/0169813 A1*   7/2010   Chang ........................... 715/767

(Continued)

FOREIGN PATENT DOCUMENTS

CN         1702605 A      11/2005
CN         1877508 A      12/2006

(Continued)

OTHER PUBLICATIONS

U.S. Appl. No. 13/274,596, filed Oct. 17, 2011, Endo, et al.

(Continued)

*Primary Examiner* — Jason M Repko
*Assistant Examiner* — Scott E Sonners
(74) *Attorney, Agent, or Firm* — Oblon, McClelland, Maier & Neustadt, L.L.P.

(57) ABSTRACT

An information processing apparatus including an interface that receives a display switching instruction to switch an object displayed on a display, and a processor that controls the display to switch objects displayed on the display based on the display switching instruction, controls the display to stop switching objects for a predetermined period of time when a predetermined object is displayed on the display, and controls the display to resume switching objects displayed on the display upon determining that the predetermined period of time has elapsed.

18 Claims, 43 Drawing Sheets

(56) References Cited

U.S. PATENT DOCUMENTS

2010/0277496 A1* 11/2010 Kawanishi et al. ........... 345/589
2011/0239149 A1*  9/2011 Lazo et al. .................... 715/772
2011/0317192 A1   12/2011 Fukuoka et al.

FOREIGN PATENT DOCUMENTS

| JP | 2001-249653    | 9/2001  |
| JP | 2007-304862 A  | 11/2007 |
| JP | 2010-109788    | 5/2010  |

OTHER PUBLICATIONS

Extended European Search Report issued Jul. 4, 2012, in European Patent Application No. 12154549.5.

Combined Chinese Office Action and Search Report issued Jan. 14, 2014 in Patent Application No. 201210032498.0 (with English language translation).

\* cited by examiner

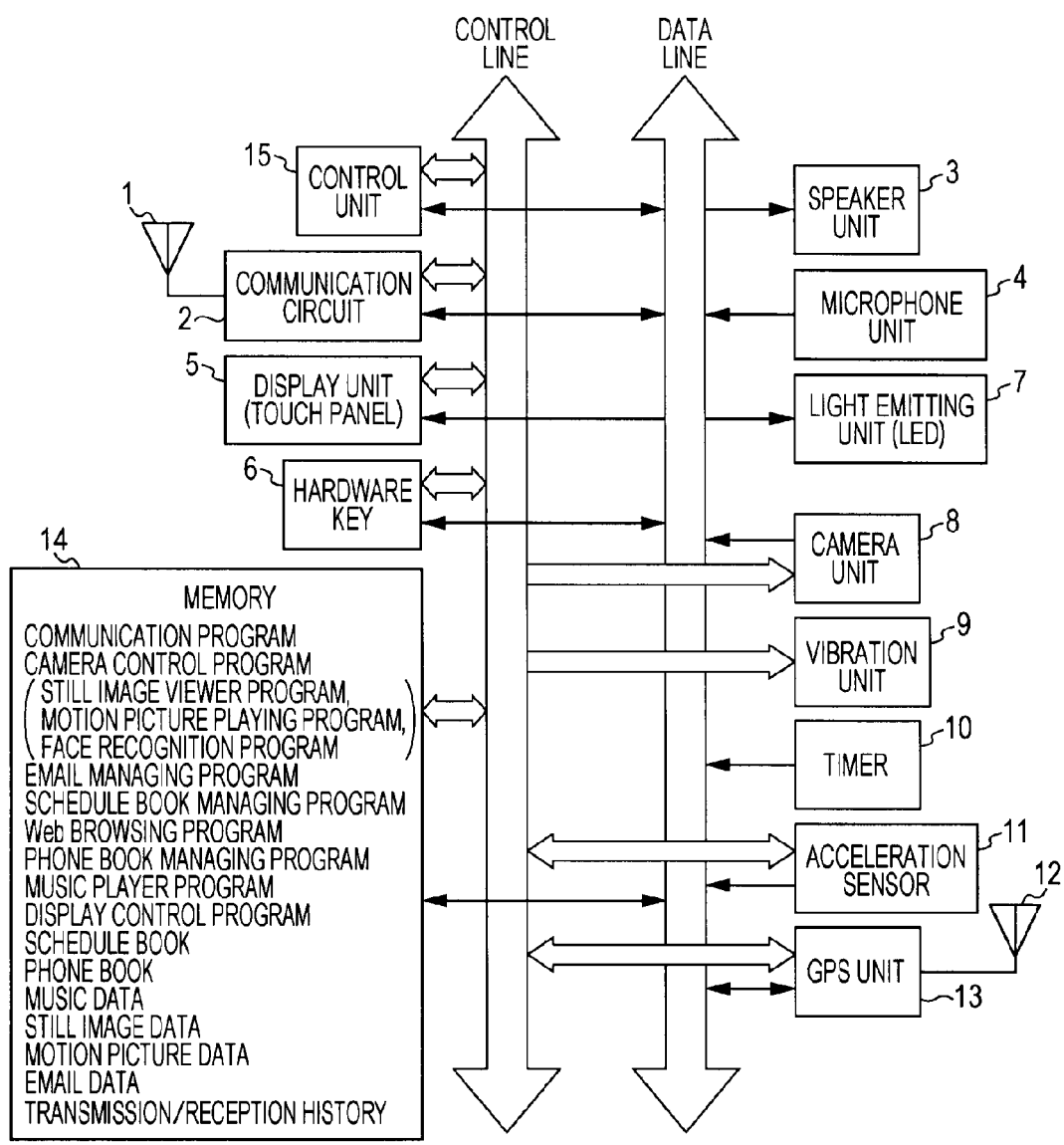

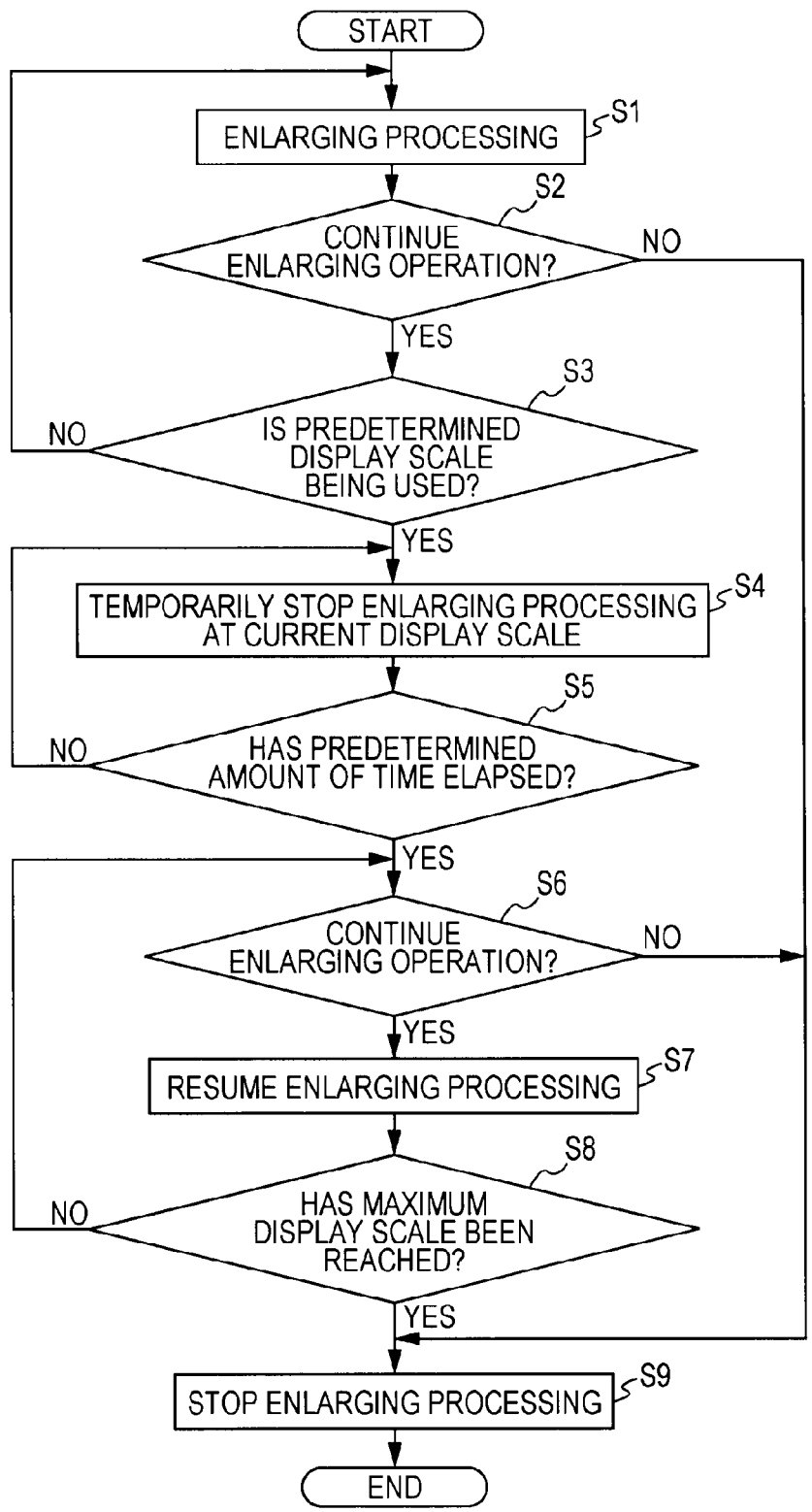

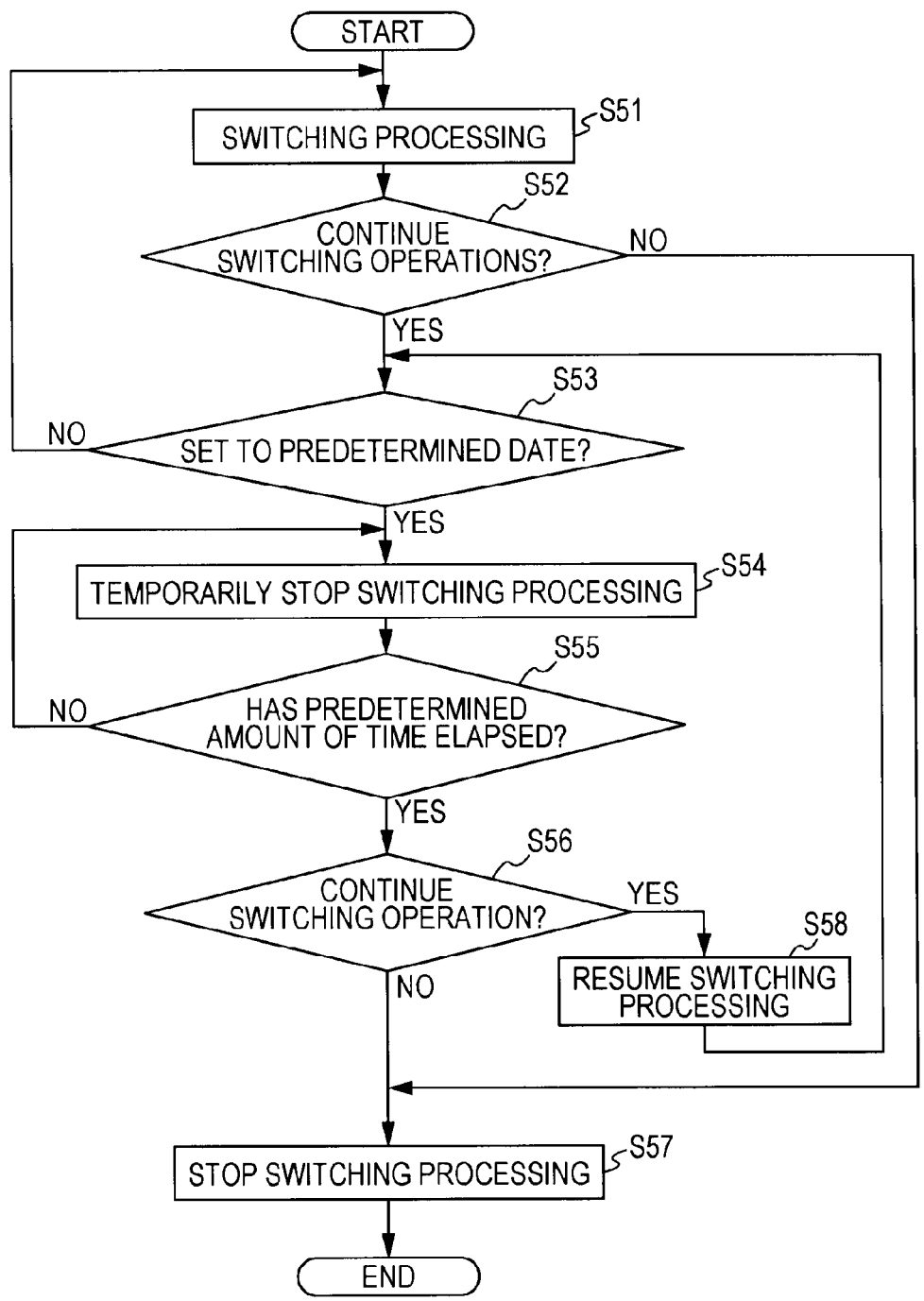

FIG. 32A   FIG. 32B
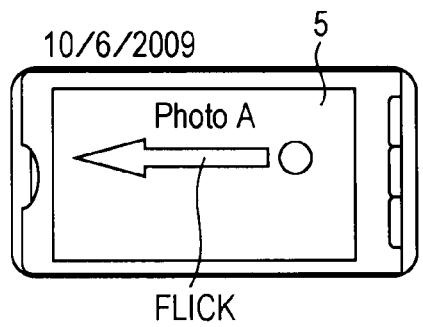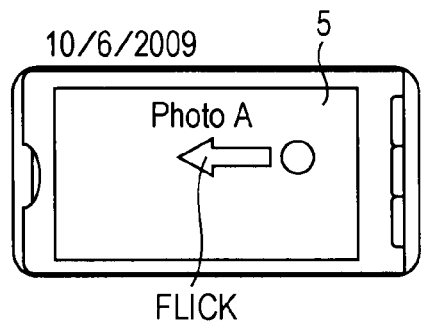
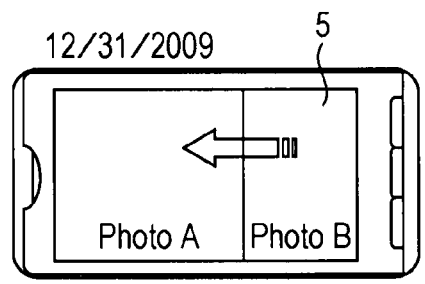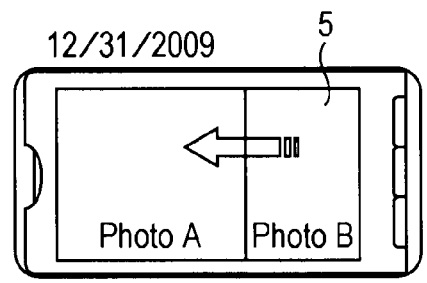
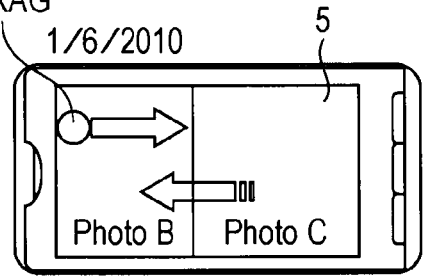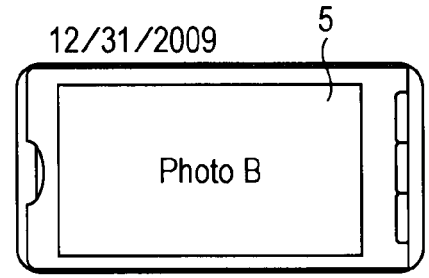

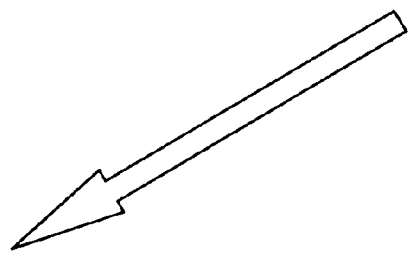

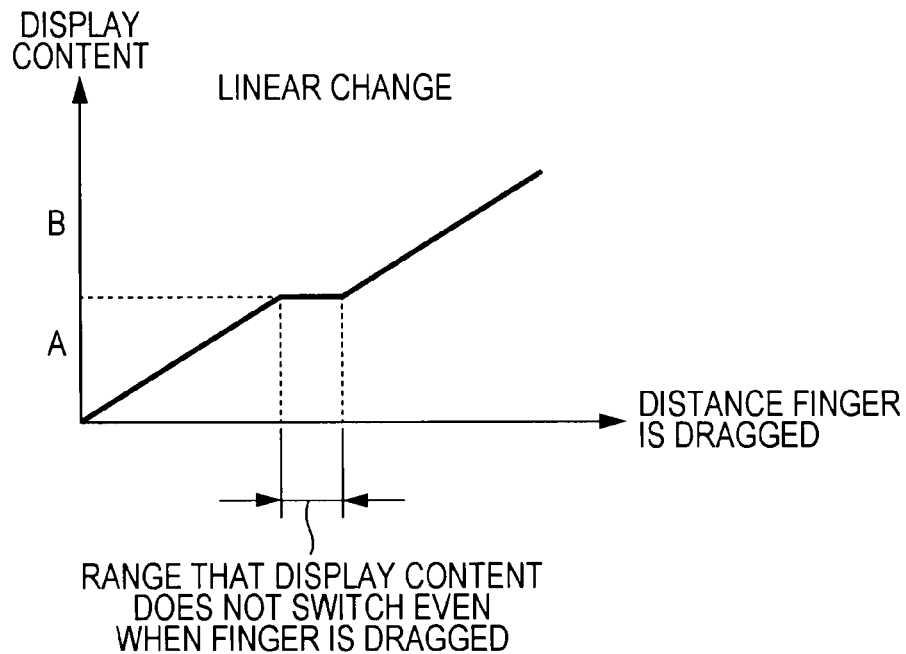
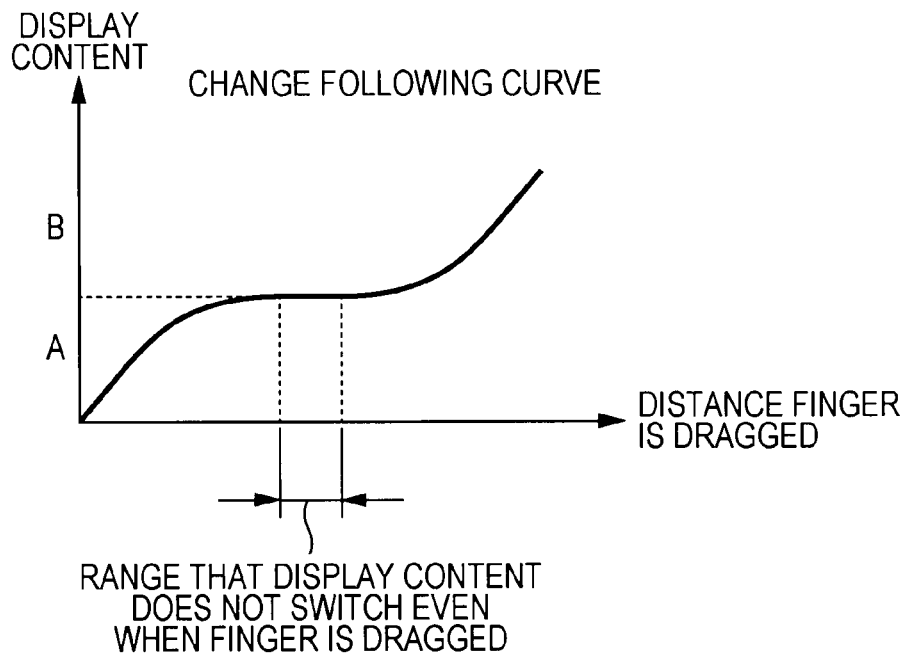

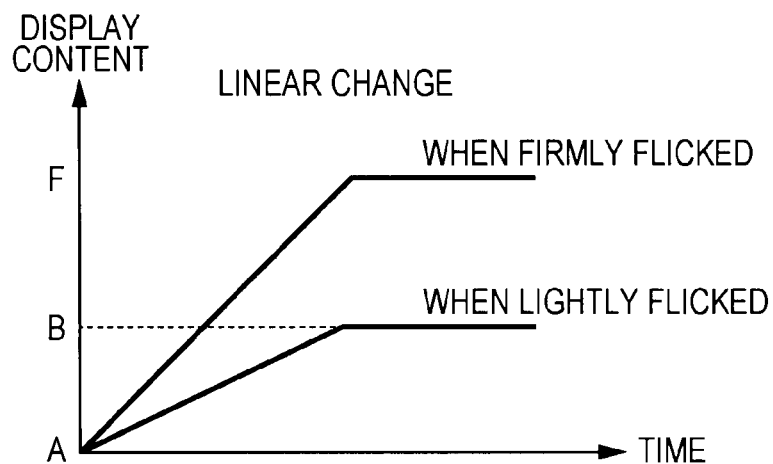
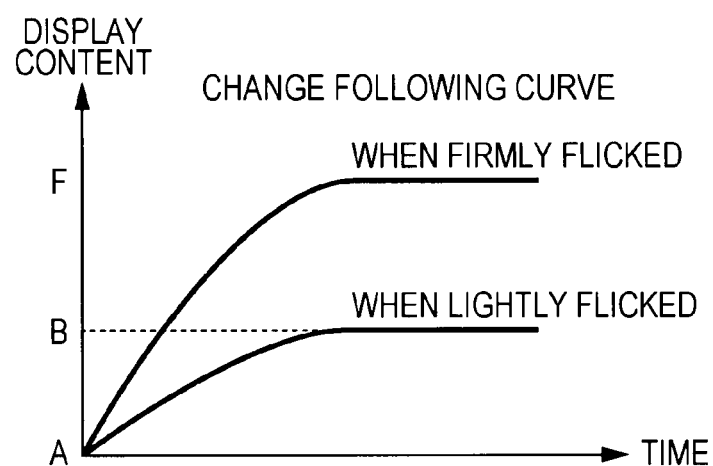

FIG. 42A    FIG. 42B    FIG. 42C
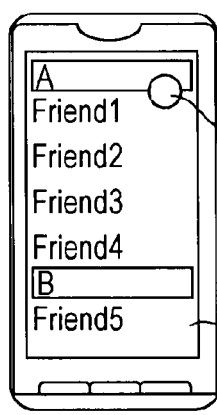 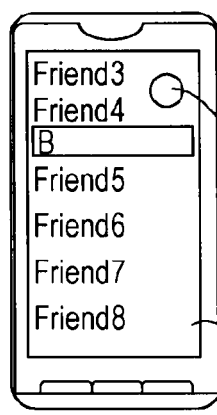 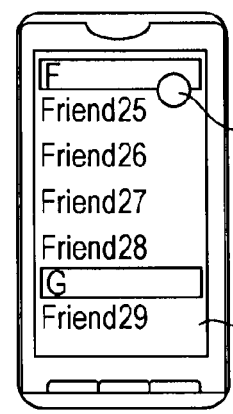
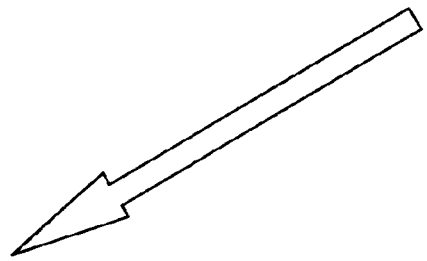
FIG. 42D    FIG. 42E
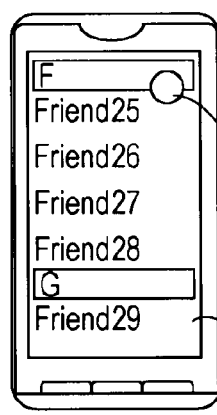 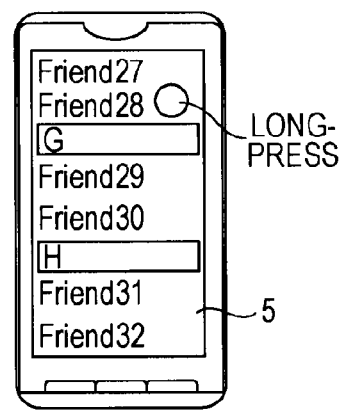

DISPLAY CONTROL DEVICE

CROSS REFERENCE TO RELATED APPLICATION

The present application claims the benefit of the earlier filing date of U.S. Provisional Patent Application Ser. No. 61/442,514 filed on Feb. 14, 2011, the entire contents of which is incorporated herein by reference.

BACKGROUND OF THE DISCLOSURE

1. Field of the Disclosure

The present disclosure relates to a display control device favorably applied to electronic equipment such as a cellular phone, PHS telephone (PHS: Personal Handyphone System), PDA device (PDA: Personal Digital Assistant), digital camera device, digital video camera device, portable gaming device, notebook-type or desktop-type personal computer device, or the like, for example.

More particularly, the present disclosure relates to a display control device by which searching for desired still images, data, or the like, is facilitated, in the event that display switching operations of still images or scrolling operations of data registered in a phone book are being performed, by temporarily stopping display switching control or scrolling control at sectioning at the year of photography, at sectioning at capital letters, or at sectioning at affiliated groups or the like, for example.

2. Description of Related Art

With the image processing device disclosed in Japanese Unexamined Patent Application Publication No. 2010-109788 (PTL 1), upon a control unit detecting that an operating face having multiple operating areas of a touch panel has been subjected to dragging operations, based on detection results (coordinate) data of contact positions from the touch panel, the display of images displayed on a display screen of a display unit is switched.

Accordingly, intended image data can be speedily searched for from a great amount of image data accumulated in memory, without performing troublesome and complicated operations.

Now, in the event of searching for desired data from a great amount of data, switching operations and scrolling operations of the data are performed, and the switching operations and scrolling operations are stopped at a desired timing. Confirmation is then made regarding whether or not the currently displayed data is the desired data, and in the event that the currently displayed data is not the desired data, the switching operations and scrolling operations of the data are performed again. Such operates are repeatedly performed in the case of searching for desired data.

However, in the event of searching for desired data from a great amount of data, an operating error in the switching operations and scrolling operations of the data results in the desired data not being displayed and the switching operations and scrolling operations being performed repeatedly. Accordingly, there has been the problem that speedily searching for desired data is difficult.

SUMMARY OF THE DISCLOSURE

The present inventors recognize the necessity to provide a display control device which can maximally prevent erroneous operations in switching operations and scrolling operations, such that desired data can be speedily searched from a great amount of data.

According to a first embodiment, the disclosure is directed to an information processing apparatus that includes an interface that receives a display switching instruction to switch an object displayed on a display; and a processor that controls the display to switch objects displayed on the display based on the display switching instruction, controls the display to stop switching objects for a predetermined period of time when a predetermined object is displayed on the display, and controls the display to resume switching objects displayed on the display upon determining that the predetermined period of time has elapsed.

According to another exemplary embodiment, the disclosure is directed to a method performed by an information processing apparatus, the method including receiving, at an interface of the information processing apparatus, a display switching instruction to switch an object displayed on a display; and controlling, by a processor of the information processing apparatus, the display to switch objects displayed on the display based on the display switching instruction, to stop switching objects for a predetermined period of time when a predetermined object is displayed on the display, and to resume switching objects displayed on the display upon determining that the predetermined period of time has elapsed.

According to another exemplary embodiment, the disclosure is directed to a non-transitory computer-readable medium including computer-program instructions, which when executed by an information processing apparatus, cause the information processing apparatus to perform a method that includes receiving a display switching instruction to switch an object displayed on a display; and controlling the display to switch objects displayed on the display based on the display switching instruction, to stop switching objects for a predetermined period of time when a predetermined object is displayed on the display, and to resume switching objects displayed on the display upon determining that the predetermined period of time has elapsed.

Thus, display switching control and scrolling control can be stopped for a predetermined amount of time at a group boundary where sectioning is convenient, such as by the date of photography, folders where stored, number of images, and so forth, for example. Accordingly, desired objects can be speedily searched from a great number of objects.

According to an embodiment of the present disclosure, display switching control or scrolling display control of objects can be temporarily stopped when an object serving as a predetermined sectioning is displayed on the display unit, so desired objects can be speedily searched from a great number of objects.

BRIEF DESCRIPTION OF THE DRAWINGS

FIG. 1 is a block diagram of a cellular phone according to an embodiment to which the present disclosure is applied.

FIG. 2 is a flowchart to describe enlarging processing operations of a cellular phone according to an embodiment.

FIG. 29 is a flowchart to describe display switching processing of still images on a cellular phone according to an embodiment.

FIG. 32 is a schematic diagram to describe display switching operations of still images corresponding to a flicking operation of a cellular phone according to an embodiment.

FIG. 39 is a diagram to describe the relation between the dragging operation and the phone book scrolling control on a cellular phone according to an embodiment.

FIG. 41 is a diagram to describe the relation between the flicking operation and the phone book scrolling control on a cellular phone according to an embodiment.

FIG. 42 is a schematic diagram to describe the phone book scrolling control corresponding to the long-pressing operation of a cellular phone according to an embodiment.

DETAILED DESCRIPTION

Figure 3A:
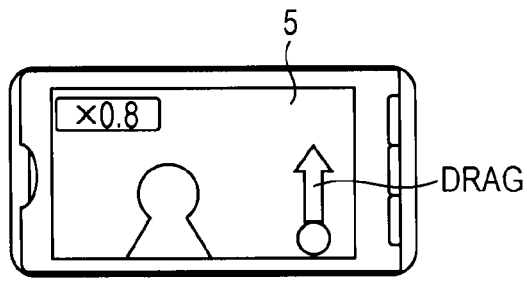
FIG. 3 is a schematic view to describe enlarging processing operations of a still image corresponding to a dragging operation of a cellular phone according to an embodiment.

The present disclosure can be applied to a cellular phone, as an example.

FIG. 1 is a block diagram of a cellular phone according to an embodiment of the present disclosure. As shown in FIG. 1, the cellular phone according to an embodiment has an antenna 1 and communication circuit 2 to perform wireless communication with a base station such as voice calls, television phone calls, email, Web data (Web: World Wide Web), and the like.

Also, the cellular phone herein has a speaker unit 3 for call audio to obtain audio output such as received call audio, a microphone unit 4 to collect the sending audio or the like, and a display unit 5 that is a so-called touch panel to perform contact operations.

Also, the cellular phone herein has multiple hardware keys 6 that are physically provided as to a casing of the cellular phone.

Also, the cellular phone has a light emitting unit 7 to notify the user with light of calls transmitted/received (LED: Light Emitting Diode), a camera unit 8 to shoot a still image or moving image of a desired subject, a vibration unit 9 to vibrate the casing of the cellular phone and notify the user of calls transmitted/received, and a timer 10 to count the current point-in-time.

Also, the cellular phone has an acceleration sensor 11 to detect a vibration operation or the like applied to the casing of the cellular phone, a GPS antenna 12 (GPS: Global Positioning System) to detect the current position of the cellular phone or the shooting position of the still image or moving image shot with the camera unit, and a GPS unit 13.

Also, the cellular phone herein has a communication program to perform wireless communication processing via the base station and various types of applications, as well as a memory 14 wherein various types of data handled by these various types of application programs are stored and a control unit 15 to control the operations over the overall cellular phone.

The memory 14 has the communication program mentioned above, as well as a camera control program to perform shooting control of the camera unit 7, stored therein. The camera control program has a viewer program to display the still images that have been shot on the display unit 5 or the like. The viewer program has functions for enlarging processing and reduction processing of display images to change the display scale, face recognition functions to detect the facial image of a subject (human) in a still image.

Also, the camera control program has a moving picture playing program to display the shot moving image on the display unit 5 or the like. Also, the moving picture playing program has a playing speed changing function to control and change the playing speed of the moving picture.

Also, an email managing program to control the creation and transmission/reception of emails and a schedule book managing program to perform management of a schedule book wherein the user schedule is registered are stored in the memory 14.

Also, a Web browsing program to perform browsing or the like of Web pages by accessing a server device provided on a predetermined network such as a communication network or the Internet or the like to perform transmission/reception of information, a phone book managing program to perform managing of the phone book, and a music player program to perform music data playing, are stored in the memory 14.

Also, the memory 14 has a schedule book wherein the desired schedule of the user is registered (registration region of schedule data), and a phone book (registration region of personal information for each user) wherein user names of acquaintances, friends, and the like of the user, still images (facial photographs and the like), addresses, phone numbers, email addresses, birth dates, and so forth are registered.

Also, music data that is played based on a music player program, still image data and moving picture data that is played based on the viewer program and moving picture playing program of the camera control program, email data that is transmitted/received, and phone call and email transmission/reception history and so forth are stored in the memory 14.

Note that the camera control program, email managing program, schedule book managing program, Web browsing program, and music player program and the like may be provided as various programs to the cellular phone by installing the memory 14 wherein these various programs are stored therein beforehand.

Alternatively, the various programs may be provided to the cellular phone by storing the various programs downloaded via a network in the memory 14.

Alternatively, the various programs may be provided to the cellular phone by storing the various programs read in from an external memory in the memory 14.

The cellular phone according to an embodiment can, in the event of performing enlarging operations of a still image, easily perform enlarging operations of still images to an enlargement scale having a high probability of being desired by the operator.

FIG. 2 is a flowchart showing the flow of enlarging processing of a still image with the control unit 15 of the cellular phone. The control unit 15, upon the operator performing display specifying operations, performs display control of the still image specified by the operation to display of the display unit 5, based on the viewer program of the camera control program stored in the memory 14. The control unit 15 monitors whether or not there has been any enlarging processing operations of the still image at a timing wherein the still image is controlled to display on the display unit 5, and upon detecting enlarging processing operations, the processing shown in the flowchart in FIG. 2 is started, based on the viewer program of the camera control program.

Specifically, in the case of the cellular phone according to the present embodiment, of the examples of "dragging operations", "flicking operations", and "long-pressing operations", by performing one of these operations, the still image displayed on the display unit 5 can be subjected to enlarging operations.

The dragging operation is an operation wherein the operator touches the display unit 5 with a finger, and slides this touched finger in the upper direction while in the state of touching the display unit 5. The control unit 15 detects the distance between the position wherein the finger of the operator is touching the display unit 5 which serves as a touch panel and the position wherein the finger that has been sliding is removed from the display unit 5 at the touching position (the distance of the series of dragging operations), and subjects the still image displayed on the display unit 5 to enlarging operation according to the dragging operation distance and displays this.

Also, the flicking operation is an operation wherein the operator touches the display unit 5 with a finger, and flicks this touched finger in the upper direction while in the state of touching the display unit 5. The control unit 15 detects the distance between the position wherein the finger of the operator is touching the display unit 5 which serves as a touch panel and the position wherein the finger that is flicking is removed from the display unit 5 at the touching position (the distance of the series of flicking operations), and subjects the still image displayed on the display unit 5 to enlarging operation according to the flicking operation distance and displays this.

Also, the long-pressing operation is an operation wherein the operator lightly continues to press the display unit 5 with a finger. The control unit 15 detects the time from when the finger of the operator touches the display unit 5 serving until the finger is released (the time of the series of long-pressing), and displays the still image displayed on the display unit 5 by enlarging processing according to the long-pressing operation time.

Note that in this example, in the event of performing enlarging operations of a still image, the descriptions are of performing "dragging operations", "flicking operation", or "long-pressing operations", but instead of these operations, enlarging operations of the still image may be performed with other operations such as a pinching operation or with a hardware key 6 provided on the casing.

Note that the pinching operation is a operation wherein the thumb and index finger in a state of contact with one another each touch the touch panel, maintain the state of each finger touching the touch panel, and the thumb and index finger that are in contact with one another are gradually separated. In this case, the control unit 15 performs enlarging processing of still images according to the distance between the thumb and index finger that are separated while in the state of being in contact with the touch panel.

Upon such an enlarging operation being performed by the operator, in step S1 the control unit 15 subjects the still image displayed on the display unit 5 to enlarging operations according to the enlarging operation described above, and advances the processing to step S2.

The control unit 15 performs the enlarging processing of the still image according to the series of dragging operations or long-pressing operations as described above. That is to say, the control unit 15 performs the enlarging processing of the still image according to continuous dragging operations or long-pressing operations from the time that the finger of the operator makes contact with the display unit 5 until the finger is released. Therefore, the control unit 15 determines whether or not the enlarging operation is being continuously performed, by detecting in step 2 whether or not there is contact by a user finger as to the display unit 5. In the case determination is made that the enlarging operation is being continuously performed, the control unit 15 advances the processing to step S3.

Conversely, in the case determination is made that the enlarging operation is not being continuously performed, (i.e. in the case determination is made that the operator finger has been released from the display unit 5), the control unit 15 advances the processing to step S9, the enlarging processing of the still image is stopped, and the processing shown in the flowchart in FIG. 2 is ended.

Next, upon advancing the processing to step S3 by determining that the enlarging operation is ongoing, the control unit 15 determines whether or not the still image is at a predetermined display scale from the enlarging processing of the still image displayed on the display unit 5. In the case determination is made that the still image is not at a predetermined display scale, the control unit 15 returns the processing to step S1, and continues to perform enlarging processing of the still image.

Conversely, in the case determination is made that the still image displayed on the display unit 5 is at a predetermined display scale, the processing is advanced to step S4, temporarily stops the enlarging processing of the still image at the current display scale, and advances the predetermined to step S5.

In step S5, based on the point-in-time information obtained from the timer 10, the control unit 15 determines whether or not a predetermined amount of time such as 200 msec or 300 msec has elapsed from the time that the enlarging processing of the still image has stopped, and the processing is advanced to step S6 at a timing that the predetermined amount of time has elapsed.

In step S6, the control unit 15 determines whether or not enlarging operations are being continuously performed, by detecting whether or not the finger of the operator is in contact with the display unit 5. In the event of determining that the enlarging operations are not continuing, the control unit 15 advances the processing to step S7.

Conversely, in the case determination is made in step S6 that the enlarging operations are not continuing (i.e. in the case determination is made that the finger of the operator has been released from the display unit 5), the control unit 15 advances the processing to step S9, temporarily stops the enlarging processing of the still image, and ends the processing shown in the flowchart in FIG. 2.

Upon advancing the processing to step S7 by determining that the enlarging operation is being continuously performed, the control unit 15 resumes the enlarging processing of the still image according to the enlarging operations by the operator, and advances the processing to step S8.

In step S8, the control unit 15 determines whether or not the display scale of the still image subjected to enlarging processing is at a maximum display scale. In the case determination is made that the display scale of the still image subjected to enlarging processing is not at the maximum display scale, the control unit 15 performs enlarging processing of the still image during the time that the enlarging operation by the operator is continuously executed and the display scale of the still image is at the maximum display scale. Also, the control unit 15 advances the processing to step S9 at a timing that the display scale of the still image subjected to enlarging processing reaches the maximum display scale, or at a timing that the series of enlarging operations by the operator has ended, and the control unit 15 stops the enlarging processing and ends the processing shown in the flowchart in FIG. 2.

The enlarging processing of the cellular phone will be described below using specific examples.

FIG. 3 is a diagram showing a situation wherein the still image displayed on the display unit 5 is subjected to enlarging processing according to a dragging operation and displayed. FIG. 4(*a*) is a diagram showing the correlation between the distance of the dragging operation and the enlargement scale of the still image.

As can be seen from FIG. 4(*a*), in the case of the cellular phone, when the enlargement scale (display scale) of the still image is 1.0 times, regardless of whether a dragging operation is being performed by an operator, the enlarging processing of the still image is stopped for 200 msec for example, and at a timing that the 200 msec have elapsed, the enlarging processing of the still image corresponding to the dragging operation of the operator is performed again.

That is to say, the enlargement scale of 1.0 of the still image means the original image size of the still image thereof (i.e. the size at the time the still image was shot, without change). If the still image is enlarged more than the 1.0 times, the image quality becomes coarse. Therefore, the operator tends to temporarily stop the enlarging operation at the original size of the still image. This means that many operators desire an enlarging operation of an enlargement scale of 1.0 times.

Figure 3B:
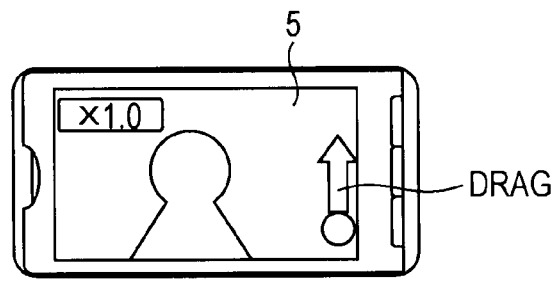
Figure 3C:
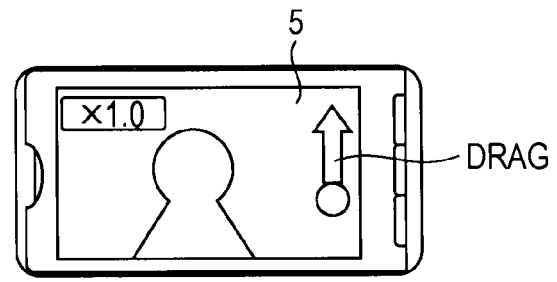
Figure 3D:
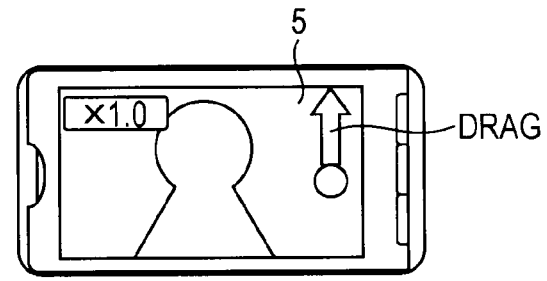

Therefore, with the cellular phone according to the present embodiment, for example as shown in FIG. 3(*a*), the control unit 15 first displays the still image on the display unit 5 at an enlargement scale of 0.8 times, performs enlargement processing of the still image according to the dragging operation, and when the enlargement scale of the still image reaches an enlargement scale of 1.0 times, stops the enlargement processing of the still image for a predetermined amount of time such as 200 msec or the like, regardless of the dragging operation being performed as shown in FIG. 3(b) and FIG. 3(c). The control unit 15 then resumes the enlarging processing of the still image as shown in FIG. 3(d), corresponding to the dragging operations of the operator, after the predetermined amount of time having elapsed.

Thus, even if the dragging operation is continuously performed, the enlargement scale of the still image is controlled so as to temporarily be stopped at an enlargement scale of 1.0 times, the operator can easily subject the still image to display operations at an enlargement scale of 1.0 times. In other words, a still image having an enlargement scale of 1.0 times, which has a great probability of being the desired scale of the operator, can be easily displayed.

Figure 4A:
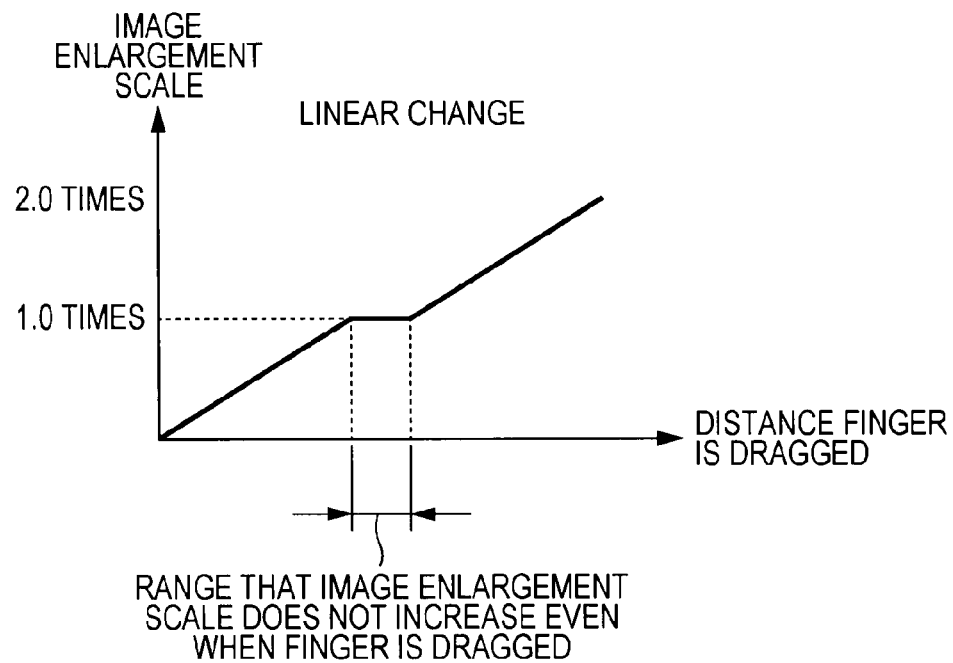
FIG. 4 is a diagram to describe the correlation between the dragging operation distance and enlargement scale of a cellular phone according to an embodiment.

With the example shown in FIG. 4(a), the enlargement scale of the still image is linearly increased according to the dragging operation of the operator, and in the event of reaching the enlargement scale of 1.0 times, the enlargement processing is stopped for a predetermined amount of time such as 200 msec as mentioned above, and after the predetermined amount of time has elapsed, the enlargement scale of the still image is again linearly increased according to the dragging operations by the operator.

Figure 4B:
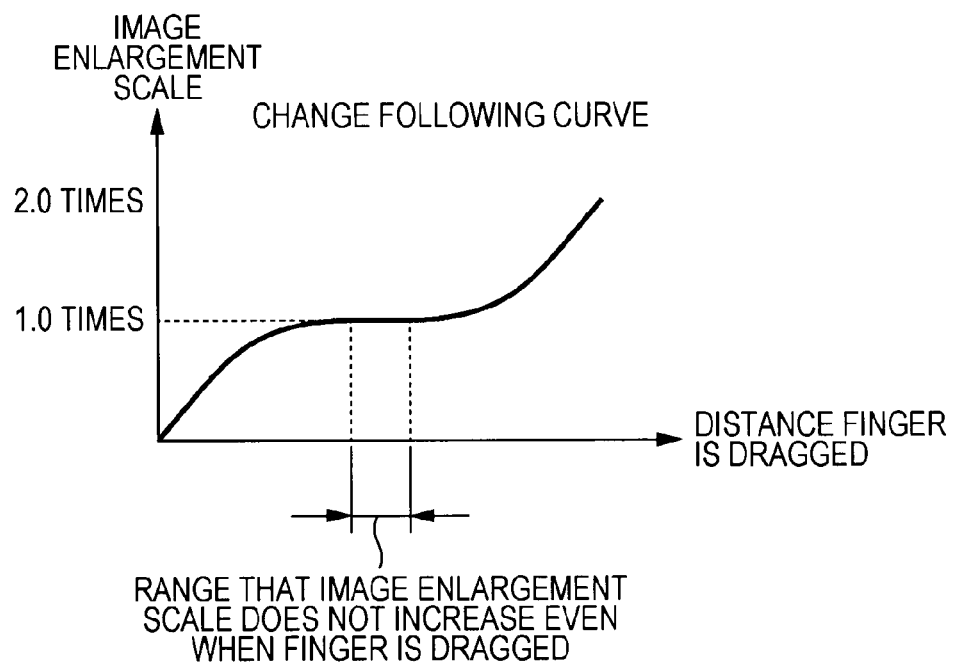

The enlargement scale of the still image is increased according to the dragging operations of the operator as shown in FIG. 4(b), and when the enlargement scale nears 1.0 times, the width of the enlargement processing is gradually reduced, whereby the enlargement scale reaches 1.0 times following a curve, and in the event of reaching the enlargement scale of 1.0 times, the enlargement processing is stopped for a predetermined amount of time such as 200 msec as shown above. After the predetermined amount of time has elapsed, the enlargement scale of the still image may be increased again following a curve according to the dragging operation by the operator.

In this case, when the enlargement scale of the still image subjected to enlargement operations nears an enlargement scale of 1.0 times, the enlargement width of the still image becomes smaller and the still image reaches an enlargement scale of 1.0 times as mentioned above, and during the predetermined amount of time such as the 200 msec mentioned above, the enlarging processing is stopped. Therefore, as the enlargement scale of the still image nears the enlargement scale of 1.0 times, the enlargement width gradually becomes smaller, and the enlargement processing eventually stops. Also, in the event that the enlargement processing is resumed after a predetermined amount of time having elapsed, the enlargement width gradually is increased, and eventually the enlargement processing of the still image is performed linearly according to the dragging operations. Therefore, an enlarging processing with natural changes can be shown to the user.

Note that in the examples shown in FIG. 3(a) through FIG. 3(d) and FIG. 4(a) and FIG. 4(b), the enlargement processing is controlled to stop for a predetermined amount of time in the event that the enlargement scale reaches 1.0 times, but the enlargement scale at which to stop the enlargement processing may be optionally set by the operator or the cellular phone maker, to be other than 1.0 times.

Also, with the example shown in FIG. 3(a) through FIG. 3(d) and FIG. 4(a) and FIG. 4(b), the enlargement processing is controlled to stop for a predetermined amount of time in the event that the enlargement scale reaches 1.0 times, but the enlargement processing may be stopped for a predetermined amount of time when the enlargement scale reaches 1.0 times and when the enlargement scale reaches 2.0 times, respectively. In other words, the enlargement processing may be controlled to be stopped multiple times at desired timings of the enlargement scale, not only limited to once in the event that the enlargement scale reaches 1.0 times.

Further, the example as described above is an example in the case of enlargement operations of a still image, but performing reduction operations of a still image will be similar to that described above. That is to say, in the case that dragging operations to specify reduction processing in the event that a still image having a display scale of 2.0 times is displayed, the control unit 15 subjects the still image to gradual reduction according to the dragging operation, and in the event that the display scale of the still image reaches a display scale of 1.0 times, the reduction operation by the operator is cancelled for a predetermined amount of time such as 200 msec or the like for example, and the reduction processing is stopped during the predetermined amount of time. The reduction operation of the still image according to dragging operation by the operator is resumed at a timing when the predetermined amount of time has elapsed.

Thus, even if continuous dragging operations are performed, the reduction scale of the still image can be controlled to be temporarily stopped at a reduction scale of 1.0 times, for example, whereby the operator can easily operate to display the still image having a reduction scale of 1.0 times. In other words, the still image having a display scale of 1.0 times which has a high probability of being desired by the operator can be easily displayed, and also advantages similar to the above descriptions can be obtained.

Next, FIG. 5 is a diagram showing a situation wherein the still image displayed on the display unit 5 is subjected to enlarging processing according to the flicking operations and displayed. Also, FIG. 6(a) shows the correlation between the strength of the flicking operation and the enlargement scale of the still image.

Figure 6A:
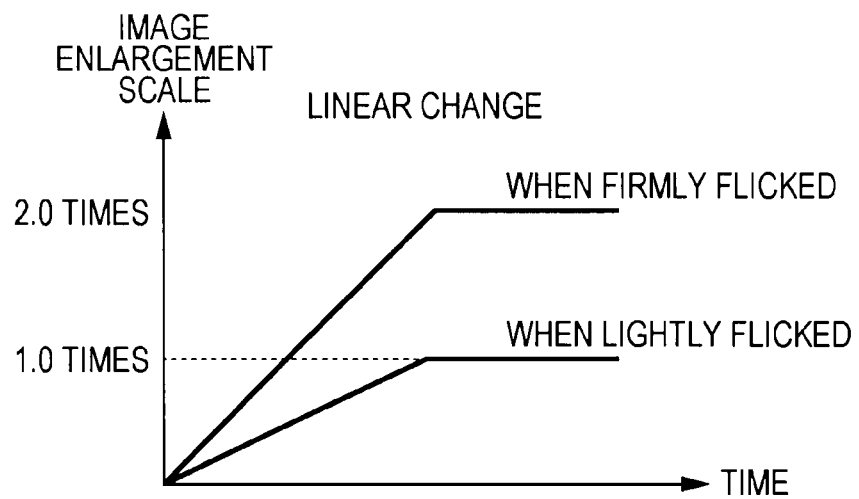
FIG. 6 is a diagram to describe the correlation between the flicking operation strength and enlargement scale of a cellular phone according to an embodiment.

As can be seen from FIG. 6(a), in the case of the cellular phone, in the case that a strong flicking operation is performed, the still image is subjected to enlarging processing according to the strength of the flicking operation, and in the case that a weak flicking operation is performed, the enlarging processing of the still image is temporarily stopped at the above-described enlargement scale of 1.0 times.

To detect the strength or weakness of the flicking operation, the control unit 15 computes "operational distance of flicking operation/flicking operation time", whereby "operational speed of flicking operation" is computed. In the case that the operational speed herein is faster than the predetermined operational speed (i.e. operational speed serving as a threshold), this means that a strong flicking operation is performed, and in the case that the operational speed herein is slower than the predetermined operational speed, this means that a weak flicking operation is performed.

Figure 5A:
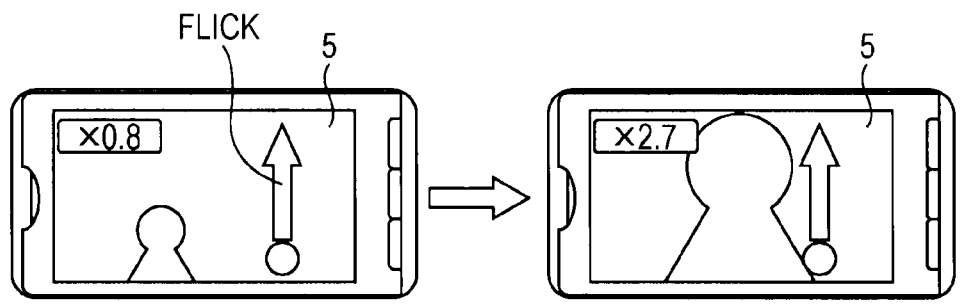
FIG. 5 is a schematic view to describe enlarging processing operations of a still image corresponding to a flicking operation of a cellular phone according to an embodiment.

Therefore, in the case that the control unit 15 detects a strong flicking operation which is a high speed flicking operation, as shown in FIG. 5(a) and FIG. 6(a), the enlargement processing of the still image is not stopped at the enlargement scale of 1.0 times as with the description above, but the still image is subjected to enlargement processing with an enlargement scale corresponding to the strength of the flicking operation, and this is displayed on the display unit 5.

Figure 5B:
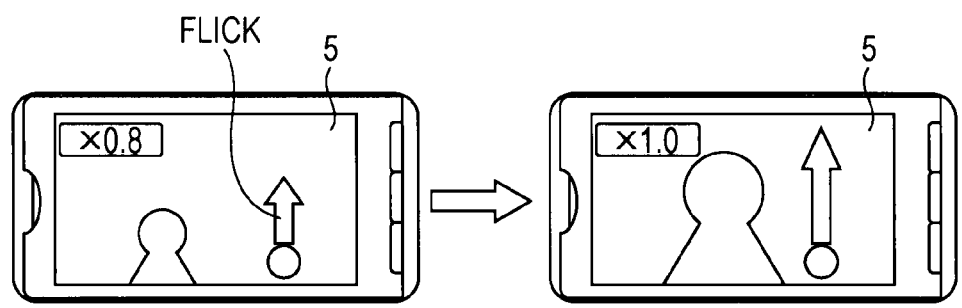
Figure 6B:
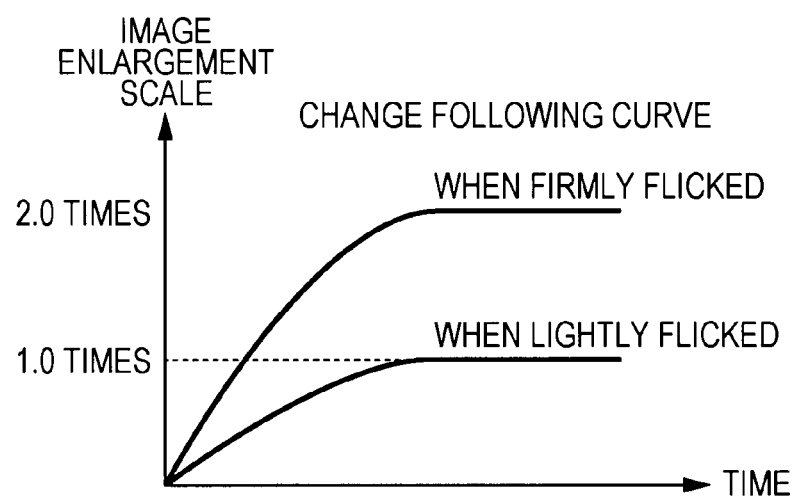

Conversely, in the case that the control unit 15 detects a weak flicking operation which is a slow speed flicking operation, as shown in FIG. 5(b) and FIG. 6(b), the enlargement processing of the still image is stopped at the enlargement scale of 1.0 times as with the description above. In the case that a flicking operation is performed again after this stopping, the still image is subjected to enlargement processing with an enlargement scale corresponding to the strength of the flicking operation, and this is displayed on the display unit 5.

Thus, when a weak flicking operation is performed, the enlargement scale of the still image is controlled to be temporarily stopped at an enlargement scale of 1.0 times, whereby the operator can easily display the still image having an enlargement scale of 1.0 times. In other words, the still image having a display scale of 1.0 times which has a high probability of being desired by the operator can be easily displayed.

Note that in the event that the enlargement scale of the still image is gradually increased according to a weak flicking operation by the operator and the enlargement scale nears 1.0 times as shown in FIG. 4(b), the enlargement scale may be caused to reach 1.0 times following a curve by gradually reducing the width of the enlargement processing, and in the event of reaching an enlargement scale of 1.0 times the enlargement processing may be stopped.

Thus, as the enlargement scale of the still image nears the enlargement scale of 1.0 times, the enlargement width is gradually decreased, and the enlargement processing eventually is stopped, whereby enlargement processing with natural changes can be shown to the user.

Also, according to the example herein, in the event that the enlargement scale reaches 1.0 times, the enlargement processing is controlled to be stopped, but even if the enlargement scale at which to stop the enlargement processing is other than 1.0 times, this can be set optionally by the operator or the maker of the cellular phone.

Further, the example as described above is an example in the case of enlargement operations of a still image, but performing reduction operations of a still image will be similar to that described above. That is to say, in the case that weak flicking operations is performed to specify reduction processing in the event that a still image having a display scale of 2.0 times is displayed, the control unit 15 subjects the still image to gradual reduction according to the weak flicking operation, and in the event that the display scale of the still image reaches a display scale of 1.0 times, the reduction operation is stopped.

Thus, the reduction scale of the still image can be controlled to be temporarily stopped at a reduction scale of 1.0 times, for example, whereby the operator can easily operate to display the still image having a reduction scale of 1.0 times. In other words, the still image having a display scale of 1.0 times which has a high probability of being desired by the operator can be easily displayed, and also advantages similar to the above descriptions can be obtained.

Next, FIG. 7(a) through FIG. 7(d) are diagrams showing a situation wherein the still image displayed on the display unit 5 is subjected to enlarging processing according to the long-pressing operations and displayed. Also, FIG. 8(a) shows the correlation between the time of the long-pressing operation and the enlargement scale of the still image.

Figure 8A:
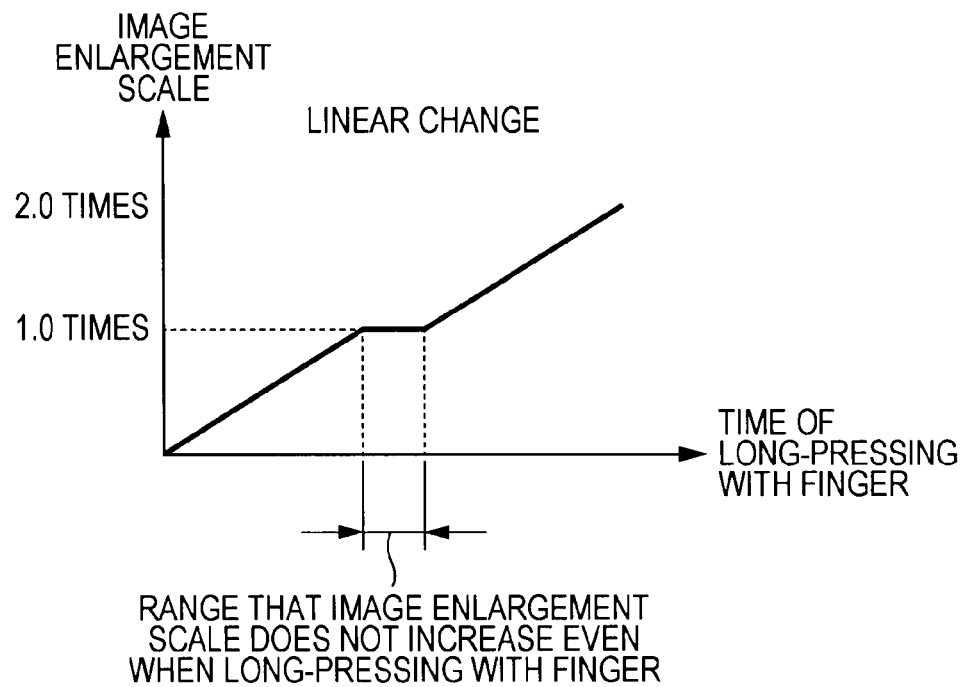
FIG. 8 is a diagram to describe the correlation between the long-pressing operation time and enlargement scale of a cellular phone according to an embodiment.

As can be seen from FIG. 8(a), in the case of the cellular phone, when the enlargement scale (display scale) of the still image subjected to enlarging processing by a long-pressing operation by the operator is 1.0 times, regardless of the long-pressing operation being performed by the operator, the enlarging processing of the still image is stopped for 200 msec for example, and at a timing that the 200 msec have elapsed, the enlarging processing of the still image corresponding to the long-pressing operation of the operator is performed again.

Figure 7A:
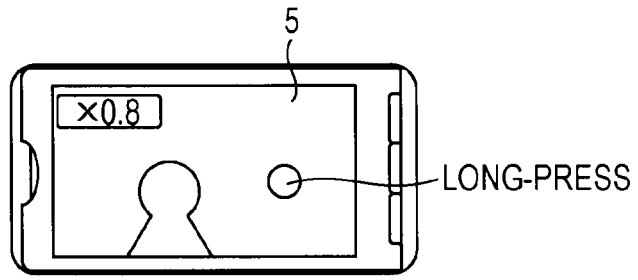
FIG. 7 is a schematic view to describe enlarging processing operations of a still image corresponding to a long-pressing operation of a cellular phone according to an embodiment.
Figure 7B:
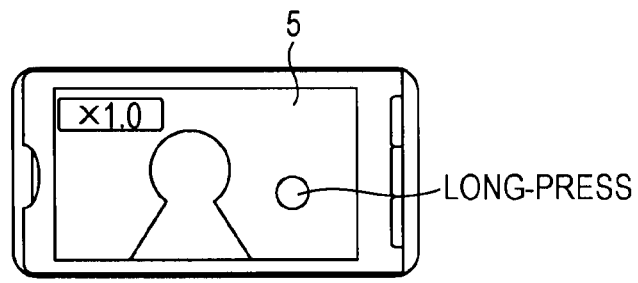
Figure 7C:
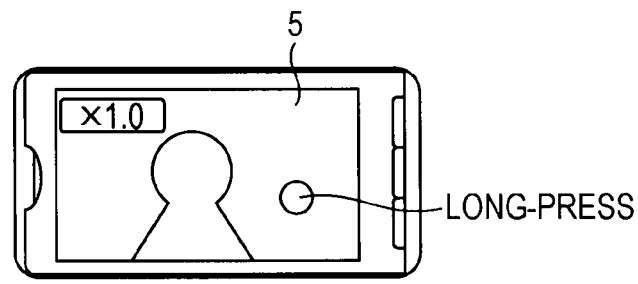
Figure 7D:
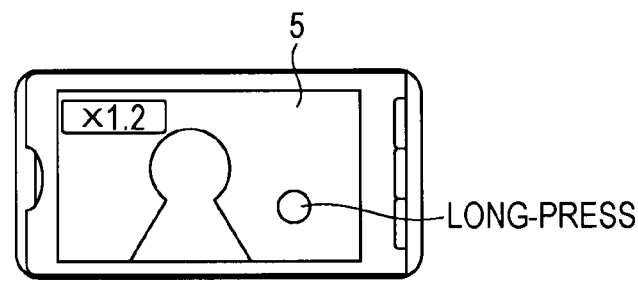

As shown in FIG. 7(a) for example, the control unit 15 first displays the still image on the display unit 5 at an enlargement scale of 0.8 times, performs enlargement processing of the still image according to the long-pressing operation, and when the enlargement scale of the still image reaches an enlargement scale of 1.0 times, stops the enlargement processing of the still image for a predetermined amount of time such as 200 msec or the like, regardless of the long-pressing operation being performed as shown in FIG. 7(b) and FIG. 7(c). The control unit 15 then resumes the enlarging processing of the still image as shown in FIG. 7(d), corresponding to the long-pressing operations of the operator, after the predetermined amount of time having elapsed.

Thus, even if the long-pressing operation is continuously performed, the enlargement scale of the still image is controlled so as to temporarily be stopped at an enlargement scale of 1.0 times, the still image can easily be subjected to display operations at an enlargement scale of 1.0 times. In other words, a still image having an enlargement scale of 1.0 times, which has a great probability of being the desired scale of the operator, can be easily displayed.

With the example shown in FIG. 8(a), the enlargement scale of the still image is linearly increased according to the long-pressing operation of the operator, and in the event of reaching the enlargement scale of 1.0 times, the enlargement processing is stopped for a predetermined amount of time such as 200 msec as mentioned above, and after the predetermined amount of time has elapsed, the enlargement scale of the still image is again linearly increased according to the long-pressing operations by the operator.

Figure 8B:
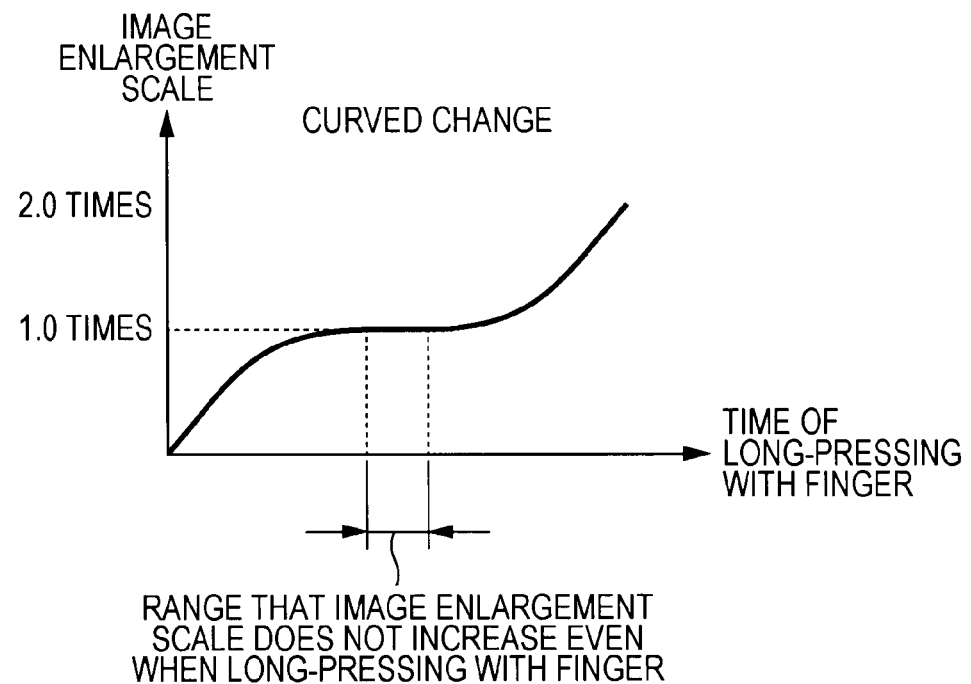

The enlargement scale of the still image is increased according to the long-pressing operations of the operator as shown in FIG. 8(b), and when the enlargement scale nears 1.0 times, the width of the enlargement processing is gradually reduced, whereby the enlargement scale reaches 1.0 times following a curve, and in the event of reaching the enlargement scale of 1.0 times, the enlargement processing is stopped for a predetermined amount of time such as 200 msec as shown above. After the predetermined amount of time has elapsed, the enlargement scale of the still image may be increased again following a curve according to the long-pressing operation by the operator.

In this case, when the enlargement scale of the still image subjected to long-pressing operations nears an enlargement scale of 1.0 times, the enlargement width of the still image becomes smaller and the still image reaches an enlargement scale of 1.0 times as mentioned above, and during the predetermined amount of time such as the 200 msec mentioned above, the enlarging processing is stopped. Therefore, as the enlargement scale of the still image nears the enlargement scale of 1.0 times, the enlargement width gradually becomes smaller, and the enlargement processing eventually stops. Also, in the event that the enlargement processing is resumed after a predetermined amount of time having elapsed, the enlargement width gradually is increased, and eventually the enlargement processing of the still image is performed linearly according to the long-pressing operations. Therefore, an enlarging processing with natural changes can be shown to the user.

Note that in the examples shown in FIG. 7(a) through FIG. 7(d) and FIG. 8(a) and FIG. 8(b), the enlargement processing is controlled to stop for a predetermined amount of time in the event that the enlargement scale reaches 1.0 times, but the enlargement scale at which to stop the enlargement processing may be optionally set by the operator or the cellular phone maker, to be other than 1.0 times.

Also, with the example shown in FIG. 7(a) through FIG. 7(d) and FIG. 8(a) and FIG. 8(b), the enlargement processing is controlled to stop for a predetermined amount of time in the event that the enlargement scale reaches 1.0 times, but the enlargement processing may be stopped for a predetermined amount of time when the enlargement scale reaches 1.0 times and when the enlargement scale reaches 2.0 times, respectively. In other words, the enlargement processing may be controlled to be stopped multiple times at desired timings of the enlargement scale, not only limited to once in the event that the enlargement scale reaches 1.0 times.

Further, the example as described above is an example in the case of enlargement operations of a still image, but performing reduction operations of a still image will be similar to that described above.

That is to say, in the case that long-pressing operations to specify reduction processing in the event that a still image having a display scale of 2.0 times is displayed, the control unit 15 subjects the still image to gradual reduction according to the long-pressing operation, and in the event that the display scale of the still image reaches a display scale of 1.0 times, the long-pressing operation performed by the operator is ignored (canceled), and the reduction processing is stopped during the predetermined amount of time. The reduction operation of the still image according to long-pressing operation by the operator is resumed at a timing when the predetermined amount of time has elapsed.

Thus, even if continuous long-pressing operations are performed, the reduction scale of the still image can be controlled to be temporarily stopped at a reduction scale of 1.0 times, for example, whereby the operator can easily operate to display the still image having a reduction scale of 1.0 times. In other words, the still image having a display scale of 1.0 times which has a high probability of being desired by the operator can be easily displayed, and also advantages similar to the above descriptions can be obtained.

Next, the above-described example described temporarily stopping the enlargement processing of the still image in the event that the enlargement scale of the still image reaching 1.0 times. In the case that a facial image of a person is showing in the still image, as described below, the enlargement processing of the still image can be temporarily stopped at a timing that the facial image is fully enlarged on the display screen.

Figure 9:
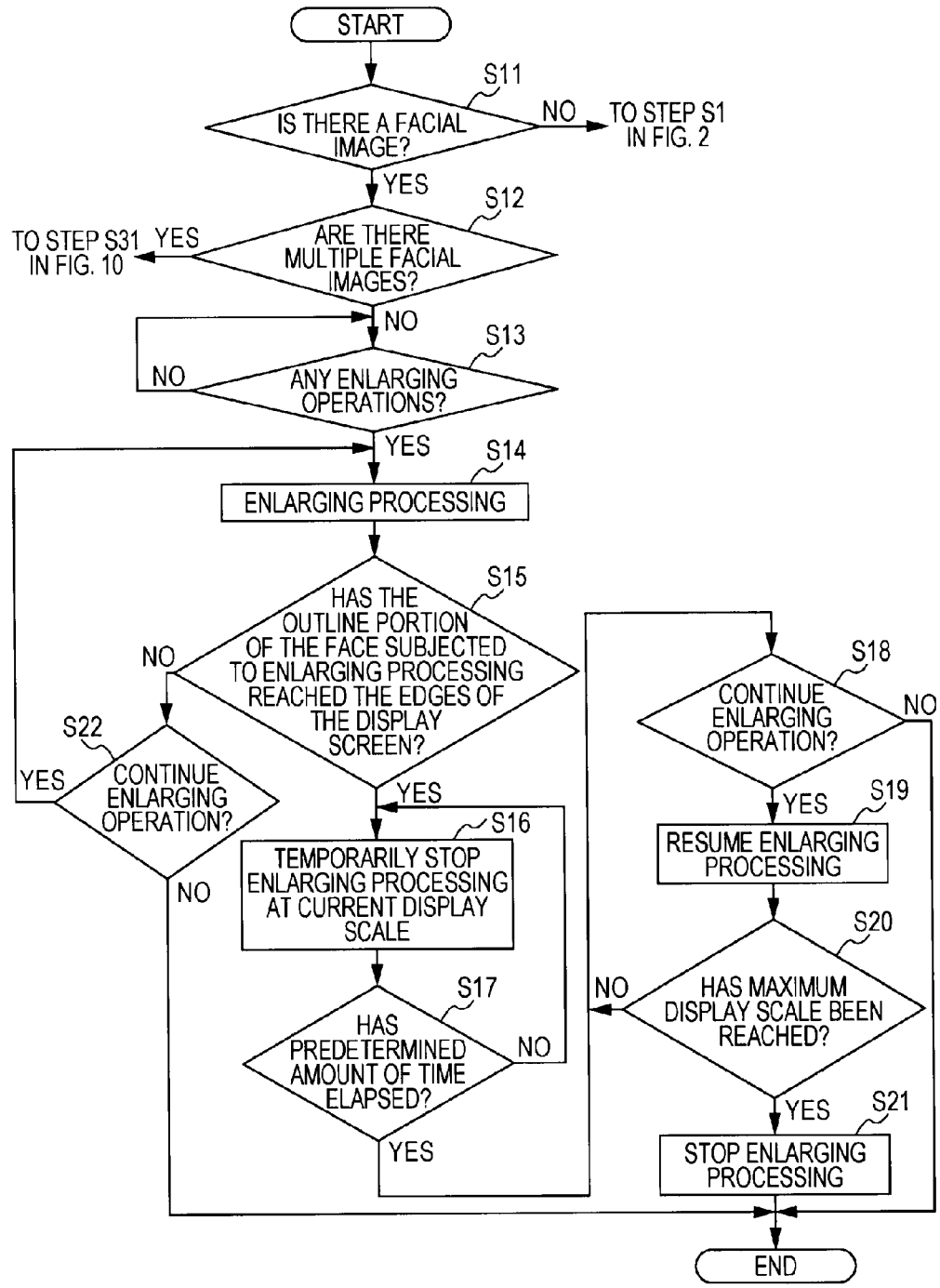
FIG. 9 is a flowchart to describe the enlarging processing operations of a cellular phone according to an embodiment in the case that only one face image exists in a still image to be subjected to enlarging processing.

The flowchart in FIG. 9 shows the flow of the enlargement processing in the case that only one facial image of a person is showing in the still image to be subjected to enlarging processing. Upon controlling the still image specified by the operator to be displayed on the display unit 5 based on the viewer program of the camera control program, the processing shown in the flowchart in FIG. 9 is started based on the viewer program herein.

In step S11, the control unit 15 determines whether or not a facial image of a person is currently showing in the still image displayed on the display unit 5, based on a face recognition program built into the camera control program. In the case determination is made that there is no facial image of a person in the still image, the processing is advanced to step S1 in the flowchart in FIG. 2, and in the event that the enlargement scale reaches 1.0 times as described above, control is performed to temporarily stop the enlargement processing.

Conversely, in the case determination is made that this is a facial image of a person in the still image, the control unit 15 advances the processing to step S12, and determines whether or not multiple facial images of persons are currently showing in the still image displayed on the display unit 5. In the case determination is made in step S12 herein that multiple facial images of persons are showing in the still image, the processing is advanced to step S31 in the flowchart in FIG. 10 to be described later.

Conversely, determining in step S12 that multiple facial images of persons are not showing in the still image means that only one facial image of a person is showing in the still image, whereby the control unit 15 advances the processing to step S13.

In step S13, the control unit 15 monitors the operational situation of the display unit 5, thereby monitoring whether or not enlarging operations such as the above-described dragging operations, long-pressing operations or the like are performed, and advances processing to step S14 at a timing that a enlarging operation is detected.

In step S14, the control unit 15 subjects the still image to enlarging processing according to the enlarging operations of the operator and displays this on the display unit 5, and advances the processing to step S15. In step S15, the control unit 15 determines whether or not one of the outline portions of a facial image subjected to enlarging processing has been displayed at an end portion of the display unit 5, based on the face recognition program.

That is to say, in step S14, the control unit 15 performs enlarging processing of the still image, thereby determining whether or not the enlarging processing of the still image has been performed until one of the portions of an outline of the facial image has reached an edge portion of the display unit 5.

In the case determination is made that one of the portions of an outline of the facial image has not reached an edge portion of the display unit 5, the control unit 15 advances the processing to step S22 and monitors whether or not the operator is continuing the enlarging operations. The control unit 15 then performs enlarging processing of the still image (step S14) during the time that enlarging operations are continued by the operator (step S22) and until one of the portions of an outline of the facial image has reached an edge portion of the display unit 5 (step S15). In step S15, the control unit 15 advances the processing to step S16 at a timing that one of the portions of an outline of the facial image has been determined to have reached an edge portion of the display unit 5.

In step S16, one of the portions of an outline of the facial image has reached an edge portion of the display unit 5, whereby the control unit 15 temporarily stops the enlarging processing of the still image with the current display scale, and advances the processing to step S17. In step S17, upon temporarily stopping the enlarging processing of the still image, determination is made as to whether or not a predetermined amount of time such as 200 msec for example has elapsed, and the processing is advanced to step S18 at the timing that the predetermined amount of time has been determined to have elapsed.

That is to say, in the case of this example, by performing the enlarging processing of the still image, in the event of displaying one of the portions of an outline of the facial image showing in the still image on the display unit 5, even if the enlarging operations are being continuously performed by the operator, the control unit 15 cancels the enlarging operation and stops the enlarging processing of the still image for a predetermined amount of time.

Upon stopping the enlarging processing of the still image for a predetermined amount of time, the control unit 15 advances the processing to step S18, determines whether or not the enlarging operations are continuously performed by the operator, and in the case the enlarging operations are not continuously performed by the operator, the processing shown in the flowchart in FIG. 9 is ended with no further processing.

Conversely, in the case determination is made in step s18 that enlarging operations are continuously performed by the operator, the control unit 15 advances the processing to step S19. In step S19, the control unit 15 resumes the enlarging processing of the still image according to enlarging operations by the operator, and advances the processing to step S20.

In step S20, the control unit 15 determines with the resumed enlarging processing whether or not the display scale of the still image has reached the maximum display scale. Upon resuming the enlarging processing of the still image, the control unit 15 performs monitoring of whether or not enlarging operations are continuously performed by the operator (step S18) and monitoring of whether or not the display scale of the still image has reached the maximum display scale (step S20). In the case that the operator has ended the enlarging operation before the display scale of the still image reaches the maximum display scale, the control unit 15 ends the processing in the flowchart in FIG. 9 with no further processing. Also, even if before the operator ends the enlarging operations, in the case the display scale of the still image reaches the maximum display scale, the control unit 15 advances the processing from step S20 to step S21, stops the enlarging processing of the still image, and ends the processing in the flowchart in FIG. 9.

In the case of this example, upon recognizing that only one facial image of a person is showing in the still image, the control unit 15 subjects the still image to enlarging processing according to the enlarging operations by the operator, cancels the enlarging operation by the operator at a timing that one of the portions of an outline of the facial image showing in the still image subjected to enlarging processing reaches an edge portion of the display unit 5, and stops the enlarging processing for a predetermined amount of time. The control unit 15 then resumes the enlarging processing of the still image according to the enlarging operations by the operator after the predetermined amount of time has elapsed, and in the event that the display scale of the still image has reached the maximum display scale, the control unit 15 stops the enlarging processing of the still image.

Thus, in a case wherein only one facial image of a person is showing in a still image, the enlarging processing can be temporarily stopped at a timing that the outline of the facial image reaches the edge portions of the display unit 5. In the state that the outline of the facial image has reached the edge portions of the display unit 5, this means that the facial image is in a state of having been fully displayed as to the display unit 5.

Also, in a state that the facial image is fully displayed as to the display unit 5, there is a great probability that the display scale is that which the operator performing the enlarging operations of the still image desires. Therefore, by temporarily stopping the enlarging processing at a timing that the outline of the facial image has reached the edge portions of the display unit 5, the display scale of the still image can be easily operated to change to the display scale desired by the operator.

Figure 10:
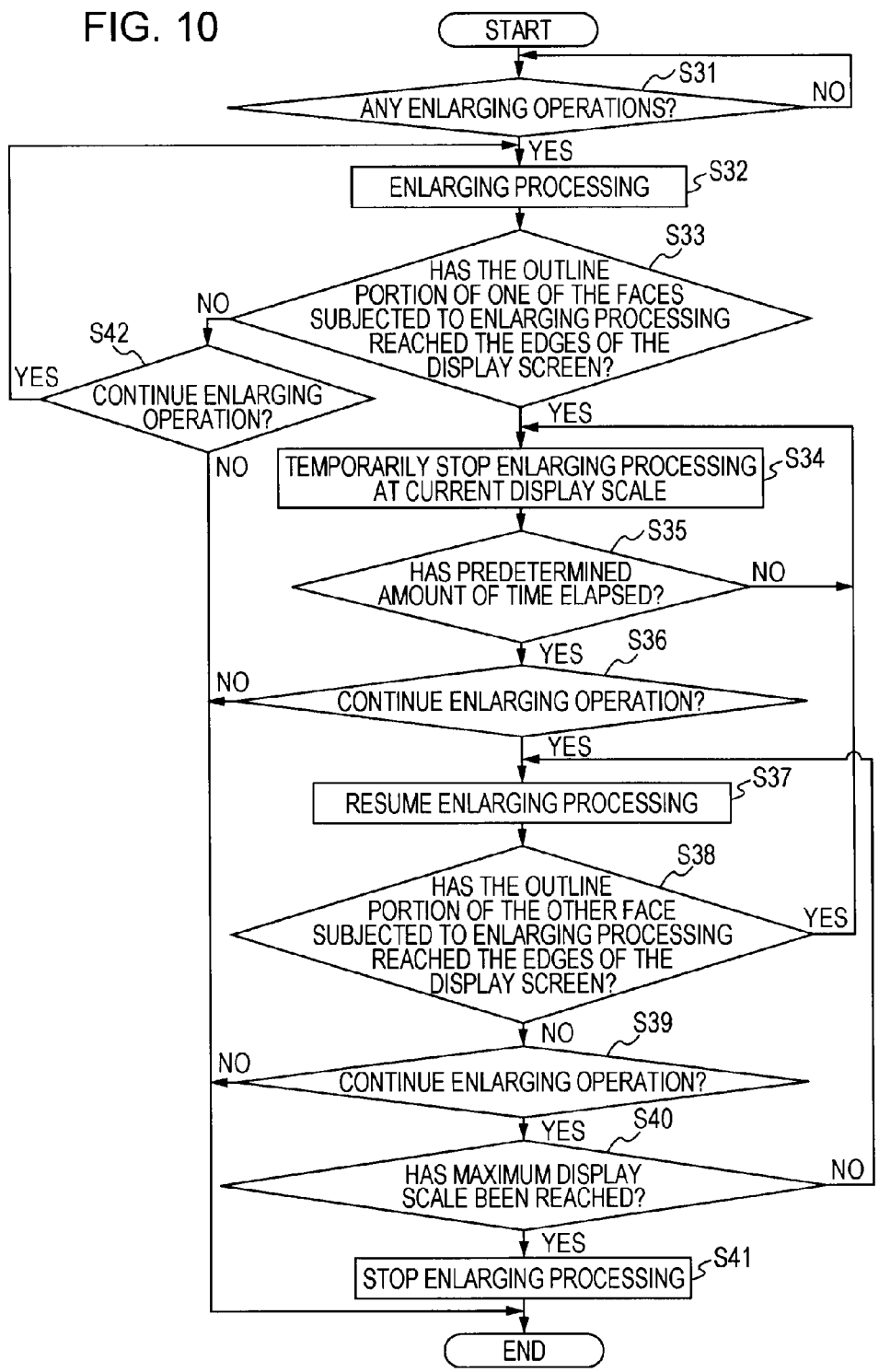
FIG. 10 is a flowchart to describe the enlarging processing operations of a cellular phone according to an embodiment in the case that multiple face images exist in a still image to be subjected to enlarging processing.
Figure 11A:
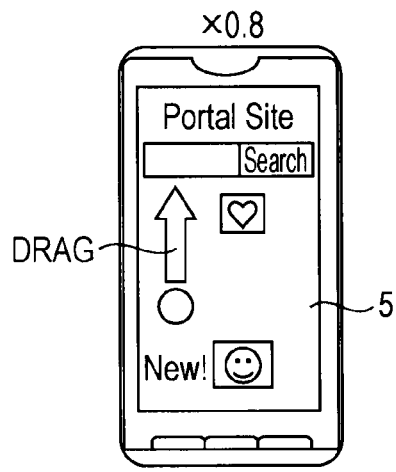
FIG. 11 is a schematic diagram to describe Web page enlarging processing operations corresponding to a dragging operation of a cellular phone according to an embodiment.
Figure 11B:
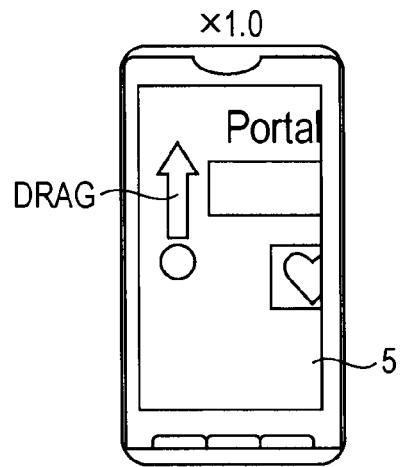
Figure 11C:
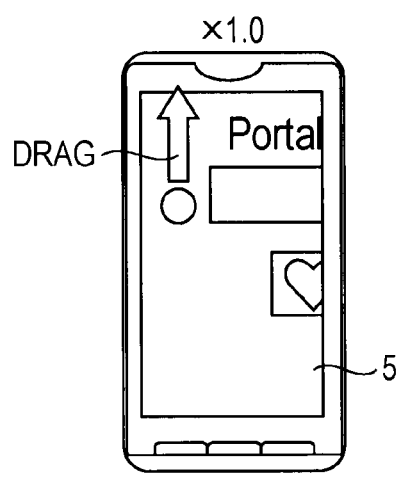
Figure 11D:
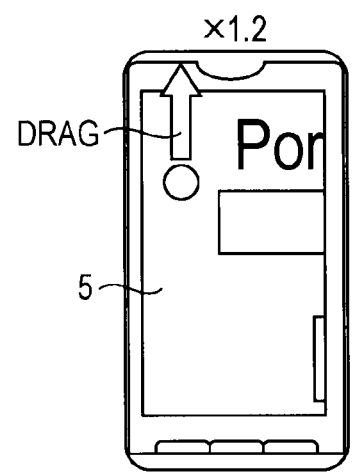

Next, the example described above is of a flow of enlarging processing in the case that only one facial image of a person is showing in the still image, but the enlarging processing in the case that multiple facial images of persons are shown in the still image is as the flow in the flowchart in FIG. 10.

That is to say, in step S12 in the flowchart in FIG. 9, upon determining that currently multiple facial images of persons are showing in the still image displayed on the display unit 5, the control unit 15 advances the processing to step S31 in the flowchart in FIG. 10.

In step S31, the control unit 15 monitors the operational state of the display unit 5, thereby monitoring whether or not there are any enlarging operations such as the above-described dragging operations or long-pressing operations, and advances the processing to step S32 at the timing that the enlarging operation is detected.

In step s32, the control unit 15 subjects the still image to enlarging processing according to the enlarging operations by the operator and displays this on the display unit 5, and advances the processing to step S33. In step S33, the control unit 15 determines whether or not one of the outline portions of one of the facial images out of the multiple facial images subjected to enlarging processing is to be displayed at an edge portion of the display unit 5, based on the face recognition program.

That is to say, in step S33, by performing the enlarging processing of the still image, the control unit 15 determines whether or not an outline portion of one of the facial images out of the multiple facial images shown in the still image has reached an edge portion of the display unit 5.

In the case determination is made that outlines in all of the facial images have not reached an edge portion of the display unit 5, the control unit 15 advances the processing to step S42, and monitors whether or not the operator is continuing the enlarging operations. The control unit 15 then performs enlarging processing of the still image (step S32) during the time that enlarging operations are continued by the operator (step S42) and until one of the portions of an outline of the facial image has reached an edge portion of the display unit 5 (step S33). In step S33, the control unit 15 advances the processing to step S34 at a timing that one of the portions of an outline of the facial image has been determined to have reached an edge portion of the display unit 5.

In step S34, one of the portions of an outline of one of the facial images has reached an edge portion of the display unit 5, whereby the control unit 15 temporarily stops the enlarging processing of the still image with the current display scale, and advances the processing to step S35. In step S35, upon temporarily stopping the enlarging processing of the still image, determination is made as to whether or not a predetermined amount of time such as 200 msec for example has elapsed, and the processing is advanced to step S36 at the timing that the predetermined amount of time has been determined to have elapsed.

That is to say, in the case of this example, by performing the enlarging processing of the still image, in the event of displaying one of the portions of an outline of one of the facial images showing in the still image on the display unit 5, even if the enlarging operations are being continuously performed by the operator, the control unit 15 cancels the enlarging operation and stops the enlarging processing of the still image for a predetermined amount of time.

Upon stopping the enlarging processing of the still image for a predetermined amount of time, the control unit 15 advances the processing to step S36, determines whether or not the enlarging operations are continuously performed by the operator, and in the case the enlarging operations are not continuously performed by the operator, the processing shown in the flowchart in FIG. 10 is ended with no further processing.

Conversely, in the case determination is made in step S36 that enlarging operations are continuously performed by the operator, the control unit 15 advances the processing to step S37. In step S37, the control unit 15 resumes the enlarging processing of the still image according to enlarging operations by the operator, and advances the processing to step S38.

In step S38, the control unit 15 determines with the resumed enlarging processing whether or not the outline portion of one of the other facial images, out of the multiple facial images shown in the still image, has reached an edge portion of the display unit 5. Specifically, for example, in the case that the facial images of Mr. A and Mr. B are shown in the still image, and determination is made in step S33 that the outline of the facial image of Mr. A has first reached an edge portion of the display unit 5, in step S38 herein the control unit 15 determines whether or not the outline of the facial image of Mr. B has reached an edge portion of the display unit 5.

In step S38, in the case determination is made from the resumed enlarging processing that the outline portion of one of the other facial images, out of the multiple facial images shown in the still image, has not reached an edge portion of the display unit 5, the control unit 15 performs monitoring in step S39 of whether or not enlarging operations are continuously performed by the operator and monitoring in step S40 of whether or not the display scale of the still image has reached the maximum display scale.

In the case that the operator has ended the enlarging operation before the display scale of the still image reaches the maximum display scale, the control unit 15 ends the processing in the flowchart in FIG. 10 with no further processing. Also, even if before the operator ends the enlarging operations, in the case the display scale of the still image reaches the maximum display scale, the control unit 15 advances the processing from step S40 to step S41, stops the enlarging processing of the still image, and ends the processing in the flowchart in FIG. 10.

On the other hand, in the case determination is made from the resumed enlarging processing that the outline portion of one of the other facial images, out of the multiple facial images shown in the still image, has reached an edge portion of the display unit 5, the control unit 15 returns the processing to step S34, stops the enlarging processing of the still image at the current display scale again, and advances the processing to step S35. In step S35, determination is made as to whether or not predetermined amount of time has elapsed from the stopping again, and at a timing that the predetermined time has been determined to have elapsed, the enlarging processing of the still images are resumed as described above.

In the case of this example, the control unit 15 subjects the still image to enlarging processing according to the enlarging operations by the operator, cancels the enlarging operation by the operator at a timing that one of the portions of an outline of the facial image showing in the still image subjected to enlarging processing reaches an edge portion of the display unit 5, and stops the enlarging processing for a predetermined amount of time. After the predetermined amount of time has elapsed, the enlarging operations by the operator are cancelled at a timing that one of the portions of an outline of another facial image shown in the still image has reached an edge portion of the display unit 5, and the enlarging processing by the operator is stopped for a predetermined amount of time.

Thus, in a case wherein multiple facial images of persons are showing in a still image, the enlarging processing can be temporarily stopped each time that a portion of an outline of the various facial images reaches an edge portion of the display unit 5. As described above, in the state that the outline of the facial image has reached the edge portions of the display unit 5, this means that the facial image is in a state of having been fully displayed as to the display unit 5. Also, it is highly probable that a state in which the facial image is displayed filling up the display unit 5 is at the display scale that the operator who is performing enlarging operations of the still image desires. Therefore, by temporarily stopping the enlarging processing at a timing that the outline of the facial image has reached the edge portion of the display unit 5, the display scale of the still image can be easily operated to change to the display scale that the operator desires.

Next, the above-described example has described the enlarging processing of a still image based on a viewer program of a camera control program, but the cellular phone according to the present embodiment has a display scale change control function in the Web browsing program, similar to the above description. The control unit 15 can control to change the display scale of an object displayed on the display unit according to display scale change operations by an operator, based on the Web browsing program herein.

Figure 12A:
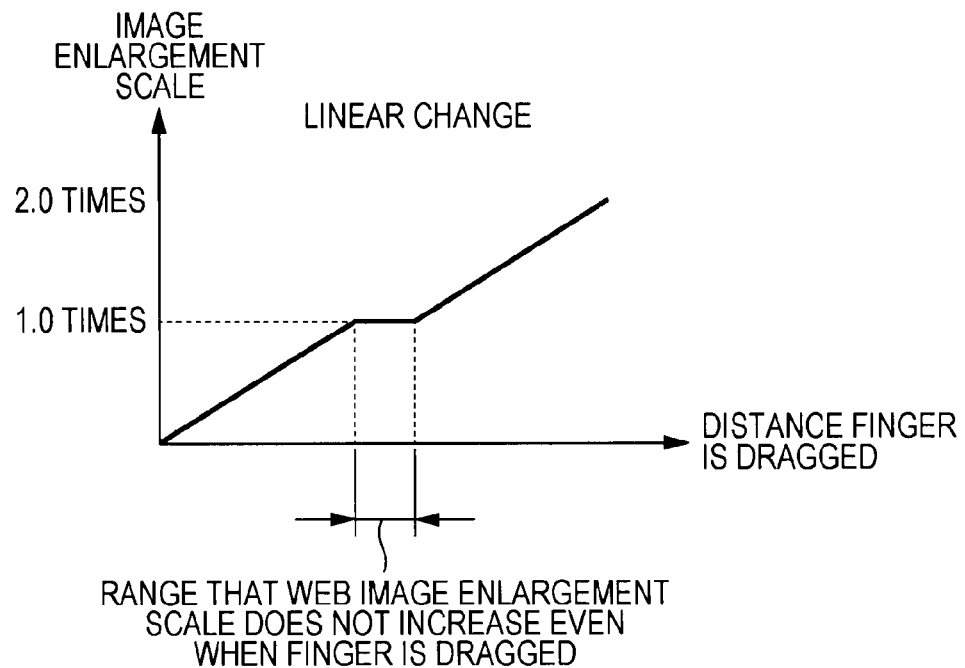
FIG. 12 is a diagram to describe the correlation between the dragging operation time and enlargement scale of a cellular phone according to an embodiment.
Figure 12B:
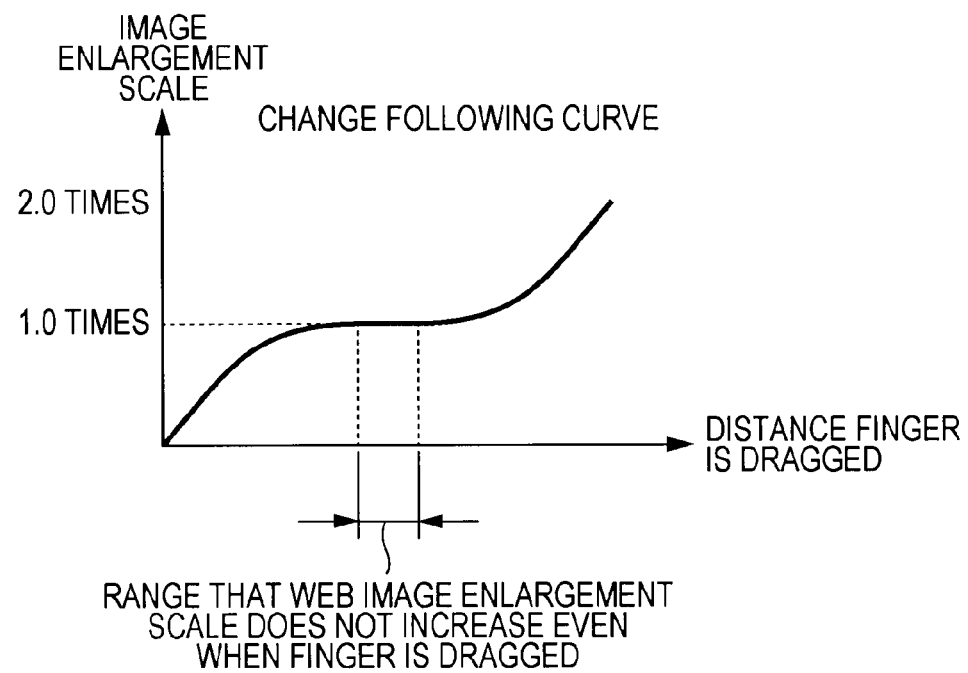

FIG. 11 is a diagram showing a situation wherein the object displayed on the display unit 5 based on the Web browsing program is subjected to enlarging processing according to a dragging operation and displayed. FIG. 12(*a*) is a diagram showing the correlation between the distance of the dragging operation and the enlargement scale of the object.

As can be seen from FIG. 12(*a*), in the case of the cellular phone, when the enlargement scale (display scale) of the object is 1.0 times, regardless of whether a dragging operation is being performed by an operator, the enlarging processing of the still image is stopped for 200 msec for example, and at a timing that the 200 msec have elapsed, the enlarging processing of the still image corresponding to the dragging operation of the operator is performed again.

That is to say, the enlargement scale of 1.0 of the still image means the original image size of the object thereof (i.e. the size at the time the still image was shot, without change). If the still image is enlarged more than the 1.0 times, the image quality becomes coarse. Therefore, the operator tends to temporarily stop the enlarging operation at the original size of the object. This means that many operators desire an enlarging operation of an enlargement scale of 1.0 times.

Therefore, with the cellular phone according to the present embodiment, for example as shown in FIG. 11(*a*), the control unit 15 first displays the object on the display unit 5 at an enlargement scale of 0.8 times, performs enlargement processing of the object according to the dragging operation, and when the enlargement scale of the still image reaches an enlargement scale of 1.0 times, stops the enlargement processing of the object for a predetermined amount of time such as 200 msec or the like, regardless of the dragging operation being performed as shown in FIG. 11(*b*) and FIG. 11(*c*). The control unit 15 then resumes the enlarging processing of the object as shown in FIG. 11(*d*), corresponding to the dragging operations of the operator, after the predetermined amount of time having elapsed.

Thus, even if the dragging operation is continuously performed, the enlargement scale of the object is controlled so as to temporarily be stopped at an enlargement scale of 1.0 times, object image can easily be subjected to display operations at an enlargement scale of 1.0 times. In other words, an object having an enlargement scale of 1.0 times, which has a great probability of being the desired scale of the operator, can be easily displayed.

With the example shown in FIG. 12(*a*), the enlargement scale of the object is linearly increased according to the dragging operation of the operator, and in the event of reaching the enlargement scale of 1.0 times, the enlargement processing is stopped for a predetermined amount of time such as 200 msec as mentioned above, and after the predetermined amount of time has elapsed, the enlargement scale of the object is again linearly increased according to the dragging operations by the operator.

The enlargement scale of the object is increased according to the dragging operations of the operator as shown in FIG. 12(*b*), and when the enlargement scale nears 1.0 times, the width of the enlargement processing is gradually reduced, whereby the enlargement scale reaches 1.0 times following a curve, and in the event of reaching the enlargement scale of 1.0 times, the enlargement processing is stopped for a predetermined amount of time such as 200 msec as shown above. After the predetermined amount of time has elapsed, the enlargement scale of the object may be increased again following a curve according to the dragging operation by the operator.

In this case, when the enlargement scale of the object subjected to enlargement operations nears an enlargement scale of 1.0 times, the enlargement width of the object becomes smaller and the object reaches an enlargement scale of 1.0 times as mentioned above, and during the predetermined amount of time such as the 200 msec mentioned above, the enlarging processing is stopped. Therefore, as the enlargement scale of the object nears the enlargement scale of 1.0 times, the enlargement width gradually becomes smaller, and the enlargement processing eventually stops. Also, in the event that the enlargement processing is resumed after a predetermined amount of time having elapsed, the enlargement width gradually is increased, and eventually the enlargement processing of the object is performed linearly according to the dragging operations. Therefore, an enlarging processing with natural changes can be shown to the user.

Note that in the examples shown in FIG. 11(a) through FIG. 11(d) and FIG. 12(a) and FIG. 12(b), the enlargement processing is controlled to stop for a predetermined amount of time in the event that the enlargement scale reaches 1.0 times, but the enlargement scale at which to stop the enlargement processing may be optionally set by the operator or the cellular phone maker, to be other than 1.0 times.

Also, with the example shown in FIG. 11(a) through FIG. 11(d) and FIG. 12(a) and FIG. 12(b), the enlargement processing is controlled to stop for a predetermined amount of time in the event that the enlargement scale reaches 1.0 times, but the enlargement processing may be stopped for a predetermined amount of time when the enlargement scale reaches 1.0 times and when the enlargement scale reaches 2.0 times, respectively. In other words, the enlargement processing may be controlled to be stopped multiple times at desired timings of the enlargement scale, not only limited to once in the event that the enlargement scale reaches 1.0 times.

Further, the example as described above is an example in the case of enlargement operations of an object, but performing reduction operations of an object will be similar to that described above. That is to say, in the case that dragging operations to specify reduction processing in the event that an object having a display scale of 2.0 times is displayed, the control unit 15 subjects the object to gradual reduction according to the dragging operation, and in the event that the display scale of the object reaches a display scale of 1.0 times, the reduction operation by the operator is cancelled for a predetermined amount of time such as 200 msec or the like for example, and the reduction processing is stopped during the predetermined amount of time. The reduction operation of the object according to dragging operation by the operator is resumed at a timing when the predetermined amount of time has elapsed.

Thus, even if continuous dragging operations are performed, the reduction scale of the object can be controlled to be temporarily stopped at a reduction scale of 1.0 times, for example, whereby the operator can easily operate to display the object having a reduction scale of 1.0 times. In other words, the object having a display scale of 1.0 times which has a high probability of being desired by the operator can be easily displayed, and also advantages similar to the above descriptions can be obtained.

Figure 13A:
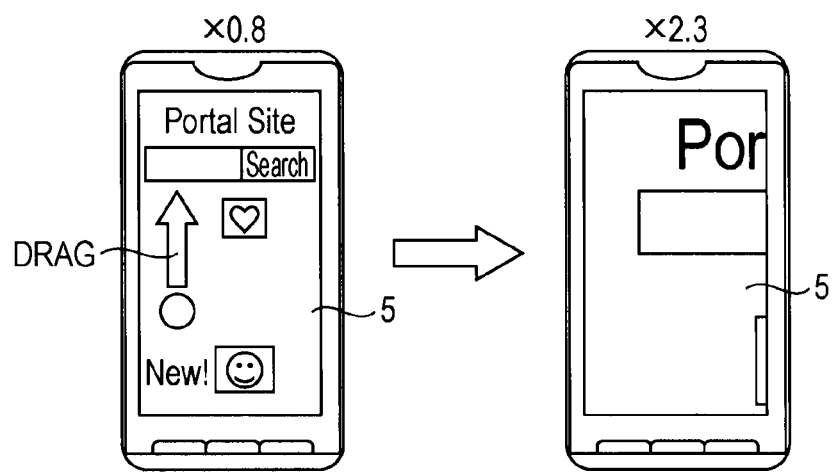
FIG. 13 is a schematic diagram to describe Web page enlarging processing operations corresponding to a flicking operation of a cellular phone according to an embodiment.
Figure 13B:
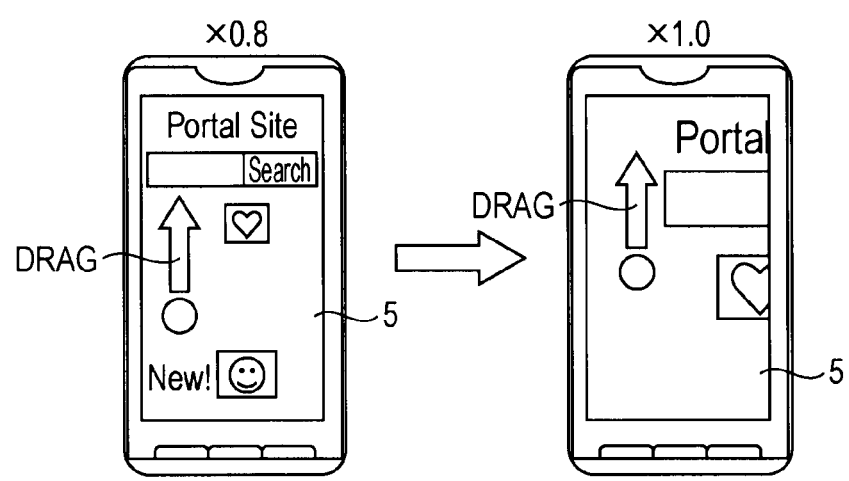

Next, FIG. 13(a) and FIG. 13(b) are diagrams showing a situation wherein the object displayed on the display unit 5 based on a Web browsing program is subjected to enlarging processing according to the flicking operations and displayed. Also, FIG. 14(a) shows the correlation between the strength of the flicking operation and the enlargement scale of the still image.

Figure 14A:
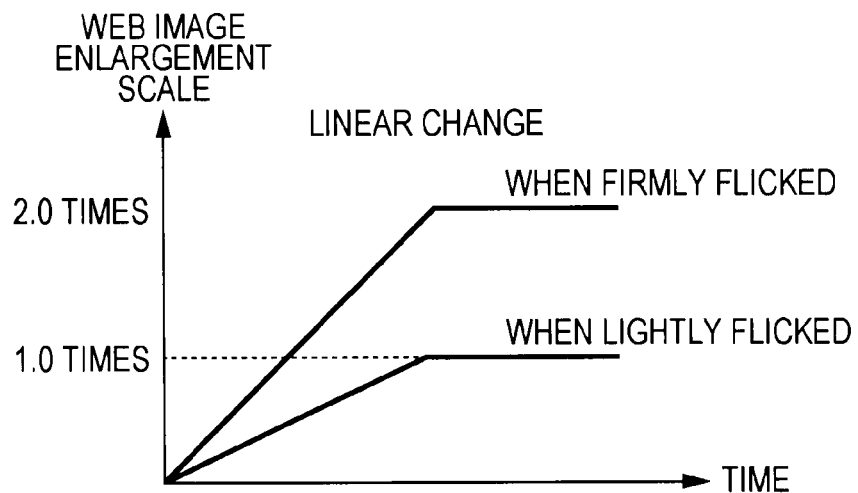
FIG. 14 is a diagram to describe the correlation between the flicking operation strength and enlargement scale of a cellular phone according to an embodiment.

As can be seen from FIG. 14(a), in the case of the cellular phone, in the case that a strong flicking operation is performed, the object is subjected to enlarging processing according to the strength of the flicking operation, and in the case that a weak flicking operation is performed, the enlarging processing of the object is temporarily stopped at the above-described enlargement scale of 1.0 times.

To detect the strength or weakness of the flicking operation, the control unit 15 computes "operational distance of flicking operation/flicking operation time", whereby "operational speed of flicking operation" is computed. In the case that the operational speed herein is faster than the predetermined operational speed (i.e. operational speed serving as a threshold), this means that a strong flicking operation is performed, and in the case that the operational speed herein is slower than the predetermined operational speed, this means that a weak flicking operation is performed.

Therefore, in the case that the control unit 15 detects a strong flicking operation which is a high speed flicking operation, as shown in FIG. 13(a) and FIG. 14(a), the enlargement processing of the object is not stopped at the enlargement scale of 1.0 times as with the description above, but the object is subjected to enlargement processing with an enlargement scale corresponding to the strength of the flicking operation, and this is displayed on the display unit 5.

Conversely, in the case that the control unit 15 detects a weak flicking operation which is a slow speed flicking operation, as shown in FIG. 13(b) and FIG. 14(a), the enlargement processing of the object is stopped at the enlargement scale of 1.0 times as with the description above. In the case that a flicking operation is performed again after this stopping, the object is subjected to enlargement processing with an enlargement scale corresponding to the strength of the flicking operation, and this is displayed on the display unit 5.

Thus, when a weak flicking operation is performed, the enlargement scale of the object is controlled to be temporarily stopped at an enlargement scale of 1.0 times, whereby the operator can easily display the object having an enlargement scale of 1.0 times. In other words, the object having a display scale of 1.0 times which has a high probability of being desired by the operator can be easily displayed.

Figure 14B:
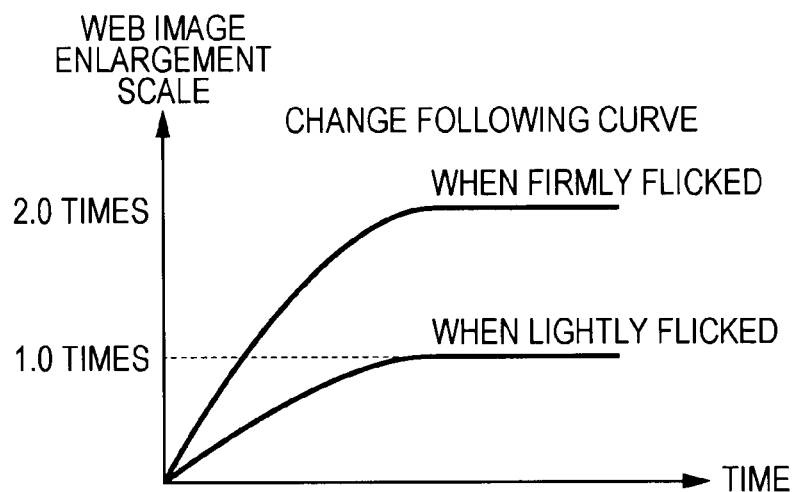
Figure 15A:
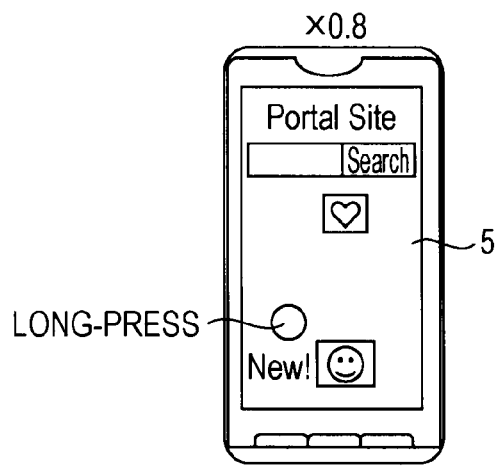
FIG. 15 is a schematic diagram to describe Web page enlarging processing operations corresponding to a long-pressing operation of a cellular phone according to an embodiment.
Figure 15B:
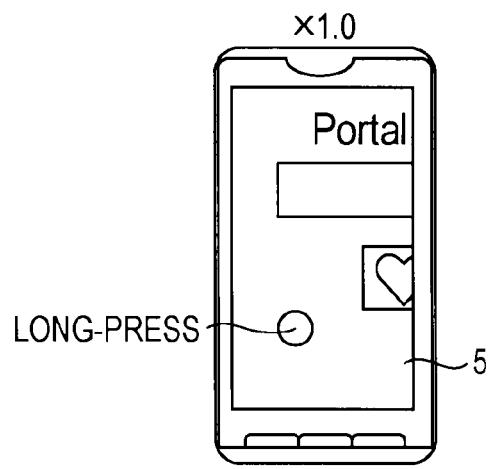
Figure 15C:
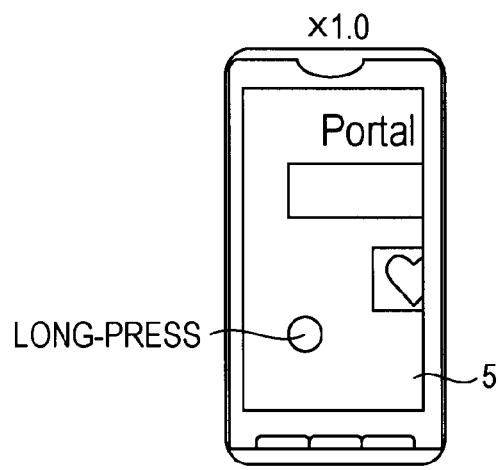
Figure 15D:
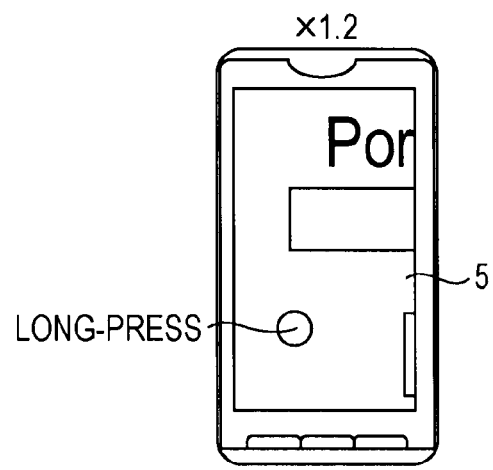

Note that in the event that the enlargement scale of the object is gradually increased according to a weak flicking operation by the operator and the enlargement scale nears 1.0 times as shown in FIG. 14(b), the enlargement scale may be caused to reach 1.0 times following a curve by gradually reducing the width of the enlargement processing, and in the event of reaching an enlargement scale of 1.0 times the enlargement processing may be stopped.

Thus, as the enlargement scale of the object nears the enlargement scale of 1.0 times, the enlargement width is gradually decreased, and the enlargement processing eventually is stopped, whereby enlargement processing with natural changes can be shown to the user.

Also, according to the example herein, in the event that the enlargement scale reaches 1.0 times, the enlargement processing is controlled to be stopped, but even if the enlargement scale at which to stop the enlargement processing is other than 1.0 times, this can be set optionally by the operator or the maker of the cellular phone.

Further, the example as described above is an example in the case of enlargement operations of an object, but performing reduction operations of an object will be similar to that described above. That is to say, in the case that weak flicking operations is performed to specify reduction processing in the event that an object having a display scale of 2.0 times is displayed, the control unit 15 subjects the object to gradual reduction according to the weak flicking operation, and in the event that the display scale of the object reaches a display scale of 1.0 times, the reduction operation is stopped.

Thus, the reduction scale of the object can be controlled to be temporarily stopped at a reduction scale of 1.0 times, for example, whereby the operator can easily operate to display the object having a reduction scale of 1.0 times. In other words, the object having a display scale of 1.0 times which has a high probability of being desired by the operator can be easily displayed, and also advantages similar to the above descriptions can be obtained.

Next, FIG. 15(*a*) through FIG. 15(*d*) are diagrams showing a situation wherein the object displayed on the display unit 5 based on the Web browsing program is subjected to enlarging processing according to the long-pressing operations and displayed. Also, FIG. 16(*a*) shows the correlation between the time of the long-pressing operation and the enlargement scale of the object.

Figure 16A:
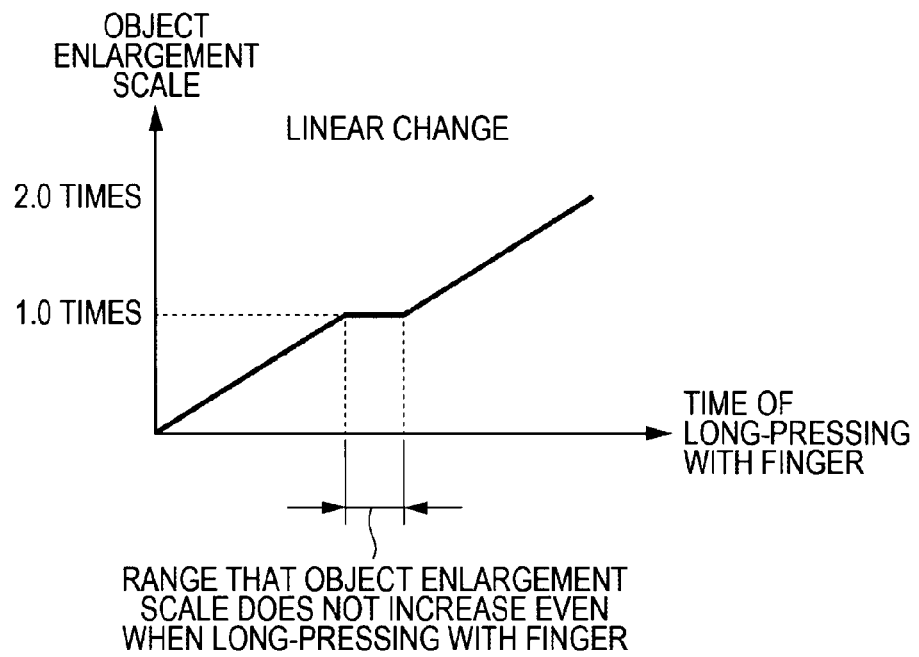
FIG. 16 is a diagram to describe the correlation between the long-pressing operation time and enlargement scale of a cellular phone according to an embodiment.
Figure 16B:
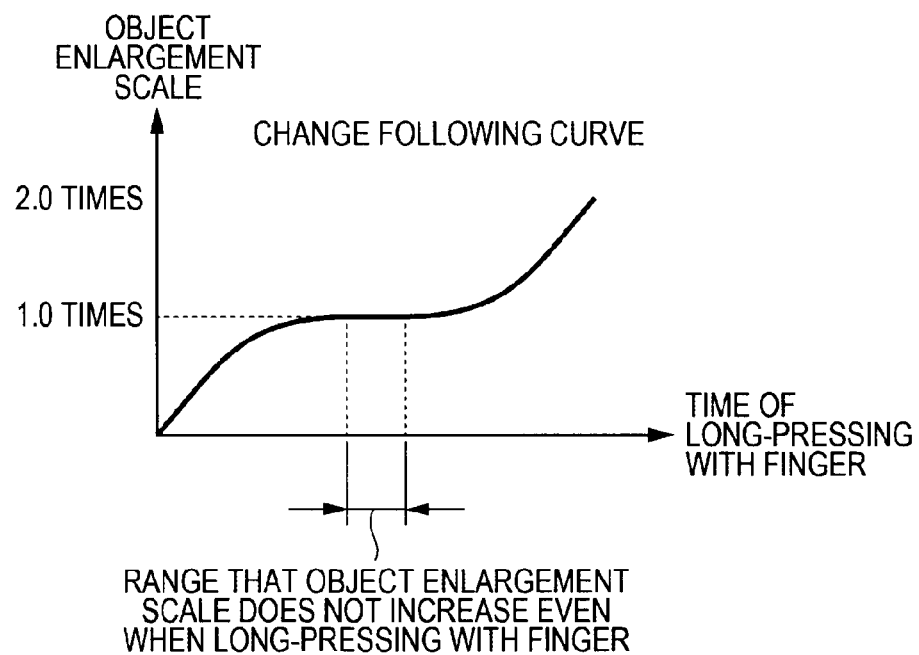
Figure 17A:
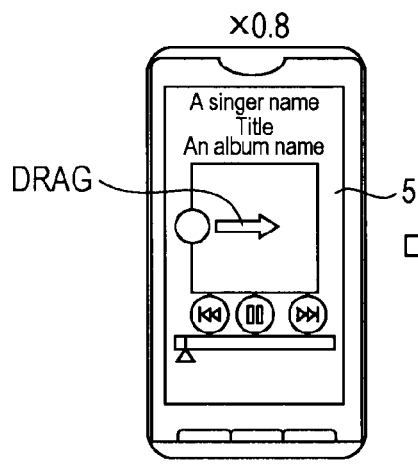
FIG. 17 is a schematic diagram to describe a switching operation of the playing speed of a music player corresponding to a dragging operation of a cellular phone according to an embodiment.
Figure 17B:
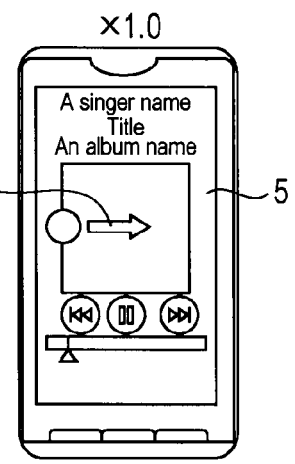
Figure 17C:
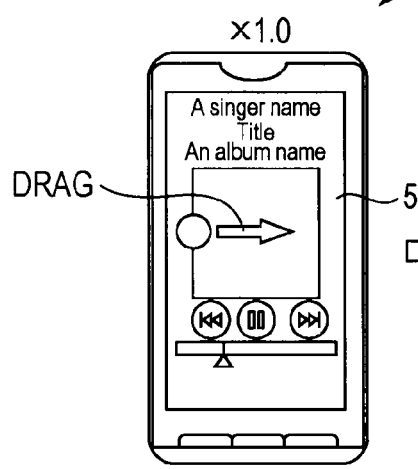
Figure 17D:
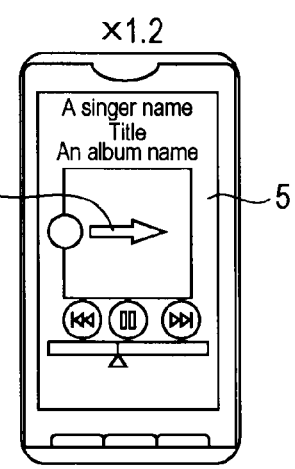

As can be seen from FIG. 16(*a*), in the case of the cellular phone, when the enlargement scale (display scale) of the object subjected to enlarging processing by a long-pressing operation by the operator is 1.0 times, regardless of the long-pressing operation being performed by the operator, the enlarging processing of the object is stopped for 200 msec for example, and at a timing that the 200 msec have elapsed, the enlarging processing of the object corresponding to the long-pressing operation of the operator is performed again.

As shown in FIG. 15(*a*) for example, the control unit 15 first displays the object on the display unit 5 at an enlargement scale of 0.8 times, performs enlargement processing of the object according to the long-pressing operation, and when the enlargement scale of the object reaches an enlargement scale of 1.0 times, stops the enlargement processing of the object for a predetermined amount of time such as 200 msec or the like, regardless of the long-pressing operation being performed as shown in FIG. 15(*b*) and FIG. 15(*c*). The control unit 15 then resumes the enlarging processing of the object as shown in FIG. 15(*d*), corresponding to the long-pressing operations of the operator, after the predetermined amount of time having elapsed.

Thus, even if the long-pressing operation is continuously performed, the enlargement scale of the object is controlled so as to temporarily be stopped at an enlargement scale of 1.0 times, the object can easily be subjected to display operations at an enlargement scale of 1.0 times. In other words, an object having an enlargement scale of 1.0 times, which has a great probability of being the desired scale of the operator, can be easily displayed.

With the example shown in FIG. 16(*a*), the enlargement scale of the object is linearly increased according to the long-pressing operation of the operator, and in the event of reaching the enlargement scale of 1.0 times, the enlargement processing is stopped for a predetermined amount of time such as 200 msec as mentioned above, and after the predetermined amount of time has elapsed, the enlargement scale of the object is again linearly increased according to the long-pressing operations by the operator.

The enlargement scale of the object is increased according to the long-pressing operations of the operator as shown in FIG. 16(*b*), and when the enlargement scale nears 1.0 times, the width of the enlargement processing is gradually reduced, whereby the enlargement scale reaches 1.0 times following a curve, and in the event of reaching the enlargement scale of 1.0 times, the enlargement processing is stopped for a predetermined amount of time such as 200 msec as shown above. After the predetermined amount of time has elapsed, the enlargement scale of the object may be increased again following a curve according to the long-pressing operation by the operator.

In this case, when the enlargement scale of the object subjected to long-pressing operations nears an enlargement scale of 1.0 times, the enlargement width of the object becomes smaller and the object reaches an enlargement scale of 1.0 times as mentioned above, and during the predetermined amount of time such as the 200 msec mentioned above, the enlarging processing is stopped. Therefore, as the enlargement scale of the object nears the enlargement scale of 1.0 times, the enlargement width gradually becomes smaller, and the enlargement processing eventually stops. Also, in the event that the enlargement processing is resumed after a predetermined amount of time having elapsed, the enlargement width gradually is increased, and eventually the enlargement processing of the object is performed linearly according to the long-pressing operations. Therefore, an enlarging processing with natural changes can be shown to the user.

Note that in the examples shown in FIG. 15(*a*) through FIG. 15(*d*) and FIG. 16(*a*) and FIG. 16(*b*), the enlargement processing is controlled to stop for a predetermined amount of time in the event that the enlargement scale reaches 1.0 times, but the enlargement scale at which to stop the enlargement processing may be optionally set by the operator or the cellular phone maker, to be other than 1.0 times.

Also, with the example shown in FIG. 15(*a*) through FIG. 15(*d*) and FIG. 16(*a*) and FIG. 16(*b*), the enlargement processing is controlled to stop for a predetermined amount of time in the event that the enlargement scale reaches 1.0 times, but the enlargement processing may be stopped for a predetermined amount of time when the enlargement scale reaches 1.0 times and when the enlargement scale reaches 2.0 times, respectively. In other words, the enlargement processing may be controlled to be stopped multiple times at desired timings of the enlargement scale, not only limited to once in the event that the enlargement scale reaches 1.0 times.

Further, the example as described above is an example in the case of enlargement operations of an object, but performing reduction operations of an object will be similar to that described above.

That is to say, in the case that long-pressing operations to specify reduction processing in the event that an object having a display scale of 2.0 times is displayed, the control unit 15 subjects the object to gradual reduction according to the long-pressing operation, and in the event that the display scale of the object reaches a display scale of 1.0 times, the long-pressing operation performed by the operator is ignored (canceled), and the reduction processing is stopped during the predetermined amount of time, e.g., 200 msec or the like. The reduction operation of the object according to long-pressing operation by the operator is resumed at a timing when the predetermined amount of time has elapsed.

Thus, upon performing long-pressing operations to specify reducing processing, the reduction scale of the still image can be controlled to be temporarily stopped at a reduction scale of 1.0 times, for example, whereby the operator can easily operate to display the object having a reduction scale of 1.0 times.

In other words, the object having a display scale of 1.0 times which has a high probability of being desired by the operator can be easily displayed, and also advantages similar to the above descriptions can be obtained.

Next, the various examples above have described the changing processing of display scale for a predetermined amount of time at a display scale thought to have high usage frequency in the event of change processing of the display scale of the object displayed on the display unit 5, based on a technical idea of the present disclosure of "during a series of variable controls for variable operations, the variable controls are stopped for a predetermined amount of time at a desired timing".

Conversely, the example described below is an example wherein, in the event of performing variable control of the playing speed of a music player, the variable control of the playing speed is stopped for a predetermined amount of time at a predetermined playing speed, based on based on a technical idea of the present disclosure described above. The specific control flow is similar to the control flow shown in the flowchart in FIG. 2.

Upon starting playing of the music data based on the music player program stored in the memory 14, the control unit 15 monitors the operational situation of the display unit 5, thereby monitoring whether or not enlarging operations are performed wherein the finger in contact with the display unit 5 is moved in the horizontal direction in a state of remaining in contact. In the case of the cellular phone according to the present embodiment, the dragging operation in the right horizontal direction at time of playing the music data means a variable operation in the direction of increasing the speed of the playing speed.

Figure 18A:
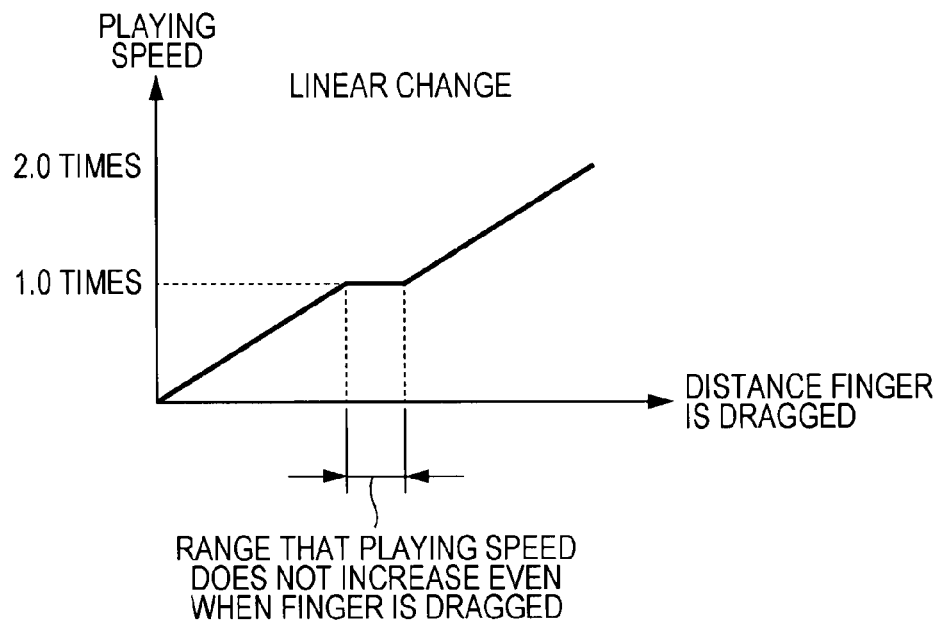
FIG. 18 is a diagram to describe the correlation between the dragging operation time and playing speed of a cellular phone according to an embodiment.
Figure 18B:
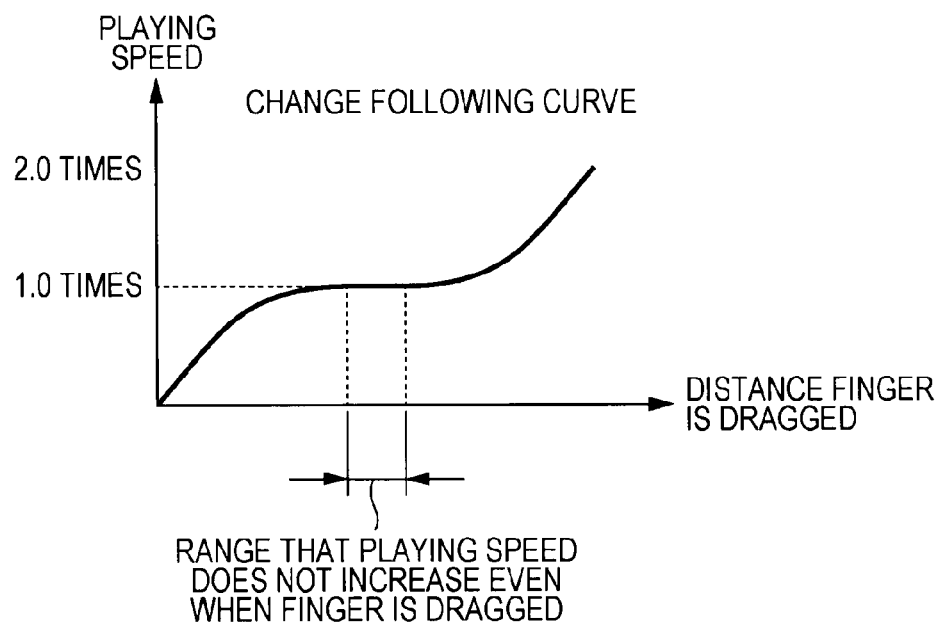

Therefore, upon detecting the dragging operation herein the control unit 15 first accelerates the playing speed from 0.1 times to 0.8 times as shown in FIG. 17(*a*), the playing speed of the music data is changed so as to gradually become a high-speed playing speed according to the dragging operation of the operator, as shown in FIG. 18(*a*).

Next, so that the playing speed will thus gradually become a high-speed playing speed, the control unit 15 subjects the playing speed of the music data to change control, whereby the dragging operation that the operator is continuously performing is cancelled with the playing speed reaches a playing speed of 1.0 times, and the change control of the playing speed is stopped for a predetermined amount of time, as shown in FIG. 17(*b*) and FIG. 17(*c*).

Next, upon the predetermined amount of time having elapsed, the control unit 15 subjects the playing speed of the music data to change control so that the playing speed gradually increases again, according to the dragging operation of the operator, as shown in FIG. 17(*d*) and FIG. 18(*a*).

Thus, even if the dragging operation is continuously performed, the playing speed of the music data is temporarily stopped at the playing speed of 1.0 times, whereby the operator can easily operate at the playing speed of 1.0 times. In other words, the playing speed can be easily operated at a playing speed of 1.0 times, which has a great probability of being the desired speed of the operator.

With the example shown in FIG. 18(*a*), the playing speed is linearly increased according to the dragging operation of the operator, and in the event of reaching the playing speed of 1.0 times, change control of the playing speed is stopped for a predetermined amount of time such as 200 msec as mentioned above, and after the predetermined amount of time has elapsed, the playing speed is again linearly increased according to the dragging operations by the operator.

The playing speed is increased according to the dragging operations of the operator as shown in FIG. 18(*b*), and when the playing speed nears 1.0 times, the width of the changing processing of the playing speed is gradually reduced, whereby the playing speed reaches 1.0 times following a curve, and in the event of reaching the playing speed of 1.0 times, the changing processing of the playing speed is stopped for a predetermined amount of time such as 200 msec as shown above. After the predetermined amount of time has elapsed, the playing speed may be increased again following a curve according to the dragging operation by the operator.

In this case, when the playing speed of the music data subjected to changing operations nears an enlargement scale of 1.0 times, the change width of the playing speed of the music data becomes smaller and the playing speed reaches a playing speed of 1.0 times as mentioned above, and during the predetermined amount of time such as the 200 msec mentioned above, the changing processing of the playing speed is stopped. Therefore, as the playing speed of the music data nears 1.0 times, the change width gradually becomes smaller, and the changing processing of the playing speed eventually stops. Also, in the event that the changing processing of the playing speed is resumed after a predetermined amount of time having elapsed, the change width gradually is increased, and eventually the changing processing of the playing speed of the music data is performed linearly according to the dragging operations. Therefore, the playing speed of the music data can be subjected to changing processing in a natural manner.

Note that in the examples shown in FIG. 17(*a*) through FIG. 17(*d*) and FIG. 18(*a*) and FIG. 18(*b*), the changing processing of the playing speed is controlled to stop for a predetermined amount of time in the event that the playing speed reaches 1.0 times, but the playing speed, including reverse playing speed, at which to stop the changing processing may be optionally set by the operator or the cellular phone maker, to be other than 1.0 times.

Also, with the example shown in FIG. 17(*a*) through FIG. 17(*d*) and FIG. 18(*a*) and FIG. 18(*b*), the changing processing of the playing speed is controlled to stop for a predetermined amount of time in the event that the playing speed reaches 1.0 times, but the changing processing of the playing speed may be stopped for a predetermined amount of time when the enlargement scale reaches 1.0 times and when the enlargement scale reaches 2.0 times, respectively. In other words, the playing processing may be controlled to be stopped multiple times at desired timings of reaching playing speeds, not only limited to once in the event that the playing speed reaches 1.0 times.

Further, the example as described above is an example in the case of increasing the speed of the music data playing speed, but decreasing the speed of the music data playing speed will be similar to that described above. That is to say, in the case of dragging operations in the left horizontal direction at time of playing the music data, this means variable operations in the direction of reducing the playing speed.

Therefore, in the event of subjecting the playing speed of the music data to change control to be a playing speed of 2.0 times, when a dragging operation in the left horizontal direction is detected, the control unit 15 gradually reduces the playing speed of the music data from the playing speed of 2.0 times, according to the dragging operation, and in the event that the playing speed is a playing speed of 1.0 times, the dragging operation performed by the operator is cancelled for a predetermined amount of time such as 200 msec, for example, and stops the changing processing of the playing speed for the predetermined amount of time. The change processing of the playing speed according to the dragging operation by the operator is resumed at a timing when the predetermined amount of time has elapsed.

Thus, even if continuous dragging operations are performed, the changing processing of the playing speed can be controlled to be temporarily stopped at a playing speed of 1.0 times, for example. Therefore, the operator can easily adjust the playing speed of the music data to be a playing speed of 1.0 times. In other words, the playing speed of the music data can be adjusted to be a playing speed of 1.0 times which has a high probability of being desired by the operator.

Next, change control of the music data playing speed with flicking operations will be described.

Figure 19A:
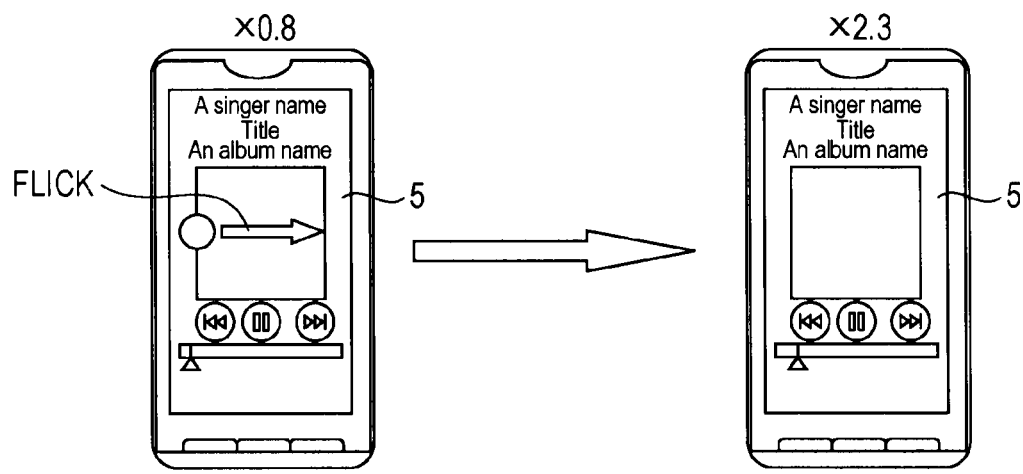
FIG. 19 is a schematic diagram to describe a switching operation of the playing speed of a music player corresponding to a flicking operation of a cellular phone according to an embodiment.
Figure 19B:
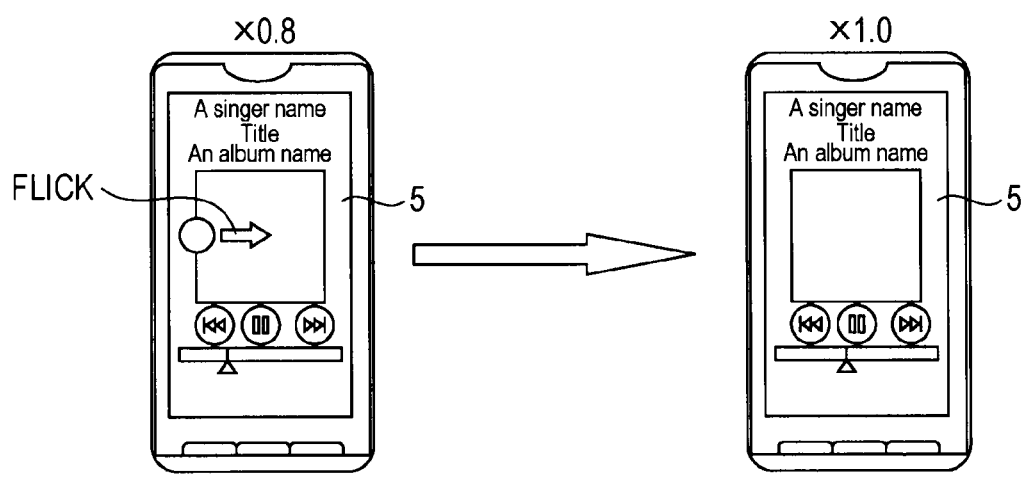

FIG. 19(a) and FIG. 19(b) are schematic diagrams to describe the change control of the music data playing speed that the control unit 15 performs based on the music player program. Also, FIG. 20(a) shows the correlation between the strength of the flicking operation and the playing speed.

As an example, in the case of the cellular phone in the present embodiment, in the event of increasing the playing speed of the music data, the operator performs a flicking operation in the right horizontal direction.

Figure 20A:
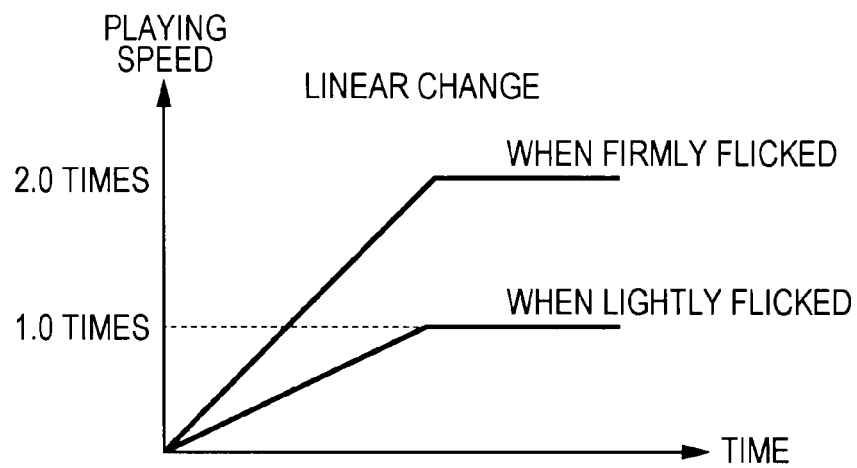
FIG. 20 is a diagram to describe the correlation between the flicking operation time and playing speed of a cellular phone according to an embodiment.

As can be seen from FIG. 20(a), in the case of the cellular phone, in the case that a strong flicking operation is performed in the right horizontal direction, the music data playing speed is subjected to change control according to the strength of the flicking operation, and in the case that a weak flicking operation is performed in the right horizontal direction, the changing processing of the music data playing speed is temporarily stopped at the above-described playing speed of 1.0 times.

To detect the strength or weakness of the flicking operation, the control unit 15 computes "operational distance of flicking operation/flicking operation time", whereby "operational speed of flicking operation" is computed. In the case that the operational speed herein is faster than the predetermined operational speed (i.e. operational speed serving as a threshold), this means that a strong flicking operation is performed, and in the case that the operational speed herein is slower than the predetermined operational speed, this means that a weak flicking operation is performed.

Therefore, in the case that the control unit 15 detects a strong flicking operation which is a high speed flicking operation, as shown in FIG. 19(a) and FIG. 20(a), the change control of the playing speed is not stopped at the playing speed of 1.0 times as with the description above, but the music data playing speed is controlled to be the playing speed corresponding to the strength of the flicking operation.

Conversely, in the case that the control unit 15 detects a weak flicking operation which is a slow speed flicking operation, as shown in FIG. 19(b) and FIG. 20(a), the change control of the playing speed is stopped at the enlargement scale of 1.0 times as with the description above. In the case that a flicking operation is performed again after this stopping, the music data playing speed is controlled to be the playing speed corresponding to the strength of the flicking operation.

Thus, when a weak flicking operation is performed, the change control of the music data playing speed is controlled to be temporarily stopped at an enlargement scale of 1.0 times, whereby the operator can easily set the music data playing speed to be the playing speed of 1.0 times. In other words, the music data playing speed can be easily set to be the playing speed of 1.0 times which has a high probability of being desired by the operator.

Figure 20B:
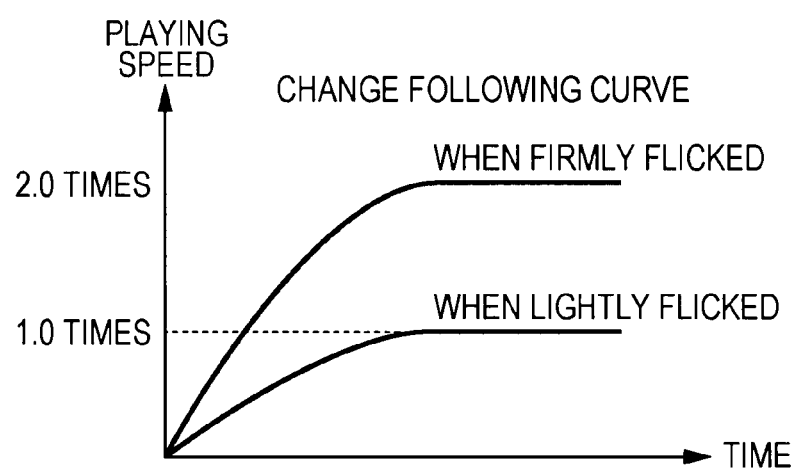

Note that in the event that the playing speed is gradually increased according to a weak flicking operation by the operator and the playing speed nears 1.0 times as shown in FIG. 20(b), the playing speed may be caused to reach 1.0 times following a curve by gradually reducing the change width of the playing speed, and in the event of reaching a playing speed of 1.0 times the change control of the playing speed may be stopped.

Thus, as the music data playing speed nears the playing speed of 1.0 times, the playing speed change width is gradually decreased, and the playing speed change processing eventually is stopped, whereby the playing speed can be changed in a natural manner.

Also, according to the example herein, in the event that the playing speed reaches 1.0 times, the change of the playing speed is controlled to be stopped, but even if the playing speed to stop the change control is other than 1.0 times including the reverse playing direction, this can be set optionally by the operator or the maker of the cellular phone.

Further, performing reduction in the music data playing speed will be similar to that described above. That is to say, in the case of the cellular phone herein, a flicking operation in the left horizontal direction at time of playing the music data is an operation to specify reduction of the playing speed.

Therefore, when a weak flicking operation in the left horizontal direction is detected in the event of changing the playing speed of the music data playing speed to be 2.0 times, the control unit 15 gradually reduces the music data playing speed according to the weak flicking operation in the left horizontal direction, and in the event that the music data playing speed reaches a playing speed of 1.0 times, the change control of the playing speed is temporarily stopped.

Thus, even in the case of operating the music data playing speed at a slow speed, the music data playing speed can be controlled to be temporarily stopped at a playing speed of 1.0 times, for example. Therefore, even in the case of operating the music data playing speed at a slow speed, the operator can easily adjust the music data playing speed to be a playing speed of 1.0 times. In other words, the music data playing speed can be easily adjusted to be 1.0 times which has a high probability of being desired by the operator.

Next, change control of the music data playing speed with long-pressing operations will be described.

FIG. 21(a) through FIG. 21(d) are schematic diagrams to describe the change control of the music data playing speed performed by the control unit 15 according to long-pressing operations by the operator, based on the music player program. Also, FIG. 22(a) is a diagram showing the correlation between the time of the long-pressing operation and the playing speed.

Upon starting playing of the music data based on the music player program stored in the memory 14, the control unit 15 monitors the operational situation of the display unit 5, thereby monitoring whether or not long-pressing operations are performed wherein a finger presses the display unit 5 for a predetermined amount of time. In the case of the cellular phone according to the present embodiment, the long-pressing operation with one finger at time of playing the music data means a variable operation in the direction of increasing the speed of the playing speed. Note that although described later, a long-pressing operation with two fingers at the time of music data playing means a variable operation in the direction of decreasing the speed of the playing speed.

Figure 21A:
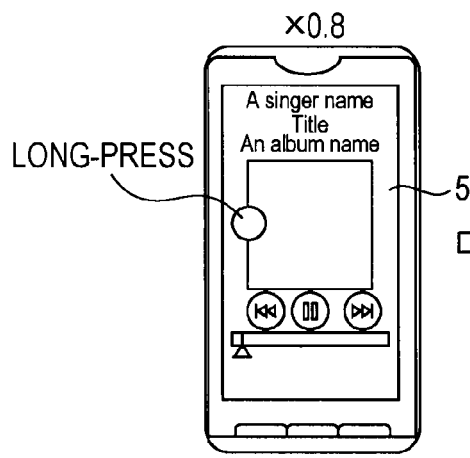
FIG. 21 is a schematic diagram to describe a switching operation of the playing speed of a music player corresponding to a long-pressing operation of a cellular phone according to an embodiment.
Figure 22A:
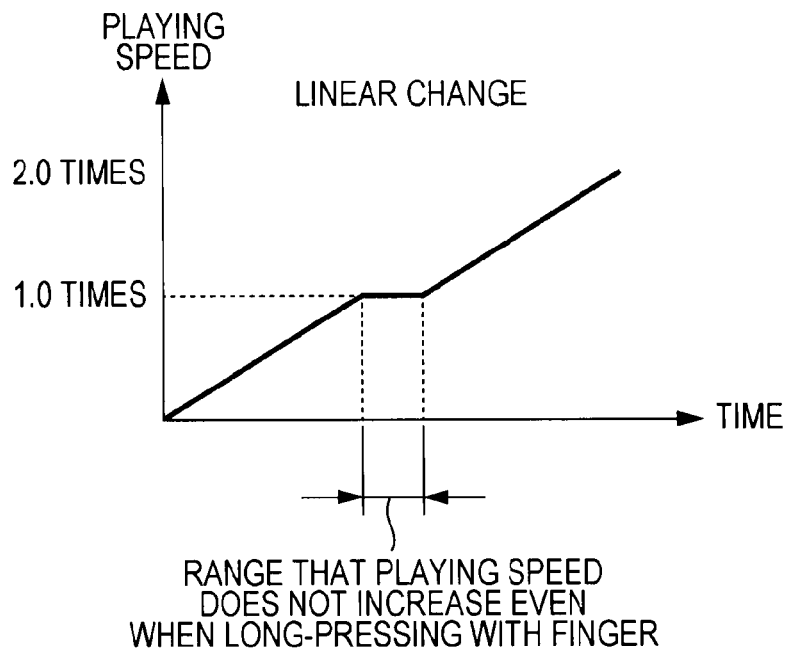
FIG. 22 is a diagram to describe the correlation between the long-pressing operation time and playing speed of a cellular phone according to an embodiment.

Therefore, upon detecting the long-pressing operation with one finger herein the control unit 15 first accelerates the playing speed from 0.1 times to 0.8 times as shown in FIG. 21(a), the playing speed of the music data is changed so as to gradually become a high-speed playing speed according to the long-pressing operation of the operator, as shown in FIG. 22(a).

Figure 21B:
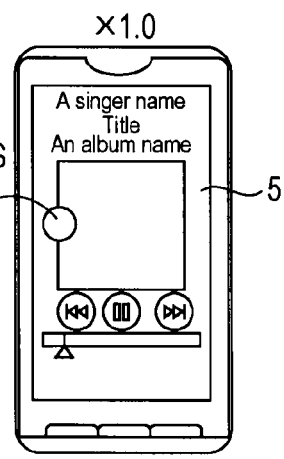
Figure 21C:
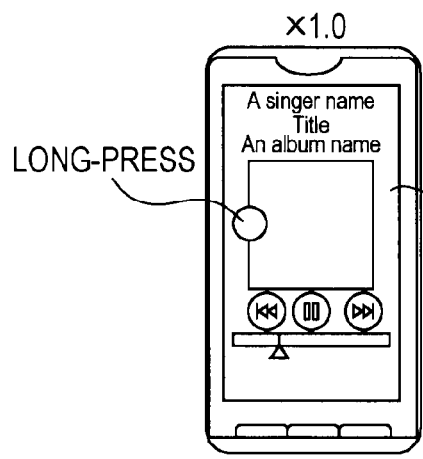

Next, so that the playing speed will thus gradually become a high-speed playing speed, the control unit 15 subjects the playing speed of the music data to change control, whereby the long-pressing operation that the operator is continuously performing is cancelled when the playing speed reaches a playing speed of 1.0 times, and the change control of the playing speed is stopped for a predetermined amount of time, as shown in FIG. 21(b) and FIG. 21(c).

Figure 21D:
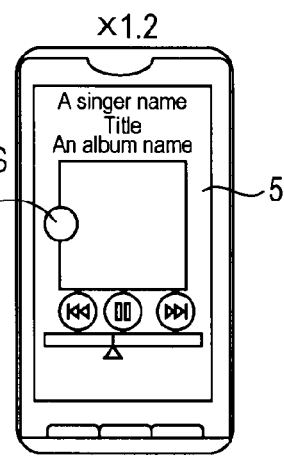

Next, upon the predetermined amount of time having elapsed, the control unit 15 subjects the playing speed of the music data to change control so that the playing speed gradually increases again, according to the long-pressing operation of the operator, as shown in FIG. 21(d) and FIG. 22(a).

Thus, even if the long-pressing operation is continuously performed, the playing speed of the music data is temporarily stopped at the playing speed of 1.0 times, whereby the operator can easily operate at the playing speed of 1.0 times. In other words, the playing speed can be easily operated at a playing speed of 1.0 times, which has a great probability of being the desired speed of the operator.

With the example shown in FIG. 22(a), the playing speed is linearly increased according to the dragging operation of the operator, and in the event of reaching the playing speed of 1.0 times, change control of the playing speed is stopped for a predetermined amount of time such as 200 msec as mentioned above, and after the predetermined amount of time has elapsed, the playing speed is again linearly increased according to the long-pressing operations by the operator.

Figure 22B:
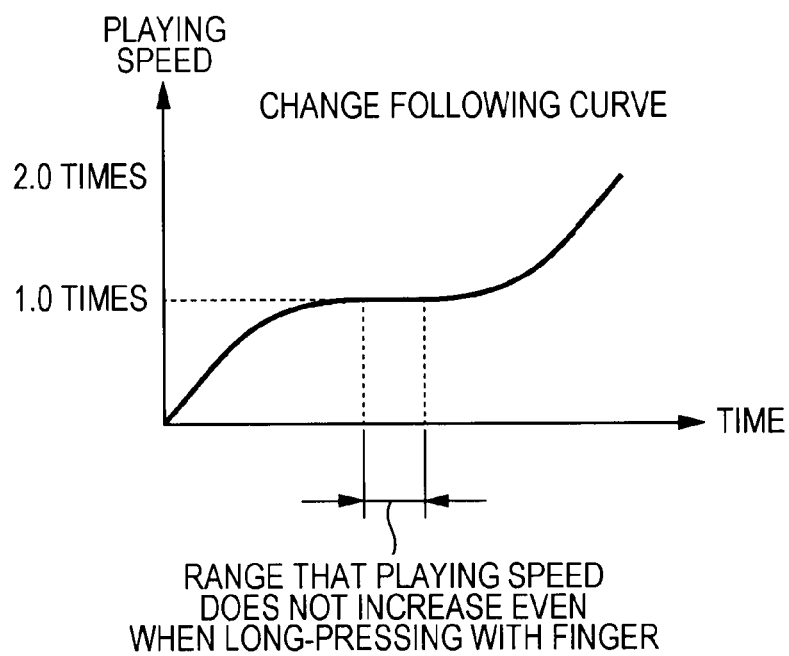

The playing speed is increased according to the long-pressing operations of the operator as shown in FIG. 22(b), and when the playing speed nears 1.0 times, the width of the changing processing of the playing speed is gradually reduced, whereby the playing speed reaches 1.0 times following a curve, and in the event of reaching the playing speed of 1.0 times, the changing processing of the playing speed is stopped for a predetermined amount of time such as 200 msec as shown above. After the predetermined amount of time has elapsed, the playing speed may be increased again following a curve according to the dragging operation by the operator.

In this case, when the playing speed of the music data subjected to changing operations nears an enlargement scale of 1.0 times, the change width of the playing speed of the music data becomes smaller and the playing speed reaches a playing speed of 1.0 times as mentioned above, and during the predetermined amount of time such as the 200 msec mentioned above, the changing processing of the playing speed is stopped. Therefore, as the playing speed of the music data nears 1.0 times, the change width gradually becomes smaller, and the changing processing of the playing speed eventually stops. Also, in the event that the changing processing of the playing speed is resumed after a predetermined amount of time having elapsed, the change width gradually is increased, and eventually the changing processing of the playing speed of the music data is performed linearly according to the dragging operations. Therefore, the playing speed of the music data can be subjected to changing processing in a natural manner.

Note that in the examples shown in FIG. 21(a) through FIG. 21(d) and FIG. 22(a) and FIG. 22(b), the changing processing of the playing speed is controlled to stop for a predetermined amount of time in the event that the playing speed reaches 1.0 times, but the playing speed at which to stop the changing processing may be optionally set by the operator or the cellular phone maker, to be other than 1.0 times.

Also, with the example shown in FIG. 21(a) through FIG. 21(d) and FIG. 22(a) and FIG. 22(b), the changing processing of the playing speed is controlled to stop for a predetermined amount of time in the event that the playing speed reaches 1.0 times, but the changing processing of the playing speed may be stopped for a predetermined amount of time when the enlargement scale reaches 1.0 times and when the enlargement scale reaches 2.0 times, respectively. In other words, the playing processing may be controlled to be stopped multiple times at desired timings of reaching playing speeds, not only limited to once in the event that the playing speed reaches 1.0 times.

Further, the example as described above is an example in the case of increasing the speed of the music data playing speed, but decreasing the speed of the music data playing speed will be similar to that described above. That is to say, in the case of long-pressing operations with two fingers as described above, this means variable operations in the direction of reducing the playing speed.

Therefore, in the event of subjecting the playing speed of the music data to change control to be a playing speed of 2.0 times, when a long-pressing operations with two fingers as described above is detected, the control unit 15 gradually reduces the playing speed of the music data from the playing speed of 2.0 times, according to the long-pressing operation, and in the event that the playing speed is a playing speed of 1.0 times, the long-pressing operations with two fingers performed by the operator is cancelled for a predetermined amount of time such as 200 msec, for example, and stops the changing processing of the playing speed for the predetermined amount of time. The change processing of the playing speed according to the long-pressing operations with two fingers by the operator is resumed at a timing when the predetermined amount of time has elapsed.

Thus, even if continuous long-pressing operations with two fingers are performed, the changing processing of the playing speed can be controlled to be temporarily stopped at a playing speed of 1.0 times, for example. Therefore, the operator can easily adjust the playing speed of the music data to be a playing speed of 1.0 times. In other words, the playing speed of the music data can be adjusted to be a playing speed of 1.0 times which has a high probability of being desired by the operator.

Next, the above-described example is an example of operations to change the playing speed of music data, but change control of the playing speed of moving picture data according to various operations will be described below.

Upon starting playing of the moving picture data based on the moving picture player program of the camera control program stored in the memory 14, the control unit 15 monitors the operational situation of the display unit 5, thereby monitoring whether or not dragging operations are performed wherein the finger in contact with the display unit 5 is moved in the horizontal direction in a state of remaining in contact. In the case of the cellular phone according to the present embodiment, the dragging operation in the right horizontal direction at time of playing the moving picture data means a variable operation in the direction of increasing the speed of the playing speed.

Figure 23A:
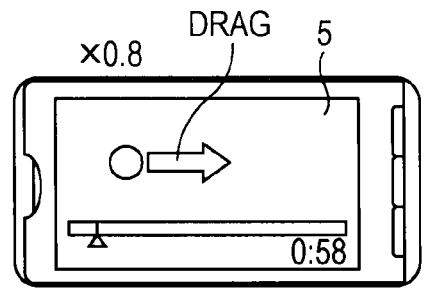
FIG. 23 is a schematic diagram to describe a switching operation of the playing speed of a moving picture player corresponding to a dragging operation of a cellular phone according to an embodiment.
Figure 24A:
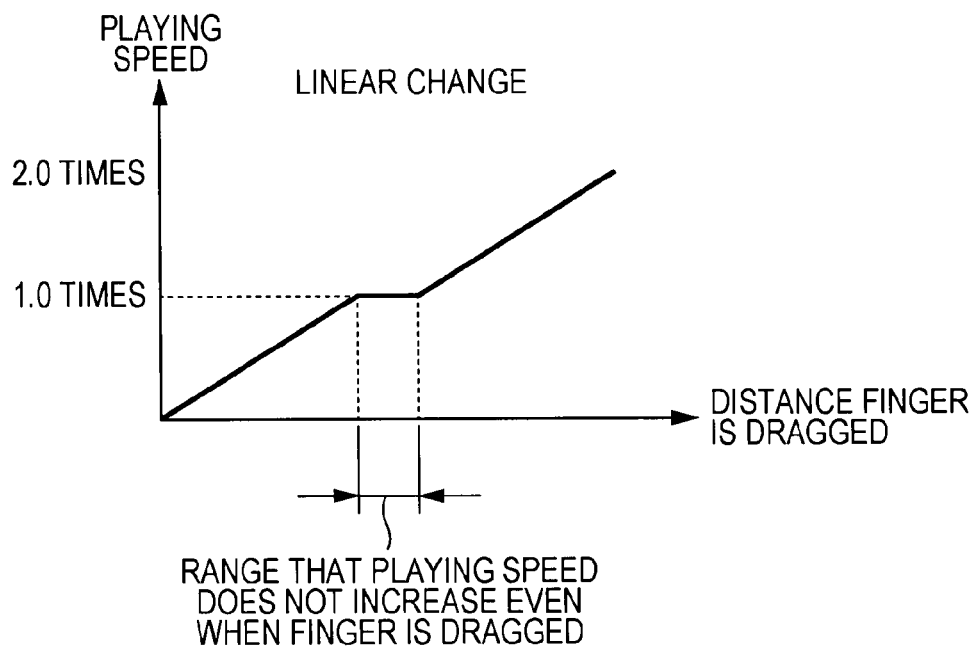
FIG. 24 is a diagram to describe the correlation between the dragging operation time and playing speed of a cellular phone according to an embodiment.

Therefore, upon detecting the dragging operation herein the control unit 15 first reduces the playing speed to 0.8 times as shown in FIG. 23(a), the playing speed of the moving picture data is changed so as to gradually become a high-speed playing speed according to the dragging operation of the operator, as shown in FIG. 24(a).

Figure 23B:
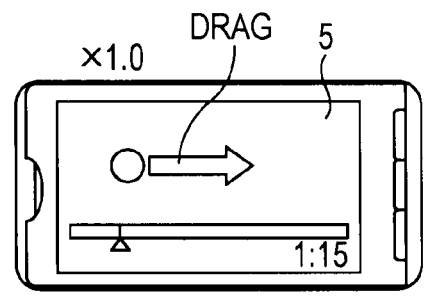
Figure 23C:
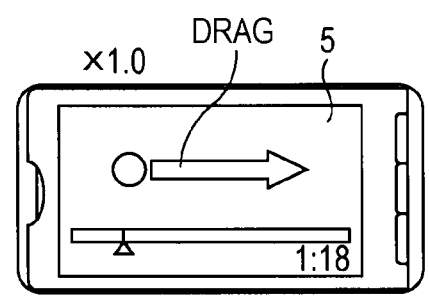

Next, so that the playing speed will thus gradually become a high-speed playing speed, the control unit 15 subjects the playing speed of the moving picture data to change control, whereby the dragging operation that the operator is continuously performing is cancelled when the playing speed reaches a playing speed of 1.0 times, and the change control of the playing speed is stopped for a predetermined amount of time, as shown in FIG. 23(b) and FIG. 23(c).

Figure 23D:
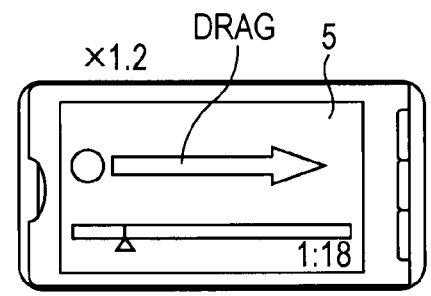

Next, upon the predetermined amount of time having elapsed, the control unit 15 subjects the playing speed of the moving picture data to change control so that the playing speed gradually increases again, according to the dragging operation of the operator, as shown in FIG. 23(d) and FIG. 24(a).

Thus, even if the dragging operation is continuously performed, the playing speed of the moving picture data is temporarily stopped at the playing speed of 1.0 times, whereby the operator can easily operate at the playing speed of 1.0 times. In other words, the playing speed can be easily operated at a playing speed of 1.0 times, which has a great probability of being the desired speed of the operator.

With the example shown in FIG. 24(a), the playing speed is linearly increased according to the dragging operation of the operator, and in the event of reaching the playing speed of 1.0 times, change control of the playing speed is stopped for a predetermined amount of time such as 200 msec as mentioned above, and after the predetermined amount of time has elapsed, the playing speed is again linearly increased according to the dragging operations by the operator.

Figure 24B:
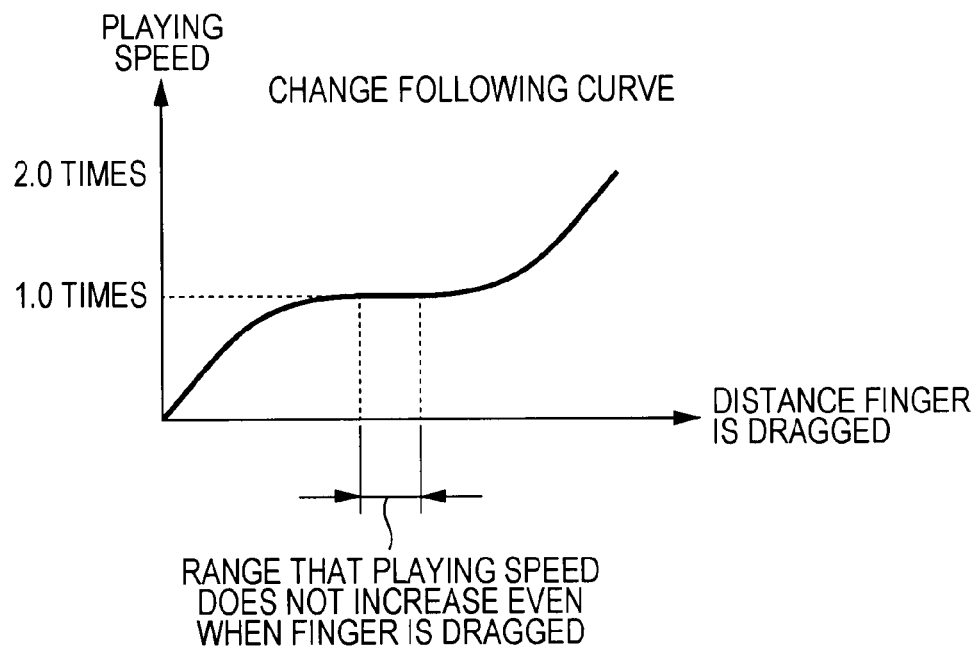

The playing speed is increased according to the dragging operations of the operator as shown in FIG. 24(b), and when the playing speed nears 1.0 times, the width of the changing processing of the playing speed is gradually reduced, whereby the playing speed reaches 1.0 times following a curve, and in the event of reaching the playing speed of 1.0 times, the changing processing of the playing speed is stopped for a predetermined amount of time such as 200 msec as shown above. After the predetermined amount of time has elapsed, the playing speed may be increased again following a curve according to the dragging operation by the operator.

In this case, when the playing speed of the moving picture data subjected to changing operations nears an enlargement scale of 1.0 times, the change width of the playing speed of the moving picture data becomes smaller and the playing speed reaches a playing speed of 1.0 times as mentioned above, and during the predetermined amount of time such as the 200 msec mentioned above, the changing processing of the playing speed is stopped. Therefore, as the playing speed of the moving picture data nears 1.0 times, the change width gradually becomes smaller, and the changing processing of the playing speed eventually stops. Also, in the event that the changing processing of the playing speed is resumed after a predetermined amount of time having elapsed, the change width gradually is increased, and eventually the changing processing of the playing speed of the moving picture data is performed linearly according to the dragging operations. Therefore, the playing speed of the moving picture data can be subjected to changing processing in a natural manner.

Note that in the examples shown in FIG. 23(a) through FIG. 23(d) and FIG. 24(a) and FIG. 24(b), the changing processing of the playing speed is controlled to stop for a predetermined amount of time in the event that the playing speed reaches 1.0 times, but the playing speed at which to stop the changing processing may be optionally set by the operator or the cellular phone maker, to be other than 1.0 times.

Also, with the example shown in FIG. 23(a) through FIG. 23(d) and FIG. 24(a) and FIG. 24(b), the changing processing of the playing speed is controlled to stop for a predetermined amount of time in the event that the playing speed reaches 1.0 times, but the changing processing of the playing speed may be stopped for a predetermined amount of time when the enlargement scale reaches 1.0 times and when the enlargement scale reaches 2.0 times, respectively. In other words, the playing processing may be controlled to be stopped multiple times at desired timings of reaching playing speeds, not only limited to once in the event that the playing speed reaches 1.0 times.

Further, the example as described above is an example in the case of increasing the speed of the moving picture data playing speed, but decreasing the speed of the moving picture data playing speed will be similar to that described above. That is to say, in the case of dragging operations in the left horizontal direction at time of playing the moving picture data, this means variable operations in the direction of reducing the playing speed.

Therefore, in the event of subjecting the playing speed of the moving picture data to change control to be a playing speed of 2.0 times, when a dragging operation in the left horizontal direction is detected, the control unit 15 gradually reduces the playing speed of the moving picture data from the playing speed of 2.0 times, according to the dragging operation, and in the event that the playing speed is a playing speed of 1.0 times, the dragging operation performed by the operator is cancelled for a predetermined amount of time such as 200 msec, for example, and stops the changing processing of the playing speed for the predetermined amount of time. The change processing of the playing speed according to the dragging operation by the operator is resumed at a timing when the predetermined amount of time has elapsed.

Thus, even if continuous dragging operations are performed in the left horizontal direction, the changing processing of the playing speed can be controlled to be temporarily stopped at a playing speed of 1.0 times, for example. Therefore, the operator can easily adjust the playing speed of the moving picture data to be a playing speed of 1.0 times. In other words, the playing speed of the moving picture data can be adjusted to be a playing speed of 1.0 times which has a high probability of being desired by the operator.

Next, change control of the moving picture data playing speed with flicking operations will be described.

Figure 25A:
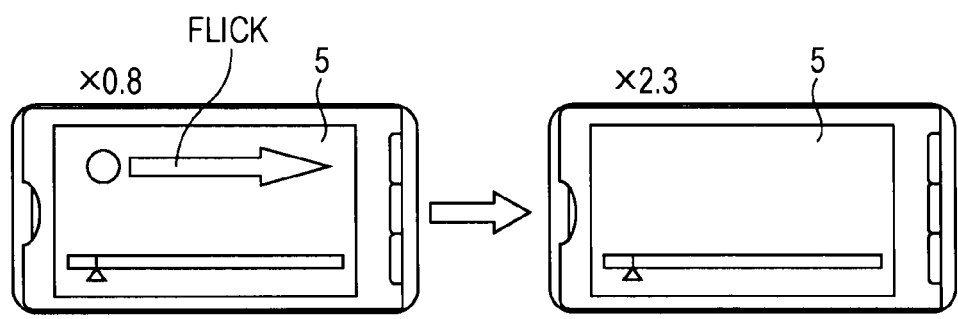
FIG. 25 is a schematic diagram to describe a switching operation of the playing speed of a moving picture player corresponding to a flicking operation of a cellular phone according to an embodiment.
Figure 25B:
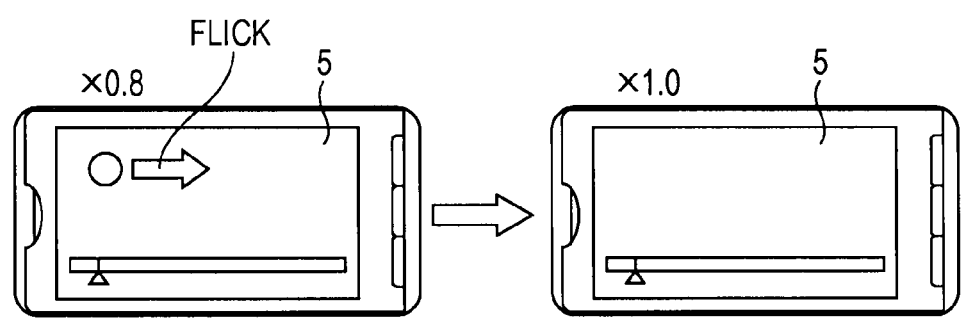
Figure 26A:
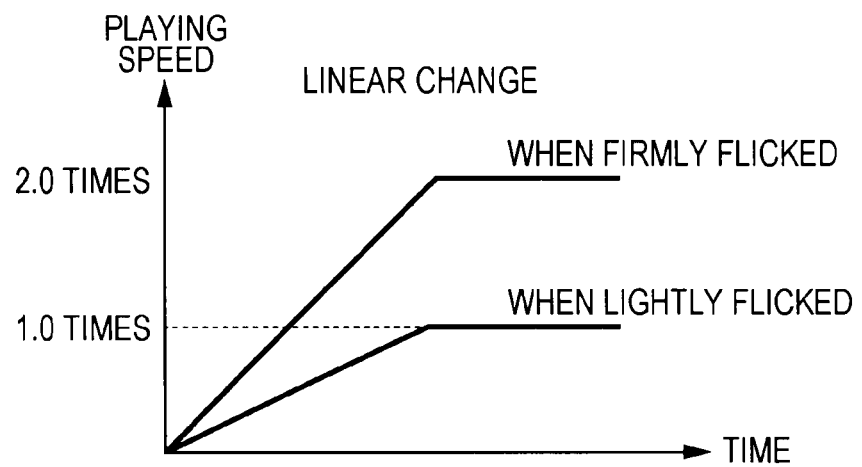
FIG. 26 is a diagram to describe the correlation between the flicking operation strength and playing speed of a cellular phone according to an embodiment.

FIG. 25(a) and FIG. 25(b) are schematic diagrams to describe the change control of the moving picture data playing speed that the control unit 15 performs based on the music player program. Also, FIG. 26(a) shows the correlation between the strength of the flicking operation and the playing speed.

As an example, in the case of the cellular phone in the present embodiment, in the event of increasing the playing speed of the moving picture data, the operator performs a flicking operation in the right horizontal direction.

As can be seen from FIG. 20(a), in the case of the cellular phone, in the case that a strong flicking operation is performed in the right horizontal direction, the moving picture data playing speed is subjected to change control according to the strength of the flicking operation, and in the case that a weak flicking operation is performed in the right horizontal direction, the changing processing of the moving picture data playing speed is temporarily stopped at the above-described playing speed of 1.0 times.

To detect the strength or weakness of the flicking operation, the control unit 15 computes "operational distance of flicking operation/flicking operation time", whereby "operational speed of flicking operation" is computed. In the case that the operational speed herein is faster than the predetermined operational speed (i.e. operational speed serving as a threshold), this means that a strong flicking operation is performed, and in the case that the operational speed herein is slower than the predetermined operational speed, this means that a weak flicking operation is performed.

Figure 26B:
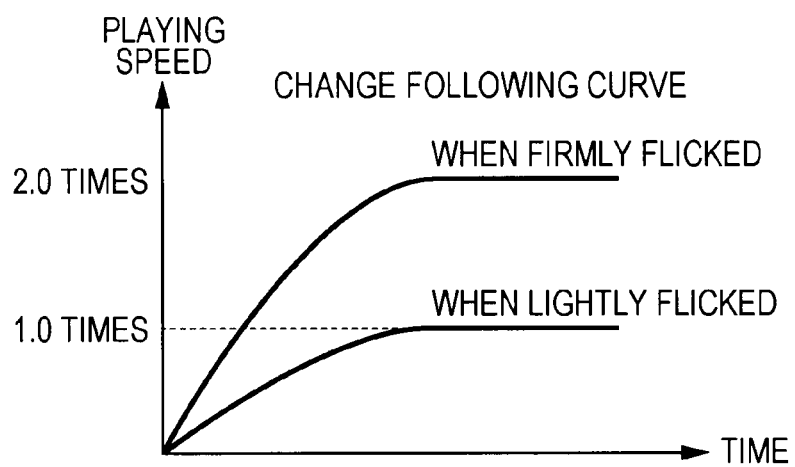
Figure 27A:
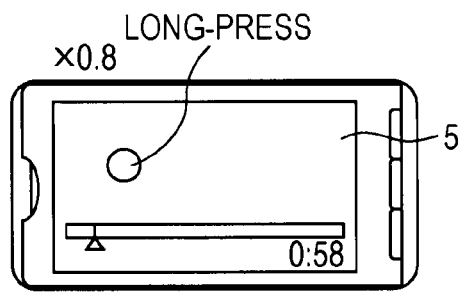
FIG. 27 is a schematic diagram to describe a switching operation of the playing speed of a moving picture player corresponding to a long-pressing operation of a cellular phone according to an embodiment.
Figure 27B:
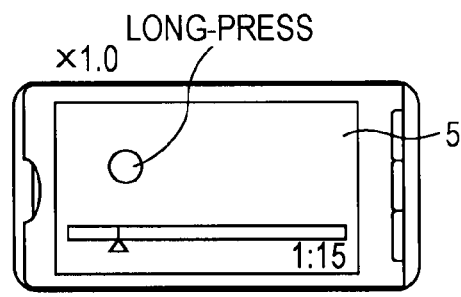
Figure 27C:
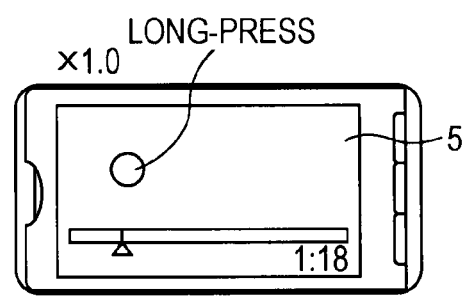
Figure 27D:
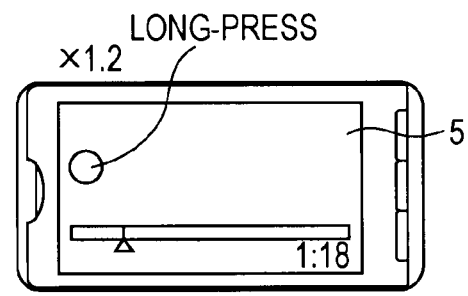

Therefore, in the case that the control unit 15 detects a strong flicking operation which is a high speed flicking operation, as shown in FIG. 25(*a*) and FIG. 26(*a*), the change control of the playing speed is not stopped at the playing speed of 1.0 times as with the description above, but the moving picture data playing speed is controlled to be the playing speed corresponding to the strength of the flicking operation.

Conversely, in the case that the control unit 15 detects a weak flicking operation which is a slow speed flicking operation, as shown in FIG. 25(*b*) and FIG. 26(*a*), the change control of the moving picture playing speed is stopped at the playing speed of 1.0 times as with the description above. In the case that a flicking operation is performed again after this stopping, the moving picture data playing speed is controlled to be the playing speed corresponding to the strength of the flicking operation.

Thus, when a weak flicking operation is performed, the change control of the moving picture data playing speed is controlled to be temporarily stopped at an enlargement scale of 1.0 times, whereby the operator can easily set the moving picture data playing speed to be the playing speed of 1.0 times. In other words, the moving picture data playing speed can be easily set to be the playing speed of 1.0 times which has a high probability of being desired by the operator.

Note that in the event that the playing speed is gradually increased according to a weak flicking operation by the operator and the playing speed nears 1.0 times as shown in FIG. 26(*b*), the playing speed may be caused to reach 1.0 times following a curve by gradually reducing the change width of the playing speed, and in the event of reaching a playing speed of 1.0 times the change control of the playing speed may be stopped.

Thus, as the moving picture data playing speed nears the playing speed of 1.0 times, the playing speed change width is gradually decreased, and the playing speed change processing eventually is stopped, whereby the playing speed of the moving picture data can be changed in a natural manner.

Also, according to the example herein, in the event that the playing speed reaches 1.0 times, the change of the playing speed is controlled to be stopped, but even if the playing speed to stop the change control is other than 1.0 times, this can be set optionally by the operator or the maker of the cellular phone.

Further, performing reduction in the moving picture data playing speed will be similar to that described above. That is to say, in the case of the cellular phone herein, a flicking operation in the left horizontal direction at time of playing the moving picture data is an operation to specify reduction of the playing speed.

Therefore, when a weak flicking operation in the left horizontal direction is detected in the event of changing the playing speed of the moving picture data playing speed to be 2.0 times, the control unit 15 gradually reduces the moving picture data playing speed according to the weak flicking operation in the left horizontal direction, and in the event that the moving picture data playing speed reaches a playing speed of 1.0 times, the change control of the playing speed is temporarily stopped.

Thus, even in the case of operating the moving picture data playing speed at a slow speed, the moving picture data playing speed can be controlled to be temporarily stopped at a playing speed of 1.0 times, for example. Therefore, even in the case of operating the moving picture data playing speed at a slow speed, the operator can easily adjust the moving picture data playing speed to be a playing speed of 1.0 times. In other words, the moving picture data playing speed can be easily adjusted to be 1.0 times which has a high probability of being desired by the operator.

Next, change control of the moving picture data playing speed with long-pressing operations will be described.

Figure 28A:
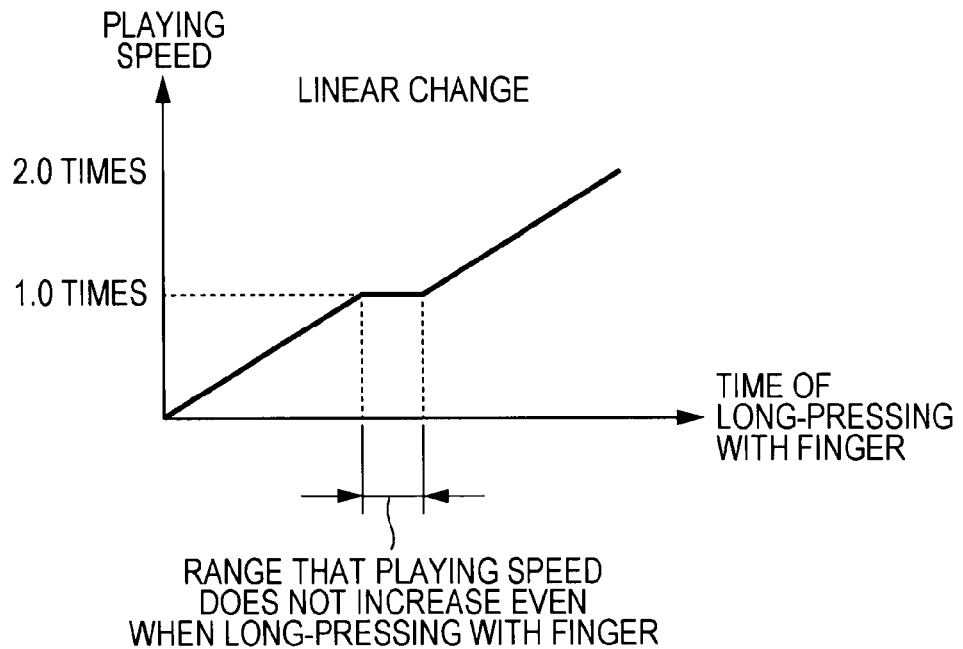
FIG. 28 is a diagram to describe the correlation between the long-pressing operation time and playing speed of a cellular phone according to an embodiment.
Figure 28B:
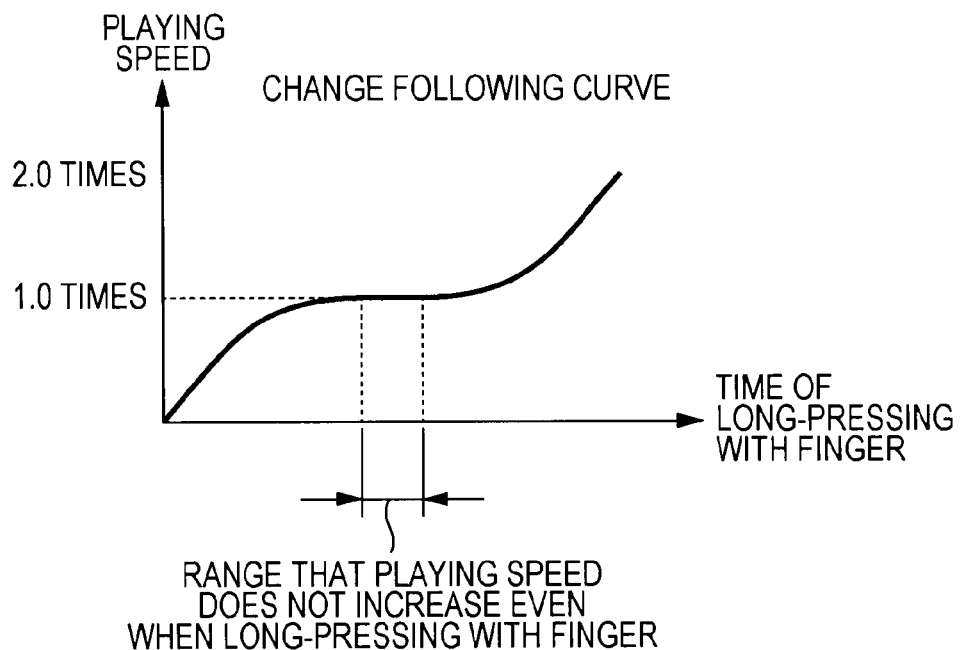

FIG. 27(*a*) through FIG. 27(*d*) are schematic diagrams to describe the change control of the moving picture data playing speed performed by the control unit 15 according to long-pressing operations by the operator, based on the moving picture player program. Also, FIG. 28(*a*) is a diagram showing the correlation between the time of the long-pressing operation and the playing speed.

Upon starting playing of the moving picture data based on the moving picture player program stored in the memory 14, the control unit 15 monitors the operational situation of the display unit 5, thereby monitoring whether or not long-pressing operations are performed wherein a finger presses the display unit 5 for a predetermined amount of time. In the case of the cellular phone according to the present embodiment, the long-pressing operation with one finger at time of playing the moving picture data means a variable operation in the direction of increasing the speed of the playing speed. Note that although described later, a long-pressing operation with two fingers at the time of moving picture data playing means a variable operation in the direction of decreasing the speed of the playing speed.

Therefore, upon detecting the long-pressing operation with one finger herein the control unit 15 first reduces the playing speed to 0.8 times as shown in FIG. 27(*a*), the playing speed of the moving picture data is changed so as to gradually become a high-speed playing speed according to the long-pressing operation of the operator, as shown in FIG. 28(*a*).

Next, so that the playing speed will thus gradually become a high-speed playing speed, the control unit 15 subjects the playing speed of the moving picture data to change control, whereby the long-pressing operation that the operator is continuously performing is cancelled when the playing speed reaches a playing speed of 1.0 times, and the change control of the playing speed is stopped for a predetermined amount of time, as shown in FIG. 27(*b*) and FIG. 27(*c*).

Next, upon the predetermined amount of time having elapsed, the control unit 15 subjects the playing speed of the moving picture data to change control so that the playing speed gradually increases again, according to the long-pressing operation of the operator, as shown in FIG. 27(*d*) and FIG. 28(*a*).

Thus, even if the long-pressing operation is continuously performed, the playing speed of the moving picture data is temporarily stopped at the playing speed of 1.0 times, whereby the operator can easily operate at the playing speed of 1.0 times. In other words, the playing speed can be easily operated at a playing speed of 1.0 times, which has a great probability of being the desired speed of the operator.

With the example shown in FIG. 28(*a*), the playing speed is linearly increased according to the long-pressing operation of the operator, and in the event of reaching the playing speed of 1.0 times, change control of the playing speed is stopped for a predetermined amount of time such as 200 msec as mentioned above, and after the predetermined amount of time has elapsed, the playing speed is again linearly increased according to the long-pressing operations by the operator.

The playing speed is increased according to the long-pressing operations of the operator as shown in FIG. 28(*b*), and when the playing speed nears 1.0 times, the width of the changing processing of the playing speed is gradually reduced, whereby the playing speed reaches 1.0 times following a curve, and in the event of reaching the playing speed of 1.0 times, the changing processing of the playing speed is stopped for a predetermined amount of time such as 200 msec as shown above. After the predetermined amount of time has elapsed, the playing speed may be increased again following a curve according to the long-pressing operation by the operator.

In this case, when the playing speed of the moving picture data subjected to changing operations nears an enlargement scale of 1.0 times, the change width of the playing speed of the moving picture data becomes smaller and the playing speed reaches a playing speed of 1.0 times as mentioned above, and during the predetermined amount of time such as the 200 msec mentioned above, the changing processing of the playing speed is stopped. Therefore, as the playing speed of the moving picture data nears 1.0 times, the change width gradually becomes smaller, and the changing processing of the playing speed eventually stops. Also, in the event that the changing processing of the playing speed is resumed after a predetermined amount of time having elapsed, the change width gradually is increased, and eventually the changing processing of the playing speed of the moving picture data is performed linearly according to the dragging operations. Therefore, the playing speed of the moving picture data can be subjected to changing processing in a natural manner.

Note that in the examples shown in FIG. 27(a) through FIG. 27(d) and FIG. 28(a) and FIG. 28(b), the changing processing of the playing speed is controlled to stop for a predetermined amount of time in the event that the playing speed reaches 1.0 times, but the playing speed at which to stop the changing processing may be optionally set by the operator or the cellular phone maker, to be other than 1.0 times.

Also, with the example shown in FIG. 27(a) through FIG. 27(d) and FIG. 28(a) and FIG. 28(b), the changing processing of the playing speed is controlled to stop for a predetermined amount of time in the event that the playing speed reaches 1.0 times, but the changing processing of the playing speed may be stopped for a predetermined amount of time when the enlargement scale reaches 1.0 times and when the enlargement scale reaches 2.0 times, respectively. In other words, the playing processing may be controlled to be stopped multiple times at desired timings of reaching playing speeds, not only limited to once in the event that the playing speed reaches 1.0 times.

Further, the example as described above is an example in the case of increasing the speed of the moving picture data playing speed, but decreasing the speed of the moving picture data playing speed will be similar to that described above. That is to say, in the case of long-pressing operations with two fingers as described above, this means variable operations in the direction of reducing the playing speed.

Therefore, in the event of subjecting the playing speed of the moving picture data to change control to be a playing speed of 2.0 times, when a long-pressing operations with two fingers as described above is detected, the control unit 15 gradually reduces the playing speed of the moving picture data from the playing speed of 2.0 times, according to the long-pressing operation, and in the event that the playing speed is a playing speed of 1.0 times, the long-pressing operations with two fingers performed by the operator is cancelled for a predetermined amount of time such as 200 msec, for example, and stops the changing processing of the playing speed for the predetermined amount of time. The change processing of the playing speed according to the long-pressing operations with two fingers by the operator is resumed at a timing when the predetermined amount of time has elapsed.

Thus, even if continuous long-pressing operations with two fingers are performed, the changing processing of the playing speed can be controlled to be temporarily stopped at a playing speed of 1.0 times, for example. Therefore, the operator can easily adjust the playing speed of the moving picture data to be a playing speed of 1.0 times. In other words, the playing speed of the moving picture data can be adjusted to be a playing speed of 1.0 times which has a high probability of being desired by the operator.

Next, the various examples above have described the changing processing of display scale for a predetermined amount of time at a display scale thought to have high usage frequency in the event of change processing of the display scale of the object displayed on the display unit 5, based on a technical idea according to the present disclosure of "during a series of variable controls for variable operations, the variable controls are stopped for a predetermined amount of time at a desired timing".

Conversely, the example described below is an example wherein, in the event of performing variable control of the playing speed of music data or moving picture data, the changing processing of the playing speed is stopped for a predetermined amount of time at a playing speed that is thought to have a high usage frequency, based on based on a technical idea according to the present disclosure described above.

Conversely, the example described below is an example based on a technical idea according to the present disclosure described above wherein, in the event of switching multiple still images continuously and displaying on the display unit 5, the switching display processing is stopped for a predetermined amount of time at a change of day or change of month, for example, based on time information such as imaging point-in-time or obtaining point-in-time provided to each still image.

The flowchart in FIG. 29 shows the still image switching processing flow. Upon display specifying operations of the still image having been performed by the operator, the still image specified by the operator is displayed on the display unit 5, based on the viewer program of the camera control program stored in the memory 14. The control unit 15 monitors whether or not there has been any switching operations of the still image at a timing wherein the still image is controlled to display on the display unit 5, and upon detecting switching operations, the processing shown in the flowchart in FIG. 29 is started, based on the viewer program of the camera control program.

Note that with this example, upon detecting one of the "dragging operations", "flicking operations", and "long-pressing operations", the control unit 15 performs switching operations of the still images.

Upon such switching operations having been performed by the operator, in step S51 the control unit 15 sequentially reads out the still images stored in the memory 14, and sequentially displays the still images read in above with a display mode wherein an image enters the frame from the right edge portion of the display unit 5 and exits towards the left edge portion of the display unit 5, and advances the processing to step S52.

In step S52, the control unit 15 determines whether or not switching operations are being continuously performed by the operator. In the case determination is made that switching operations are not continuing, the control unit 15 advances the processing to step S53, stops the switching processing of the still images as described above, and ends the processing shown in the flow chart shown in FIG. 29.

Conversely, in the case determination is made in step S52 that switching operations are being continuously made, the control unit 15 advances the processing to step S53, and determines whether or not the date shown on the date information provided to the still image is the predetermined date.

Specifically, upon a subject being shot with a camera unit 8, the control unit 15 obtains the point-in-time information showing the current date and time from a timer 10, and provides the point-in-time information showing the current date and time to the shot still image as imaging point-in-time information in the memory 14.

Also, in the case of storing the still images obtained externally in the memory 14, as with the still images obtained via a network or the like, the control unit 15 obtains the point-in-time information showing the current date and time from the timer 10, and provides the point-in-time information showing the current date and time to the obtained still image as obtained point-in-time information in the memory 14.

Upon starting the switching processing in step S51, the control unit 15 determines whether or not the still image to which the point-in-time information of the predetermined date has been displayed on the display unit 5, based on the point-in-time information such as the imaging point-in-time information or obtained point-in-time information provided on the various still images. Until determination is made that the still image to which the point-in-time information of the predetermined date is provided has been displayed on the display unit 5, the control unit 15 returns the processing to step S51, and continues to execute the switching processing of the still images.

Conversely, upon determining that the still image to which the point-in-time information of the predetermined date is provided has been displayed on the display unit 5, the control unit 15 advances the processing to step S54, stops the switching processing of the still images and advances the processing to step S55. In step S55, the control unit 15 determines whether or not a predetermined amount of time such as 200 msec, for example, has elapsed from the time that the still image switching processing has been stopped, based on the time information obtained from the timer 10, and in the event of determining that the predetermined amount of time has elapsed, advances the processing to step S56.

In step S56, the control unit 15 monitors the operational situation of the display unit 5, thereby determining whether or not switching operations are being continuously performed by the operator. In the case determination is made that switching operations are not being continuously performed by the operator, the control unit 15 advances the processing to step S57, stops the still image switching processing, and ends the processing shown in the flowchart in FIG. 29.

Conversely, in the case determination is made in step S56 that switching operations are being continuously performed by the operator, the control unit 15 advances the processing to step S58, resumes the still image switching processing, and returns the processing to step S53. In step S53, determination is made as to whether or not the still image to which the point-in-time information with the predetermined date has been provided has been displayed on the display unit 5, and in the event determination is made that the still image to which the point-in-time information with the predetermined date has been provided has been displayed on the display unit 5, operations to stop the still image switching processing is repeatedly executed. The still image switching processing of the cellular phone will be described using specific examples.

FIG. 30(a) through FIG. 30(f) are diagrams showing a situation wherein the still image displayed on the display unit 5 is subjected to switching processing according to the dragging operations by the operator. FIG. 31(a) is a diagram showing the correlation between the dragging operation distance and the number of still images to be switched.

As an example, as can be seen from FIG. 31(a), in the case of the cellular phone herein, by performing still image switching, the switching processing is stopped for a predetermined amount of time in the event that the year shown in the point-in-time information provided to the still image is changed.

Figure 30A:
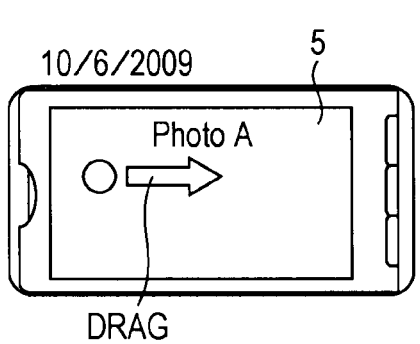
FIG. 30 is a schematic diagram to describe display switching operations of still images corresponding to a dragging operation of a cellular phone according to an embodiment.
Figure 30B:
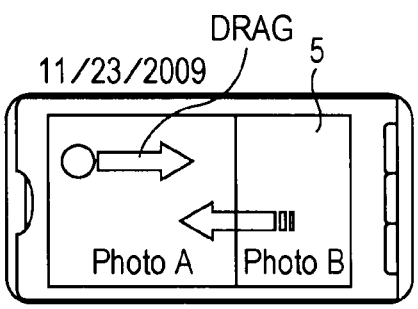
Figure 30C:
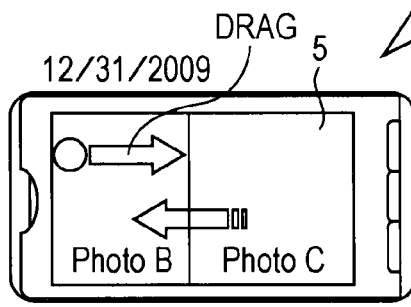
Figure 30D:
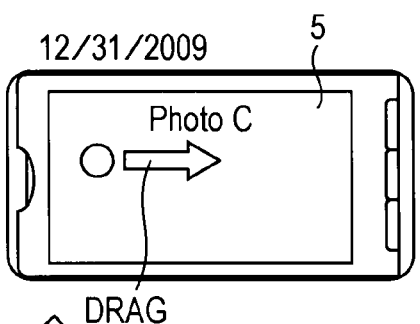
Figure 30E:
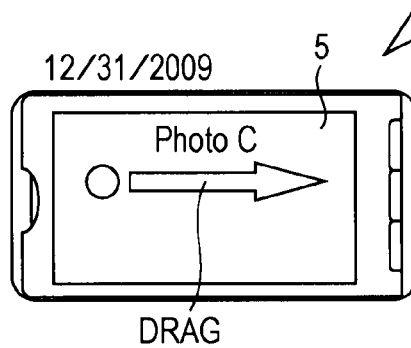
Figure 30F:
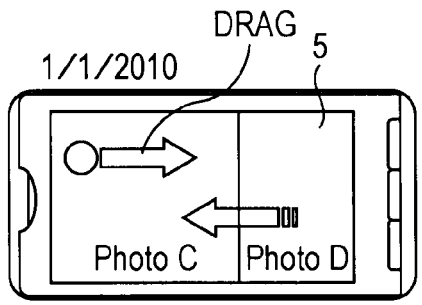
Figure 31A:
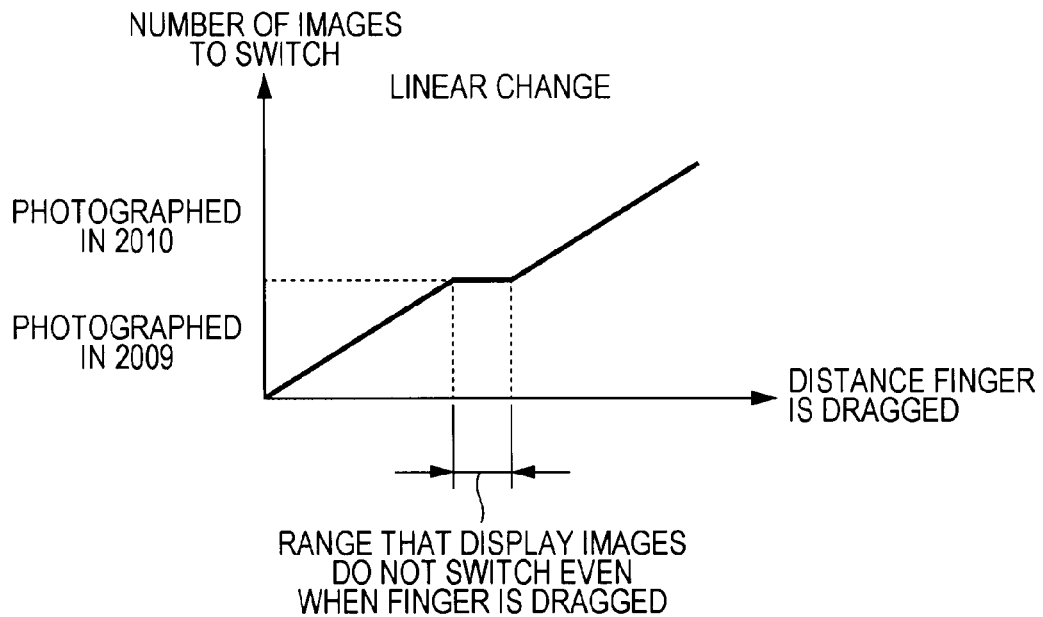
FIG. 31 is a diagram to describe the relation between dragging operation distance and display switching timing on a cellular phone according to an embodiment.

By performing the still image switching processing, if the control unit 15 performs the still image switching processing in the order of Oct. 6, 2009→Nov. 23, 2009→Dec. 31, 2009→Jan. 1, 2010 as shown in FIG. 30(a) through FIG. 30(c), the still image switching processing is stopped for a predetermined amount of time at the timing that the still image to which the point-in-time information of Jan. 1, 2010 is provided, which is the still image to which the earliest point-in-time information of 2010 in this case is provided, is displayed.

Similarly, by performing the still image switching processing, if the control unit 15 performs the still image switching processing in the order of Nov. 6, 2009→Dec. 10, 2009→Dec. 31, 2009→Jan. 1, 2010 as shown in FIG. 30(a) through FIG. 30(c), the still image switching processing is stopped for a predetermined amount of time at the timing that the still image to which the point-in-time information of Jan. 1, 2010 is provided, which is the still image to which the earliest point-in-time information of 2010 in this case is provided, is displayed.

Thus, immediately following the year shown in the point-of-time provided to the still images having been changed, the still image switching processing is stopped for a predetermined amount of time. That is to say, in the event of searching for a desired still image by performing the still image switching operations, regardless of continuous switching processing being performed, switching processing is temporarily stopped at the year change, whereby the operator can perform a search of the desired still images while visually confirming the year change. Therefore, a desired still image can be quickly searched from a large number of still imaging. Also, the stopping as mentioned above may be at Dec. 31, 2009, immediately before the year changes.

The example shown in FIG. 31(a) is an example wherein, in the event that the point-in-time information provided to the still image to be switched out by the dragging operation by the operator displays the predetermined date such as the change in year as described above, the switching processing is stopped for a predetermined amount of time such as 200 msec, and after the predetermined amount of time has elapsed, the switching processing is resumed according to the dragging operations by the operator.

Figure 31B:
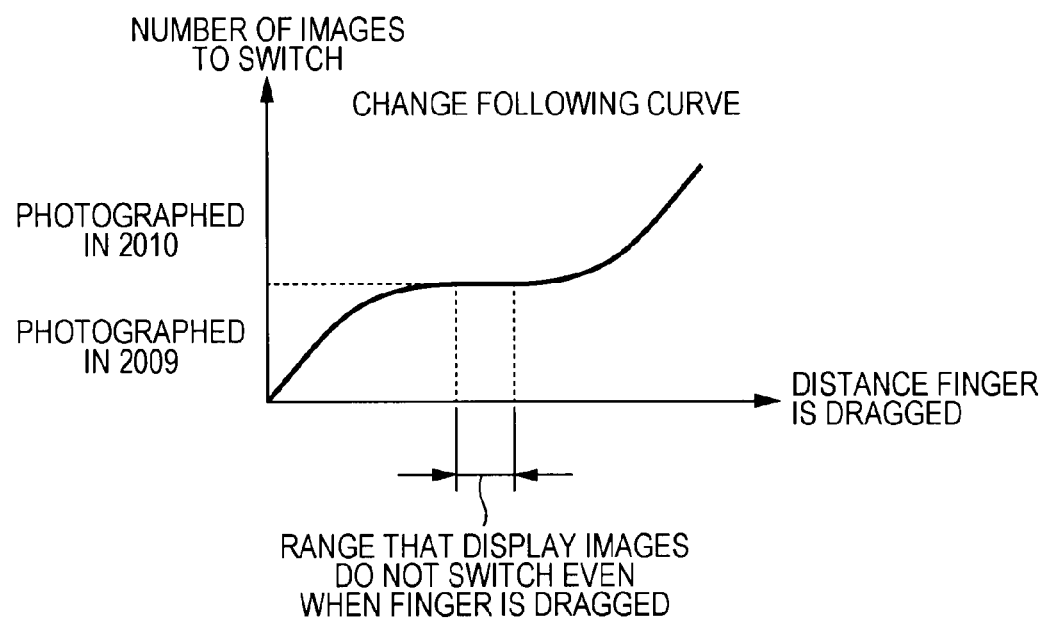

An arrangement may be made wherein the still images are subject to switching processing according to the dragging operation by the operator as shown in FIG. 31(b), and in the event that the date provided to the still image nears the predetermined date, the switching speed is gradually slowed down, and the switching processing is stopped for a predetermined amount of time at a iteming displaying the still image with the predetermined date. Upon the predetermined amount of time having elapsed, the switching processing may be resumed so as to gradually increase the switching speed. Thus, switching processing with changes in a natural manner can be performed.

Note that with the examples shown in FIG. 30(a) through FIG. 30(f) and FIG. 31(a) and FIG. 31(b), the still image switching processing is controlled to be stopped for a predetermined amount of time immediately before the year changes, but the stopping control of the predetermined time can be performed each time the date changes, each time the month changes, each time a folder wherein the still images are stored changes, or each time a certain number of still images changes.

Figure 33A:
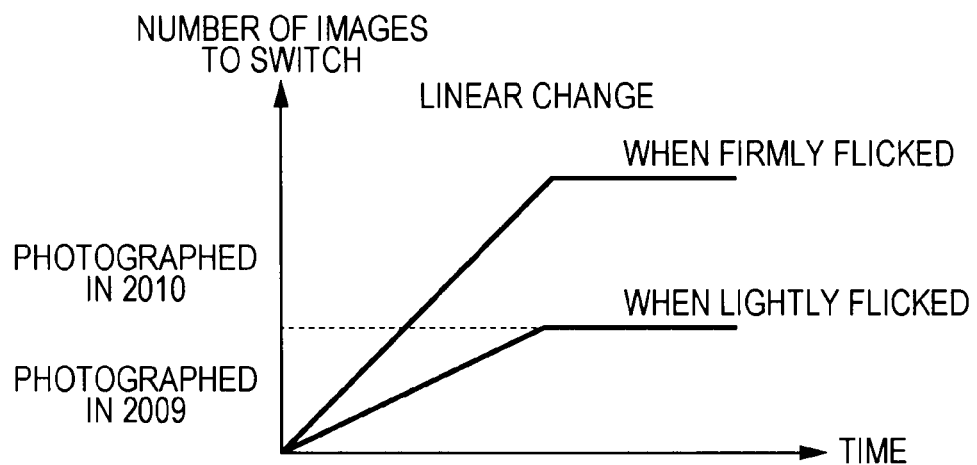
FIG. 33 is a diagram to describe the relation between flicking operation strength and display switching timing on a cellular phone according to an embodiment.

FIG. 32(a) and FIG. 32(b) are diagrams showing a situation wherein the still image displayed on the display unit 5 is subjected to switching processing according to the flicking operations by the operator. FIG. 33(a) is a diagram showing the correlation between the flicking operation strength and the number of still images to be switched.

As can be seen from FIG. 33(a), in the case that a strong flick is performed, the control unit 15 controls the switching of the number of still images according to the strength of the flicking operation, and in the case that a weak flick is performed, the switching processing of the still images is stopped temporarily at the change in years as described above.

To detect the strength or weakness of the flicking operation, the control unit 15 computes "operational distance of flicking operation/flicking operation time", whereby "operational speed of flicking operation" is computed. In the case that the operational speed herein is faster than the predetermined operational speed (i.e. operational speed serving as a threshold), this means that a strong flicking operation is performed, and in the case that the operational speed herein is slower than the predetermined operational speed, this means that a weak flicking operation is performed.

Therefore, in the case that the control unit 15 detects a strong flicking operation which is a high speed flicking operation, as shown in FIG. 32(a) and FIG. 33(a), switching control of the still images in the number of still images corresponding to the strength of the flicking operation is performed, without stopping the switching control at a change in year.

Conversely, in the case that the control unit 15 detects a weak flicking operation which is a slow speed flicking operation, as shown in FIG. 32(b) and FIG. 33(a), the switching control of the still images in the number of still images corresponding to the flicking operation is performed, and in the event that a still image having point-in-time information serving as a change in year is displayed, the switching control of the still images is subjected to stopping control immediately beforehand, for a predetermined amount of time.

Thus, when a weak flicking operation is performed, the switching control of the still image is temporarily subjected to stopping control at a change in year, whereby the operator can perform a search of a desired still image while recognizing the change in year. Therefore, an operator can quickly search for a desired still image from a large number of still images.

Figure 33B:
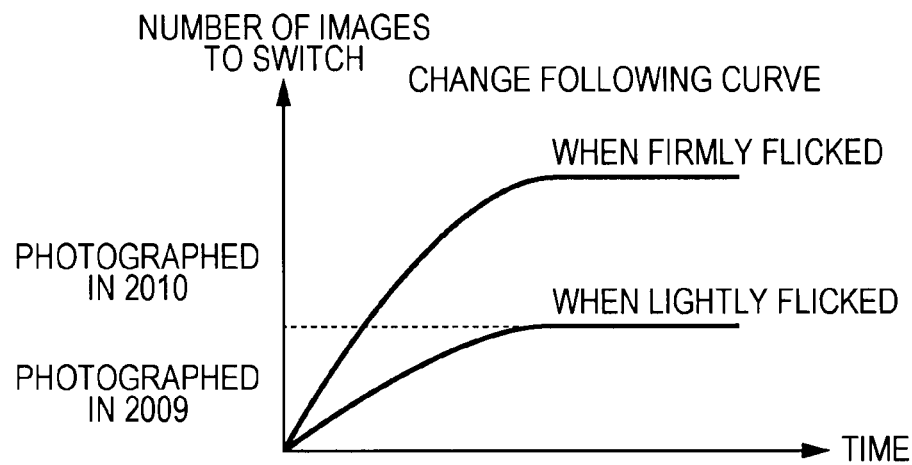

Note that in the event that the still images are subjected to switching processing according to the flicking operations of the operator as shown in FIG. 33(b), and the date provided to the still images nears the predetermined date, the switching speed is gradually decreased and the switching processing is stopped for a predetermined amount of time at a timing at which the still image having the predetermined date is displayed. Thus, switching processing can be performed with natural changes.

Note that in the examples shown in FIG. 32(a), FIG. 32(b), FIG. 33(a), and FIG. 33(b), the still image switching processing is subjected to stopping control for a predetermined amount of time immediately before the year changes, but this may be controlled so as to stop for a predetermined amount of time as described above, each time the date changes, each time the month changes, each time a folder wherein the still images are stored changes, or each time a certain number of still images change.

FIG. 34(a) through FIG. 34(f) are diagrams showing a situation wherein the still image displayed on the display unit 5 is subjected to switching processing according to the long-pressing operations by the operator. FIG. 35(a) is a diagram showing the correlation between the long-pressing operation distance and the number of still images to be switched.

Figure 34A:
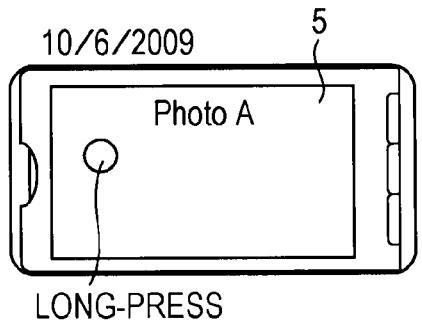
FIG. 34 is a schematic diagram to describe display switching operations of still images corresponding to a long-pressing operation of a cellular phone according to an embodiment.
Figure 35A:
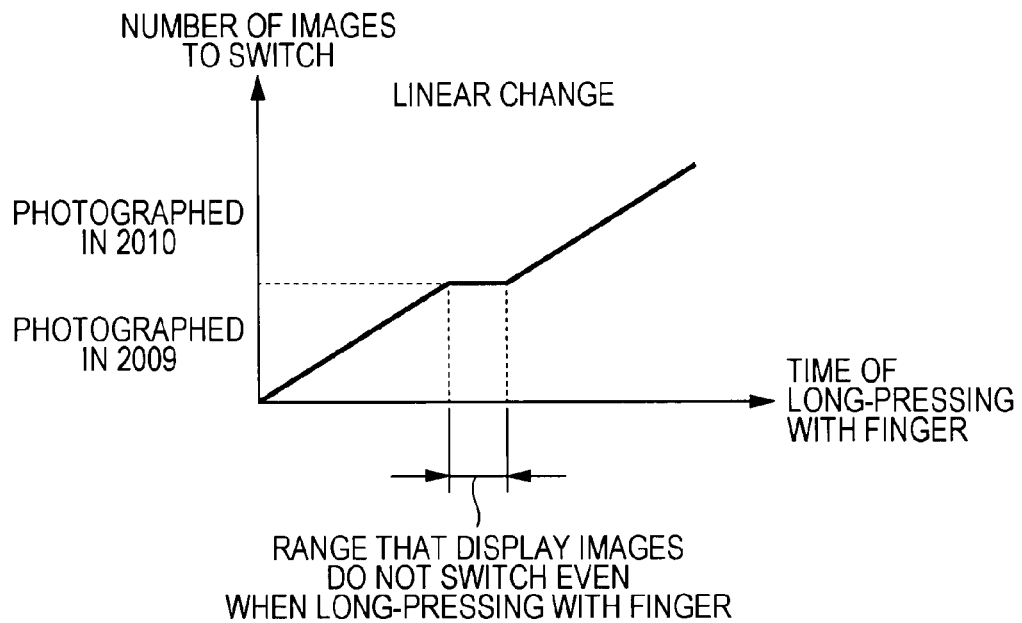
FIG. 35 is a diagram to describe the relation between long-pressing operation time and display switching timing on a cellular phone according to an embodiment.

As an example, as can be seen from FIG. 34(a), in the case of the cellular phone herein, by performing still image switching, the switching processing is stopped for a predetermined amount of time in the event that the year shown in the point-in-time information provided to the still image is changed.

Figure 34B:
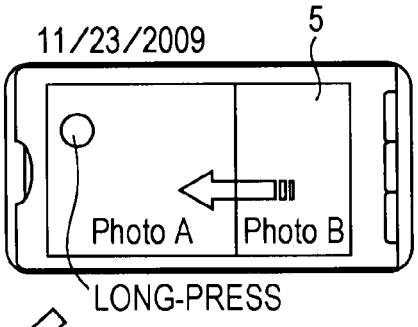
Figure 34C:
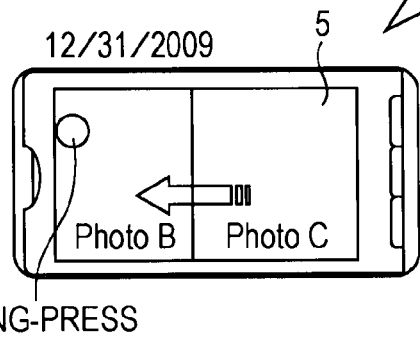
Figure 34D:
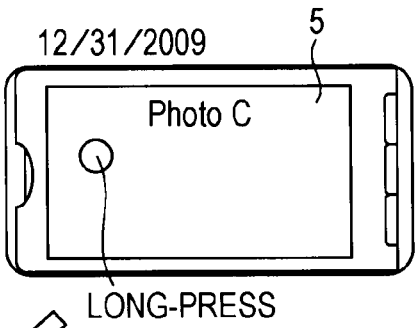
Figure 34E:
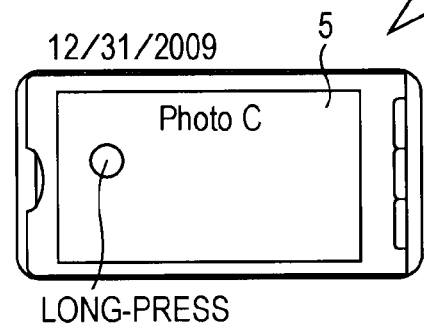
Figure 34F:
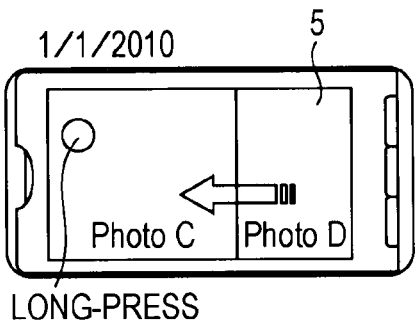

That is to say, by performing the still image switching processing, if the control unit 15 performs the still image switching processing in the order of Oct. 6, 2009→Nov. 23, 2009→Dec. 31, 2009→Jan. 1, 2010 as shown in FIG. 34(a) through FIG. 34(c), the still image switching processing is stopped for a predetermined amount of time at the timing that the still image to which the point-in-time information of Jan. 1, 2010 is provided, which is the still image to which the earliest point-in-time information of 2010 in this case is provided, is displayed.

Similarly, by performing the still image switching processing, if the control unit 15 performs the still image switching processing in the order of Nov. 6, 2009→Dec. 10, 2009→Dec. 31, 2009→Jan. 1, 2010, the still image switching processing is stopped for a predetermined amount of time at the timing that the still image to which the point-in-time information of Jan. 1, 2010 is provided, which is the still image to which the earliest point-in-time information of 2010 in this case is provided, is displayed. Also, stopping may be at Dec. 31, 2009, immediately before the year changes.

Thus, immediately following the year shown in the point-of-time provided to the still images having been changed, the still image switching processing is stopped for a predetermined amount of time. That is to say, in the event of searching for a desired still image by performing the still image switching operations, regardless of continuous switching processing being performed, switching processing is temporarily stopped at the year change, whereby the operator can perform a search of the desired still images while visually confirming the year change. Therefore, a desired still image can be quickly searched from a large number of still imaging.

The example shown in FIG. 35(a) is an example wherein, in the event that the point-in-time information provided to the still image to be switched out by the dragging operation by the operator displays the predetermined date such as the change in year as described above, the switching processing is stopped for a predetermined amount of time such as 200 msec, and after the predetermined amount of time has elapsed, the switching processing is resumed according to the long-pressing operations by the operator.

Figure 35B:
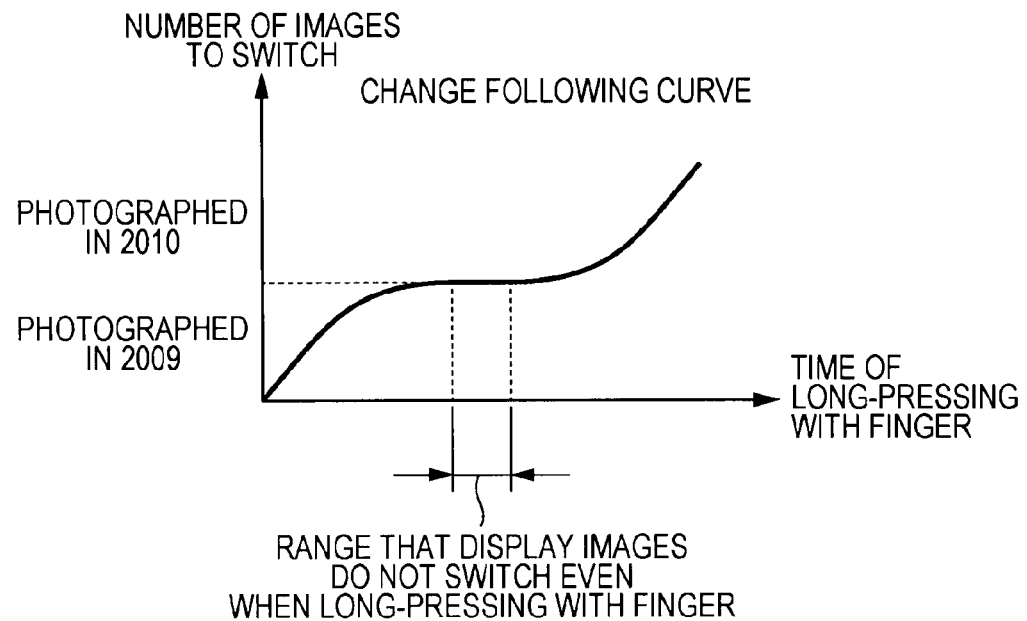

An arrangement may be made wherein the still images are subject to switching processing according to the long-pressing operation by the operator as shown in FIG. 35(b), and in the event that the date provided to the still image nears the predetermined date, the switching speed is gradually slowed down, and the switching processing is stopped for a predetermined amount of time at a timing displaying the still image with the predetermined date. Upon the predetermined amount of time having elapsed, the switching processing may be resumed so as to gradually increase the switching speed. Thus, switching processing with changes in a natural manner can be performed.

Note that with the examples shown in FIG. 34(a) through FIG. 34(f) and FIG. 35(a) and FIG. 35(b), the still image switching processing is controlled to be stopped for a predetermined amount of time immediately before the year changes, but the stopping control of the predetermined time can be performed each time the date changes, each time the month changes, each time a folder wherein the still images are stored changes, or each time a certain number of still images changes.

Next, the timing to stop the above-described switching processing temporarily may be specified by the operator as a desired timing such as every year, every month, and so forth, or point-in-time information provided to each still image may be detected beforehand, and the timing to temporarily stop the switching processing may be automatically set based on the detection results thereof.

In this case, the operator selects menu items to automatically detect and set the timing to temporarily stop the switching menu, from an operational menu on the cellular phone. Upon this menu item selection operation having been performed, the control unit 15 executes the processing shown in the flowchart in FIG. 36, thereby automatically detecting and setting the timing for switching processing of the still images.

That is to say, upon the menu item having been selected, in step S61 the control unit 15 detects the still image to which the point-in-time information for the oldest date is provided, and begins the switching processing of the still images in the order from the oldest date to the newest date.

Upon starting such still image switching processing, first in step S62 the control unit 15 sets "day" as a candidate for temporarily stopping the switching processing, and advances the processing to step S63.

In step S63, the control unit 15 determines whether or not the date of the currently displayed still image and the date of the still image to be displayed next have the same date, and in the case of having the same date, advances the processing to step S64, displays the still image having the same date thereof on the display unit 5, and returns the processing to step S62.

Thus, as long as the date shown with the point-in-time information provided to each still image is the same date for each, the still images having the same date respectively are sequentially switched and displayed on the display unit 5.

Next, in step S63, in the case determination is made that the date of the currently displayed still image and the date of the still image to be displayed next have different dates, the control unit advances the processing to step S65. In step S65 the control unit 15 determines whether or not the still image having a different date is a still image that is less than the hundredth still image as counted from the still images to which the point-in-time information has the oldest data provided thereto.

If the still image having a different date is a still image that is the hundredth or greater still image as counted from the still images to which the point-in-time information has the oldest data provided thereto, this means that there are 100 or more still images having the same date. Therefore, in the case determination is made in step S65 that the still image having a different date is a still images that is the hundredth still image or greater, as counted from the still images to which the point-in-time information has the oldest data provided thereto, the control unit 15 advances the processing to step S66.

Figure 36:
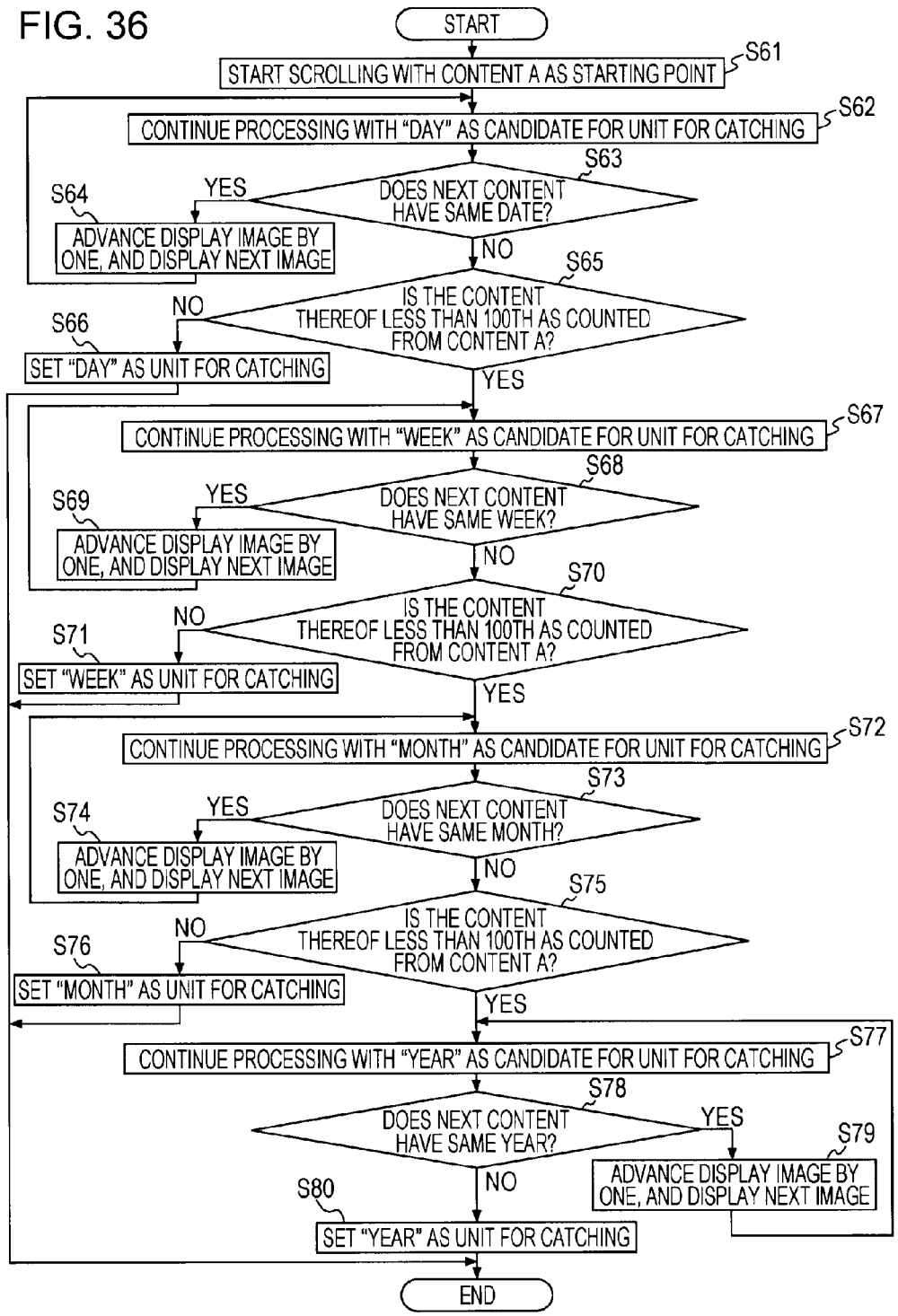
FIG. 36 is a flowchart to describe operations to automatically detect and set the switching processing timing of still images on a cellular phone according to an embodiment.

In step S66 the control unit 15 then performs setting for the stopping timing, so as to temporarily stop the still image switching processing for each date, and ends the processing in the flowchart in FIG. 36. Note that the setting information showing the stopping timing here is stored in the memory 14. In the event of performing still image switching control, the control unit 15 reads in the setting information showing the stopping timing that is stored in the memory 14, and temporarily stops the still image switching control as described above for a predetermined amount of time, at a timing shown in the setting information.

Next, in step S65, the still image having a different date is determined to be a still image that is less than the hundredth still image as counted from the still images to which the point-in-time information of the oldest date is provided, whereby the processing is advanced to step S67, and the control unit 15 sets "week" as a candidate for temporarily stopping the switching processing and advances the processing to step S68.

In step S68, the control unit 15 distinguishes whether or not the week to which the date of the currently displayed still image belongs and the week to which the date of the still image to be displayed next belongs are the same week, and in the case of being the same week, the control unit 15 advances the processing to step S69, displays the still images in the same week thereof on the display unit 5, and returns the processing to step S67.

Thus, while the weeks to which the dates shown by point-in-time information provided to the various still images belong are each the same week, the still images having the same week herein are sequentially switched and displayed on the display unit 5.

Next, in the case determination is made in step S68 that the week to which the date of the currently displayed still image belongs and the week to which the date of the still image to be displayed next belongs are different weeks, the control unit 15 advances the processing to step S70. In step S70, the control unit 15 distinguishes whether or not the still image having a different week is a still image that is less than the hundredth still image as counted from the still images to which the point-in-time information has the oldest data provided thereto.

If the still image having a different week is a still image that is the hundredth still image or greater as counted from the still images to which the point-in-time information has the oldest data provided thereto, this means that there are 100 or more still images having the same week. Therefore, in the case determination is made in step S70 that the still image having a different week is a still image that is the hundredth still image or greater, as counted from the still images to which the point-in-time information has the oldest data provided thereto, the control unit advances the processing to step S71.

In step S71 the control unit 15 then performs setting for the stopping timing, so as to temporarily stop the still image switching processing for each week, and ends the processing in the flowchart in FIG. 36. In this case, the control unit 15 performs control to temporarily stop the still image switching control for a predetermined amount of time, for each week.

Next, in step S70, the still image having a different week is determined to be a still image that is less than the hundredth still image as counted from the still images to which the point-in-time information of the oldest date is provided, whereby the processing is advanced to step S72, and the control unit 15 sets "month" as a candidate for temporarily stopping the switching processing and advances the processing to step S73.

In step S73, the control unit 15 distinguishes whether or not the month to which the date of the currently displayed still image belongs and the month to which the date of the still image to be displayed next belongs are the same month, and in the case of being the same month, the control unit 15 advances the processing to step S74, displays the still images in the same month thereof on the display unit 5, and returns the processing to step S72.

Thus, while the months to which the dates shown by point-in-time information provided to the various still images belong are each the same month, the still images having the same month herein are sequentially switched and displayed on the display unit 5.

Next, in the case determination is made in step S73 that the month to which the date of the currently displayed still image belongs and the month to which the date of the still image to be displayed next belongs are different months, the control unit 15 advances the processing to step S75. In step S75, the control unit 15 distinguishes whether or not the still image having a different month is a still image that is less than the hundredth still image as counted from the still images to which the point-in-time information has the oldest data provided thereto.

If the still image having a different month is a still image that is the hundredth still image or greater as counted from the still images to which the point-in-time information has the oldest data provided thereto, this means that there are 100 or more still images having the same month. Therefore, in the case determination is made in step S75 that the still image having a different month is a still image that is the hundredth still image or greater, as counted from the still images to which the point-in-time information has the oldest data provided thereto, the control unit advances the processing to step S76.

In step S76 the control unit 15 then performs setting for the stopping timing, so as to temporarily stop the still image switching processing for each month, and ends the processing in the flowchart in FIG. 36. In this case, the control unit 15 performs control to temporarily stop the still image switching control for a predetermined amount of time, for each month.

Next, in step S75, the still image having a different month is determined to be a still image that is less than the hundredth still image as counted from the still images to which the point-in-time information of the oldest date is provided, whereby the processing is advanced to step S77, and the control unit 15 sets "year" as a candidate for temporarily stopping the switching processing and advances the processing to step S78.

In step S78, the control unit 15 distinguishes whether or not the year to which the date of the currently displayed still image belongs and the year to which the date of the still image to be displayed next belongs are the same year, and in the case of being the same year, the control unit 15 advances the processing to step S79, displays the still images in the same year thereof on the display unit 5, and returns the processing to step S77.

Thus, while the years to which the dates shown by point-in-time information provided to the various still images belong are each the same year, the still images having the same year herein are sequentially switched and displayed on the display unit 5.

Next, in the case determination is made in step S78 that the year to which the date of the currently displayed still image belongs and the year to which the date of the still image to be displayed next belongs are different years, the control unit 15 advances the processing to step S80. In step S80, the control unit 15 performs settings for the stopping timing to temporarily stop the still image switching processing for a predetermined amount of time, for each year.

Thus, with the cellular phone according to the present embodiment, point-in-time information provided to the still images is detected beforehand, the timing at which a predetermined number of images or more exist is automatically set as the timing to temporarily stop the switching processing, and the still image switching processing is performed. Specifically, in the case that there are a predetermined number or greater, such as 100 or more for example, still images having the same date, for example, the control unit 15 performs temporary stopping control of the switching processing for each date. Alternatively, in the case that a predetermined number or more such as 100 or more, for example, still images exist to which the time information of the same month is provided, the control unit 15 performs temporary stopping control of the switching processing for each month.

Thus, if there are a predetermined number or greater of still images having the point-in-time information for the same day out of the still images stored in the memory 14, the switching processing is controlled to stop with every change in "day", if there are equal to or more than a processing number of still images having the point-in-time information for the same week out of the still images stored in the memory 14, the switching processing is controlled to stop with every change in "week", if there are equal to or more than a processing number of still images having the point-in-time information for the same month out of the still images stored in the memory 14, the switching processing is controlled to stop with every change in "month", and in other cases the switching processing is controlled to stop with every change in "year".

Accordingly, switching processing can be controlled to temporarily stop at an optimal timing according to the number of still images stored in the memory 14, whereby searching for a desired still image is easier.

Next, an example will be described wherein, in the event of subjecting a phone book to scrolling control, the scrolling control is stopped for a predetermined amount of time at a change in a group to which a user registered in the phone book belongs.

Figure 37:
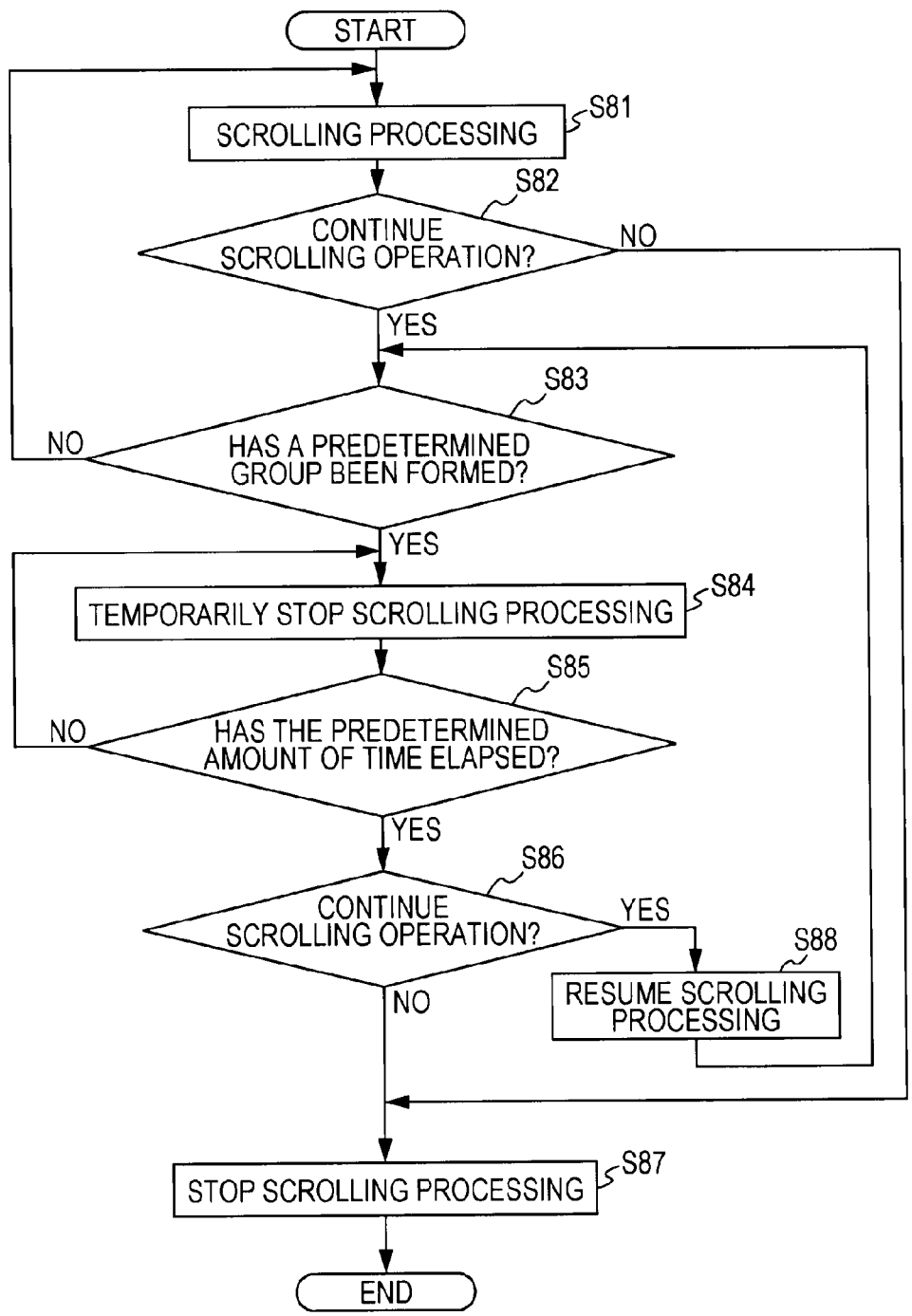
FIG. 37 is a flowchart to describe scrolling control of a phone book on a cellular phone according to an embodiment.

The flowchart in FIG. 37 shows the flow of the phone book scrolling control. Upon display specifying operations having been performed for the phone book by an operator, the control unit 15 displays the phone book data registered in the phone book on the display unit 5, based on the phone book managing program stored in the memory 14. The control unit 15 monitors whether or not there has been any scrolling operations of the phone book data at a timing of displaying the phone book data on the display unit 5, and upon detecting scrolling operations, the control unit 15 starts the processing shown in the flowchart in FIG. 37, based on the phone book managing program.

Note that in this example, of the above-described "dragging operations", "flicking operations", and "long-pressing operations", upon one of these being detected, the control unit 15 performs scrolling processing of the phone book data.

Upon the operator performing such scrolling operations, the control unit 15 starts the scrolling processing of the phone book data in step S81, and advances the processing to step S82.

In step S82, the control unit 15 determines whether or not the scrolling operations are continuously performed by the operator. In the case determination is made that scrolling operations are not continuing, the control unit 15 advances the processing to step S87, stops the above-described phone book data scrolling processing, and ends the processing shown in the flowchart in FIG. 37 without further processing.

Conversely, in the case determination is made in step S82 that scrolling operations are continuing, the control unit 15 advances the processing to step S83 and scrolls the phone book data, thereby determining whether or not the phone book data corresponding to the user belonging to a predetermined group has been displayed.

Specifically, a user whose name is Andy and a user whose name is Annie both belong to a group that has the first letter of their names as "A", and the user information is registered as such in the phone book. Similarly, a user whose name is Billy and a user whose name is Bryan both belong to a group that has the first letter of their names as "B", and the user information is registered as such in the phone book. Each user is registered in the phone book so as to belong to one of the groups of group "A" through group "Z", depending on the first letter of the name of the user.

Upon starting the phone book data scrolling processing in step S81, the control unit 15 determines whether or not the phone book data of a predetermined group determined beforehand is displayed on the display unit 5. Until determination is made that the phone book data of a predetermined group has been displayed on the display unit 5, the control unit 15 returns the processing to step S81, and continuously executes the scrolling processing of the phone book data described above.

Conversely, in the case determination is made that the phone book data of a predetermined group is displayed on the display unit 5, the control unit 15 advances the processing to step S84, stops the phone book data scrolling processing, and advances the processing to step S85. In step S85, the control unit 15 determines whether or not the predetermined time such as 200 msec, for example, has elapsed since the phone book data scrolling processing has been stopped, and in the event determination is made that the predetermined amount of time has elapsed, the control unit 15 advances the processing to step S86.

In step S86, by monitoring the operational situation of the display unit 5, the control unit 15 determines whether or not continuous scrolling operations have been performed by the operator. In the case determination is made that continuous scrolling operations have not been performed by the operator, the control unit 15 advances the processing to step S87, stops the phone book scrolling processing, and ends the processing shown in the flowchart in FIG. 37.

Conversely, in the case determination is made in step S86 that continuous scrolling operations have been performed by the operator, the control unit 15 advances the processing to step S88, resumes the phone book data scrolling processing, and returns the processing to step S83. In step S83, by performing phone book data scrolling processing again, determination is made as to whether or not the phone book data in a predetermined group has been displayed on the display unit 5, and in the event determination is made that the phone book data in a predetermined group has been displayed on the display unit 5, operations are performed to stop the phone book data scrolling processing, and these are repeatedly executed. A specific example of the phone book data scrolling processing according to the cellular phone will be described.

FIG. 38(a) through FIG. 38(e) are diagrams showing a situation wherein the phone book data displayed so as to be scrolled on the display unit 5 is subjected to scrolling processing according to the dragging operations by the operator. FIG. 39(a) is a diagram showing the timing to temporarily stop the phone book data scrolling control.

As an example, as can be seen from FIG. 39(a), in the case of the cellular phone herein, scrolling processing is stopped for a predetermined amount of time at changes in groups.

Figure 38A:
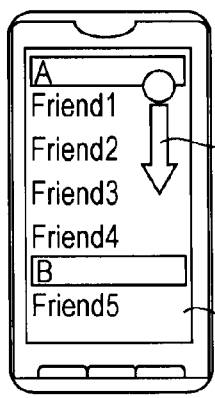
FIG. 38 is a schematic diagram to describe the phone book scrolling control corresponding to the dragging operation of a cellular phone according to an embodiment.
Figure 38B:
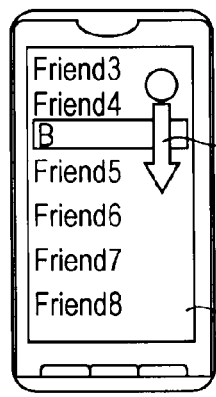
Figure 38C:
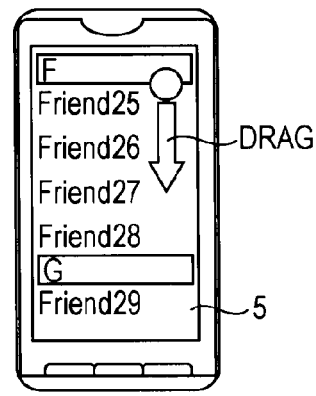
Figure 38D:
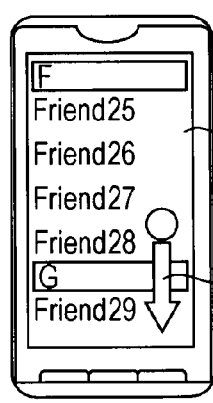
Figure 38E:
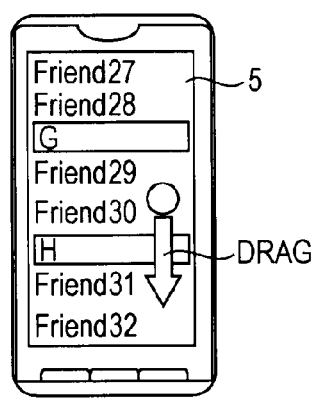

That is to say, by performing the scrolling processing, in the case that displays of the phone book data in the group having the initial "A" have passed, and phone book data in the group having the initial "B" is displayed, as shown in FIG. 38(a) and FIG. 38(b), the control unit 15 stops the phone book scrolling processing for a predetermined amount of time at a timing wherein the phone book data in the group having the initial "B" is displayed on the display unit 5, as shown in FIG. 39(a).

Also, in the case that, upon the predetermined amount of time having elapsed and the phone book data scrolling processing has resumed, displays of the phone book data in the group having the initial "B" have passed, and phone book data in the group having the initial "C" is displayed, the control unit 15 stops phone book scrolling processing for a predetermined amount of time at a timing wherein the phone book data in the group having the initial "C" is displayed on the display unit 5.

Also, in the case that, upon the predetermined amount of time having elapsed and the phone book data scrolling processing has resumed, displays of the phone book data in the group having the initial "C" have passed, and phone book data in the group having the initial "D" is displayed, the control unit 15 stops the phone book scrolling processing for a predetermined amount of time at a timing wherein the phone book data in the group having the initial "D" is displayed on the display unit 5.

Thus, each time the phone book data group switches with the scrolling processing, the control unit 15 performs stopping control of the phone book data scrolling processing for a predetermined amount of time.

Thus, the operator can perform a search of the desired phone book data while visually confirming the group change. Therefore, desired phone book data can be quickly searched from a large number of users.

The example shown in FIG. 39(a) is an example wherein, in the event that the phone book data group is switched out, the phone book data scrolling processing is stopped for a predetermine amount of time, after the predetermined amount of time has elapsed, the phone book data scrolling processing is resumed according to the dragging operations by the operator.

An arrangement may be made wherein, according to the scrolling processing as shown in FIG. 39(b), the scrolling speed is gradually slowed down as a change to the phone book data group nears, and the scrolling processing is stopped for a predetermined amount of time at a timing wherein the phone book data group has switched. Upon the predetermined amount of time having elapsed, the scrolling processing may be resumed so as to gradually increase the scrolling speed. Thus, scrolling processing with changes in a natural manner can be performed.

Figure 40A:
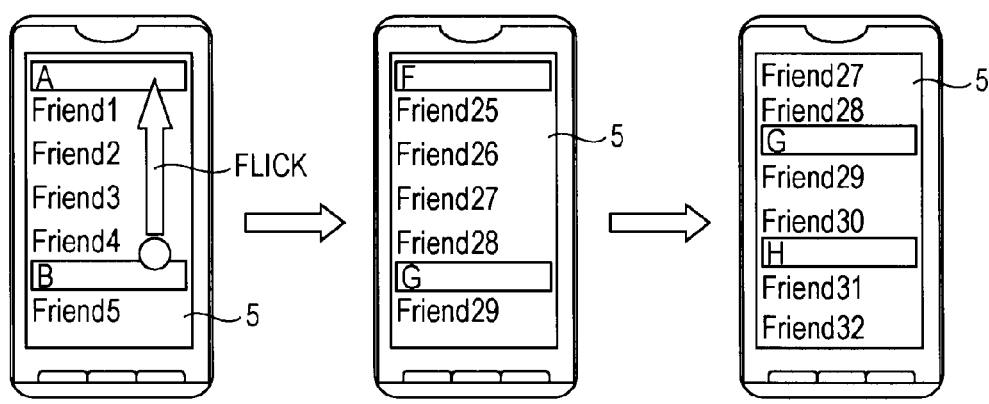
FIG. 40 is a schematic diagram to describe the phone book scrolling control corresponding to the flicking operation of a cellular phone according to an embodiment.
Figure 40B:
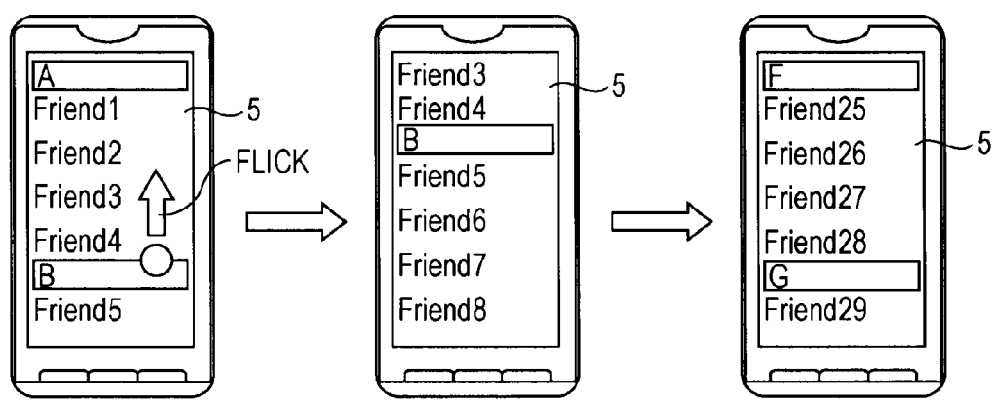

FIG. 40(a) and FIG. 40(b) are diagrams showing a situation wherein the phone book data displayed on the display unit 5 is subjected to scrolling processing according to the flicking operations by the operator. FIG. 41(a) is a diagram showing the phone book data scrolling processing according to the flicking operation strength.

As an example, as can be seen from FIG. 41(a), in the case that a strong flicking operation is performed, the control unit 15 performs scrolling processing without temporarily stopping at a change in groups, according to the strength of the flicking operation, and in the case that a weak flicking operation is performed, the control unit 15 temporarily stops the scrolling processing at changes in groups.

To detect the strength or weakness of the flicking operation, the control unit 15 computes "operational distance of flicking operation/flicking operation time", whereby "operational speed of flicking operation" is computed. In the case that the operational speed herein is faster than the predetermined operational speed (i.e. operational speed serving as a threshold), this means that a strong flicking operation is performed, and in the case that the operational speed herein is slower than the predetermined operational speed, this means that a weak flicking operation is performed.

Therefore, in the case that the control unit 15 detects a strong flicking operation which is a high speed flicking operation, as shown in FIG. 40(*a*) and FIG. 41(*a*), scrolling control of the phone book data corresponding to the strength of the flicking operation is performed, without stopping the switching control at a change in groups.

Conversely, in the case that the control unit 15 detects a weak flicking operation which is a slow speed flicking operation, as shown in FIG. 40(*b*) and FIG. 41(*a*), the phone book data scrolling processing is subjected to stopping control for a predetermined amount of time at changes in groups.

Thus, when a weak flicking operation is performed, the phone book data scrolling processing is temporarily stopped at a change in groups, whereby the operator can perform a search of a desired still image while recognizing the change in groups. Therefore, an operator can quickly search for desired phone book data from a large number of users.

Note that by performing the phone data scrolling processing according to the flicking operations of the operator as shown in FIG. 41(*b*), in the event that a change in groups of phone book data is nearing, the scrolling speed may be gradually decreased and the scrolling processing stopped for a predetermined amount of time at a timing at which the groups are switched. Thus, scrolling processing can be performed with natural changes.

Figure 43A:
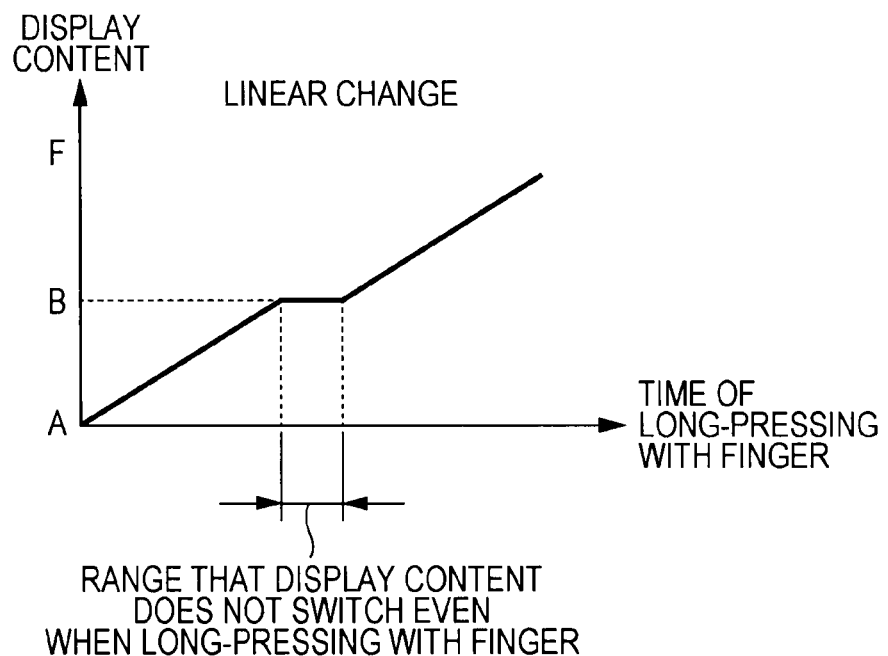
FIG. 43 is a diagram to describe the relation between the long-pressing operation and the phone book scrolling control on a cellular phone according to an embodiment.
Figure 43B:
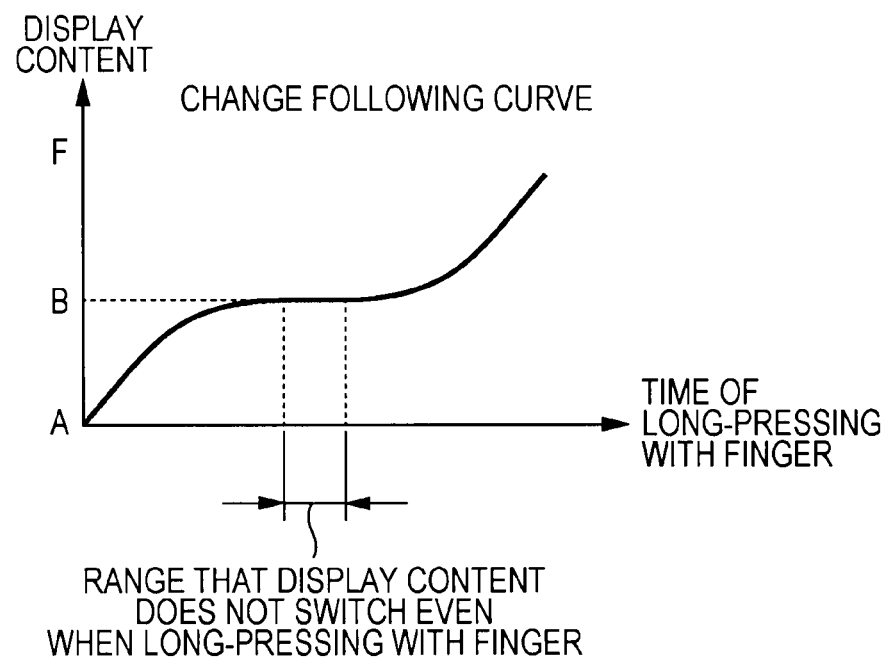

FIG. 42(*a*) through FIG. 42(*e*) are diagrams showing a situation wherein the phone book data scrolled on the display unit 5 is subjected to scrolling processing according to the long-pressing operations by the operator. FIG. 43(*a*) is a diagram showing the timing to temporarily stop the phone book data scrolling processing.

By performing the phone book data scrolling processing, in the case that displays of the phone book data in the group having the initial "A" have passed, and phone book data in the group having the initial "B" is displayed, as shown in FIG. 42(*a*) and FIG. 42(*b*), the control unit 15 stops the phone book data scrolling processing for a predetermined amount of time at a timing wherein the phone book data in the group having the initial "B" is displayed on the display unit 5, as shown in FIG. 43(*a*).

Also, in the case that, upon the predetermined amount of time having elapsed and the phone book data scrolling processing having resumed, displays of the phone book data in the group having the initial "B" have passed, and phone book data in the group having the initial "C" is displayed, the control unit 15 stops phone book data scrolling processing for a predetermined amount of time at a timing wherein the phone book data in the group having the initial "C" is displayed on the display unit 5.

Also, in the case that, upon the predetermined amount of time having elapsed and the phone book data scrolling processing having resumed, displays of the phone book data in the group having the initial "C" have passed, and phone book data in the group having the initial "D" is displayed, the control unit 15 stops the phone book scrolling processing for a predetermined amount of time at a timing wherein the phone book data in the group having the initial "D" is displayed on the display unit 5.

Thus, each time the phone book data group switches with the scrolling processing, the control unit 15 stops the phone book data scrolling processing for a predetermined amount of time.

Thus, the operator can perform a search of the desired phone book data while visually confirming the group change. Therefore, desired phone book data can be quickly searched from a large number of users.

The example shown in FIG. 43(*a*) is an example wherein, in the event that the phone book data group is switched out, the phone book data scrolling processing is stopped for a predetermined amount of time, and after the predetermined amount of time has elapsed, the phone book data scrolling processing is resumed according to the dragging operations by the operator.

An arrangement may be made wherein, according to the scrolling processing as shown in FIG. 43(*b*), the scrolling speed is gradually slowed down as a change to the phone book data group nears, and the scrolling processing is stopped for a predetermined amount of time at a timing wherein the phone book data group has switched. Upon the predetermined amount of time having elapsed, the scrolling processing may be resumed so as to gradually increase the scrolling speed. Thus, scrolling processing with changes in a natural manner can be performed.

As we can see from the above description, the cellular phone according to the present embodiment has the following advantages.

1. In the case of performing enlarging processing of still images according to dragging operations, the dragging operations that have been performed continuously are cancelled in the event that the enlarging processing is performed until a predetermined enlarging scale is reached, and the predetermined enlarging scale is maintained. After the predetermined amount of time has elapsed, the enlarging processing according to the dragging operations is resumed. Thus, for example enlarging processing can be stopped for a predetermined amount of time when the still image is at the original size thereof.

When a still image is subjected to enlarging processing to be larger than the original size, a still image with poor image quality may gradually be displayed. However, by stopping the enlarging processing for a predetermined amount of time, the enlarging processing can be temporarily stopped in the state of displaying a still image (i.e. a still image at the original size) with favorable image quality.

That is to say, the display scale of the still image can be a variable operation so as to easily change to a display scale having a high probability of being desired by the operator (in this case, the original size of the still image).

2. In the case of performing enlarging processing of still images according to the flicking operations, the enlarging processing of the still image is performed so that, in the case that a strong flick is performed, the enlargement scale corresponds to the strength of the flicking operation. Conversely, in the case that a weak flick is performed, the enlarging processing is stopped at the enlargement scale of the original size of the still image.

Thus, in the case of detecting a weak flick, the enlarging processing can be stopped in a state wherein the still image has a favorable image quality (still image at the original size). Therefore, the display scale of the still image can be a variable operation so as to easily change to a display scale having a high probability of being desired by the operator (in this case, the original size of the still image).

3. In the case of performing enlarging processing of the still image according to long-pressing operations, the continuously performed long-pressing operations are cancelled for a predetermined amount of time in the event that the enlarging processing is performed up to a predetermined enlargement scale, and the predetermined enlargement scale is maintained. After the predetermined amount of time has elapsed, the enlarging processing according to the long-pressing operations is resumed. Thus, the enlarging processing can be stopped temporarily in a state wherein a still image with favorable image quality (i.e. a still image of the original size) is displayed. Therefore, the display scale of the still image can be a variable operation so as to easily change to a display scale having a high probability of being desired by the operator (in this case, the original size of the still image).

4. In the case of performing enlarging processing of a Web page according to the dragging operations, the dragging operations that have been performed continuously are cancelled in the event that the enlarging processing is performed until a predetermined enlarging scale is reached, and the predetermined enlarging scale is maintained. After the predetermined amount of time has elapsed, the enlarging processing according to the dragging operations is resumed. Thus, for example enlarging processing of a Web page can be stopped temporarily in the event of enlarging text and images on a website to the size desired by a creator.

That is to say, the display scale of the still image can be a variable operation so as to easily change to a display scale having a high probability of being desired by the operator (in this case, the size of the text and images as desired by the creator of the website thereof).

5. In the case of performing enlarging processing of a Web page according to the flicking operations, in the case that a strong flicking operation is performed, the enlarging processing of the text and images on the web page is performed so as to be the enlargement scale according to the strength of the flicking operation. Conversely, in the case that a weak flicking operation is performed, the enlarging processing is stopped at an enlargement scale corresponding to the size of the text and images desired by the creator of the Website thereof.

Thus, in the case of detecting a weak flick, the display scale of the still image can be a variable operation so as to easily change to a display scale having a high probability of being desired by the operator (in this case, the size of the text and images desired by the creator of the Website thereof).

6. In the case of performing enlarging processing of a Web page according to the long-pressing operations, the dragging operations that have been performed continuously are cancelled in the event that the enlarging processing is performed until a predetermined enlarging scale is reached, and the predetermined enlarging scale is maintained. After the predetermined amount of time has elapsed, the enlarging processing according to the dragging operations is resumed. Thus, for example enlarging processing of a Web page can be stopped temporarily in the event of enlarging text and images on a website to the size desired by a creator.

That is to say, the display scale of the still image can be a variable operation so as to easily change to a display scale having a high probability of being desired by the operator (in this case, the size of the text and images as desired by the creator of the website thereof).

7. In the case of performing change control of the playing speed of a music player according to dragging operations, the dragging operations that have been performed continuously are cancelled in the event that the playing speed is changed until a predetermined playing speed is reached, and the predetermined playing speed is maintained. After the predetermined amount of time has elapsed, the change control of the playing speed according to the dragging operations is resumed. Thus, for example change control of the playing speed can be stopped temporarily at the original playing speed of the music.

That is to say, the music playing speed can be a variable operation so as to easily change to a playing speed having a high probability of being desired by the operator (in this case, the original playing speed of the music).

8. In the case of changing the music player playing speed according to the flicking operations, in the event a strong flicking operation is detected, the playing speed is changed according to the strength of the flicking operation. Conversely, in the case of detecting a weak flicking operation, the change control of the playing speed is stopped at the original playing speed of the music.

Therefore, the music playing speed can be a variable operation so as to easily change to a playing speed having a high probability of being desired by the operator (in this case, the original playing speed of the music).

9. In the case of performing change control of the playing speed of a music player according to long-pressing operations, the long-pressing operations that have been performed continuously are cancelled in the event that the playing speed is changed until a predetermined playing speed is reached, and the predetermined playing speed is maintained. After the predetermined amount of time has elapsed, the change control of the playing speed according to the long-pressing operations is resumed. Thus, for example change control of the playing speed can be stopped temporarily at the original playing speed of the music.

That is to say, the music playing speed can be a variable operation so as to easily change to a playing speed having a high probability of being desired by the operator (in this case, the original playing speed of the music).

10. In the case of performing change control of the playing speed of a moving picture player according to dragging operations, the dragging operations that have been performed continuously are cancelled in the event that the playing speed is changed until a predetermined playing speed is reached, and the predetermined playing speed is maintained. After the predetermined amount of time has elapsed, the change control of the playing speed according to the dragging operations is resumed. Thus, for example change control of the playing speed can be stopped temporarily at the original playing speed of the moving picture.

That is to say, the moving picture playing speed can be a variable operation so as to easily change to a playing speed having a high probability of being desired by the operator (in this case, the original playing speed of the moving picture).

11. In the case of changing the moving picture player playing speed according to the flicking operations, in the event a strong flicking operation is detected, the playing speed is changed according to the strength of the flicking operation. Conversely, in the case of detecting a weak flicking operation, the change control of the playing speed is stopped at the original playing speed of the moving picture.

Therefore, the moving picture playing speed can be a variable operation so as to easily change to a playing speed having a high probability of being desired by the operator (in this case, the original playing speed of the moving picture).

12. In the case of performing change control of the playing speed of a moving picture player according to long-pressing operations, the long-pressing operations that have been performed continuously are cancelled in the event that the playing speed is changed until a predetermined playing speed is reached, and the predetermined playing speed is maintained. After the predetermined amount of time has elapsed, the change control of the playing speed according to the long-pressing operations is resumed. Thus, for example change control of the playing speed can be stopped temporarily at the original playing speed of the moving picture.

That is to say, the moving picture playing speed can be a variable operation so as to easily change to a playing speed having a high probability of being desired by the operator (in this case, the original playing speed of the moving picture).

13. In the case of performing switching display control of the still images according to the dragging operations, the dragging operations that have been performed continuously are cancelled for a predetermined amount of time, at breaks between the still images to which time information for the year 2009 is provided and the still images to which time information for the year 2010 is provided, or breaks between folders wherein still images are stored, and the switching display control is stopped for a predetermined amount of time. After the predetermined amount of time has elapsed, the switching display control for the still images according to the dragging operations is resumed.

Thus, even in the case of performing switching display control with the switching display speed of still images is at a high speed according to the distance of the dragging operations, the switching display control can be stopped for a predetermined amount of time at a break in easily distinguishable groups such as the dates and times that the shots were taken, the storage folders, and the number of images, for example. Therefore, a desired still image can be easily searched for from a large number of still images.

14. In the case of performing switching display control of the still images according to the flicking operations, in the case that a strong flicking operation is detected, the switching display control of the still images is performed at a speed according to the strength of the flicking operations. Conversely, in the case that a weak flicking operation is detected, the switching display control is stopped at breaks between the still images to which time information for the year 2009 is provided and the still images to which time information for the year 2010 is provided, or breaks between folders wherein still images are stored, or the like.

Thus, in the case that a weak flicking operation is detected, the switching display control can be stopped for a predetermined amount of time at a break in easily distinguishable groups such as the dates and times that the shots were taken, the storage folders, and the number of images, for example. Therefore, a desired still image can be easily searched for from a large number of still images.

15. In the case of performing switching display control of the still images according to the long-pressing operations, the long-pressing operations that have been performed continuously are cancelled for a predetermined amount of time, at breaks between the still images to which time information for the year 2009 is provided and the still images to which time information for the year 2010 is provided, or breaks between folders wherein still images are stored, and the switching display control is stopped for a predetermined amount of time. After the predetermined amount of time has elapsed, the switching display control for the still images according to the long-pressing operations is resumed.

Thus, even in the case of performing switching display control with the switching display speed of still images is at a high speed according to the distance of the long-pressing operations, the switching display control can be stopped for a predetermined amount of time at a break in easily distinguishable groups such as the dates and times that the shots were taken, the storage folders, and the number of images, for example. Therefore, a desired still image can be easily searched for from a large number of still images.

16. In the case of scrolling control of the phone book data according to the dragging operations, the dragging operations that have been performed continuously are cancelled for a predetermined amount of time, at breaks between various registered users having "A" as the initial and various registered users having "B" as the initial, breaks in groups of company relations or university relations, and so forth, and the scrolling control is stopped for a predetermined amount of time. After the predetermined amount of time has elapsed, the scrolling control for the still images according to the dragging operations is resumed.

Thus, even in the case of performing scrolling control with the switching display speed of still images at a high speed according to the distance of the dragging operations, the scrolling control can be stopped for a predetermined amount of time at breaks between various registered users having "A" as the initial and various registered users having "B" as the initial, breaks in groups of company relations or university relations, and so forth, and the scrolling control can be stopped for a predetermined amount of time. Therefore, a desired registered user can be searched for from a large number of registered users who are registered in the phone book.

17. In the case of scrolling control of the phone book data according to the flicking operations, in the case that a strong flicking operation is detected, the phone book data is scrolled at a scrolling speed corresponding to the flicking operation. Conversely, in the case that a weak flicking operation is detected, scrolling control is stopped at breaks between various registered users having "A" as the initial and various registered users having "B" as the initial, breaks in groups of company relations or university relations, and so forth, for example.

Thus, by performing a weak flicking operation, the scrolling control can be stopped at breaks between various registered users having "A" as the initial and various registered users having "B" as the initial, breaks in groups of company relations or university relations, and so forth. Therefore, a desired registered user can be searched for from a large number of registered users who are registered in the phone book.

18. In the case of scrolling control of the phone book data according to the long-pressing operations, the long-pressing operations that have been performed continuously are cancelled for a predetermined amount of time, at breaks between various registered users having "A" as the initial and various registered users having "B" as the initial, breaks in groups of company relations or university relations, and so forth, and the scrolling control is stopped for a predetermined amount of time. After the predetermined amount of time has elapsed, the scrolling control for the still images according to the long-pressing operations is resumed.

Thus, even in the case of performing scrolling control with the switching display speed of still images at a high speed according to the distance of the long-pressing operations, the scrolling control can be stopped for a predetermined amount of time at breaks between various registered users having "A" as the initial and various registered users having "B" as the initial, breaks in groups of company relations or university relations, and so forth, and the scrolling control can be stopped for a predetermined amount of time. Therefore, a desired registered user can be searched for from a large number of registered users who are registered in the phone book.

The above-described embodiments are examples wherein the present disclosure is applied to a cellular phone, but besides cellular phones, the present disclosure can be applied to other electronic devices such as a PHS phone (PHS: Personal Handyphone System), PDA device (PDA: Personal Digital Assistant), digital camera, digital video camera, notebook-type or desktop-type personal computer and the like. In any of these cases, the same advantages can be obtained as with the present embodiments.

Lastly, the embodiments described above are examples of the present disclosure. Therefore, the present disclosure is not restricted to the above-described embodiments; rather, various modifications, combinations, and other embodiments may be made according to the design or other elements, within the scope of the claims of the present disclosure or a scope equivalent to the claims.

The invention claimed is:

1. An information processing apparatus comprising:
   an interface that receives a display switching instruction to switch an object displayed on a display; and
   a processor that
   controls the display to sequentially switch objects, which are each associated with a date, displayed on the display based on the display switching instruction;
   controls the display to stop switching objects for a predetermined period of time when a predetermined object associated with a predetermined date period is displayed on the display;
   controls the display to resume switching objects displayed on the display upon determining that the predetermined period of time has elapsed;
   controls the display to sequentially switch displaying objects on the display starting with an object associated with an earliest date;
   determines a number of objects displayed that are associated with a first date period and compares the number to a predetermined threshold value when it is determined that a date associated with an object to be subsequently displayed on the display is outside the first date period;
   determines the predetermined date period to be the first date period when the number of objects displayed that are associated with the first date period is greater than the predetermined threshold value; and
   controls the display to sequentially switch displaying objects on the display that are associated with a second date period that is longer than and includes the first date period when the number of objects displayed that are associated with the first date period is less than the predetermined threshold value.

2. The information processing apparatus according to claim 1, wherein the processor, while the display switching instruction is continuously received at the interface, controls the display to switch objects displayed on the display, controls the display to stop switching objects for the predetermined period of time when the predetermined object is displayed on the display, and controls the display to resume switching objects upon determining that the predetermined period of time has elapsed.

3. The information processing apparatus according to claim 2, wherein the interface includes a touch panel, and the display switching instruction is a dragging operation performed by a user detected by the touch panel.

4. The information processing apparatus according to claim 2, wherein the interface includes a touch panel, and the display switching instruction is a press operation performed by a user detected by the touch panel.

5. The information processing apparatus according to claim 2, wherein the interface includes a touch panel, and the display switching instruction is a flick operation performed by a user detected by the touch panel.

6. The information processing apparatus of claim 1, wherein the processor controls the display to sequentially switch objects displayed on the display in order of date.

7. The information processing apparatus of claim 1, wherein the processor is configured to control a process for identifying the predetermined period of time.

8. The information processing apparatus of claim 7, wherein the processor controls the display to display an object associated with an earliest date as an object initially displayed on the display.

9. The information processing apparatus of claim 8, wherein the processor controls the display to sequentially switch displaying objects on the display that are associated with a first day starting with the object associated with the earliest date.

10. The information processing apparatus of claim 9, wherein the first date period corresponds to the first day.

11. The information processing apparatus of claim 10, wherein, when the number of objects displayed that are associated with the first day is greater than the predetermined threshold value, the predetermined period of time is determined to be a day.

12. The information processing apparatus of claim 10, wherein the second date period corresponds to a first week including the first day.

13. The information processing apparatus of claim 12, wherein, when it is determined that a day associated with an object to be subsequently displayed on the display is beyond the first week, the processor determines the number of objects displayed that are associated with the first week and compares the number to the predetermined threshold value.

14. The information processing apparatus of claim 13, wherein, when the number of objects displayed that are associated with the first week is greater than the predetermined threshold value, the predetermined period of time is determined to be a week.

15. The information processing apparatus of claim 1, wherein the plurality of objects are categorized into predetermined groups.

16. The information processing apparatus of claim 15, wherein the predetermined object is a first object of each of the predetermined groups.

17. A method performed by an information processing apparatus, the method comprising:
   receiving, at an interface of the information processing apparatus, a display switching instruction to switch an object displayed on a display;
   controlling, by a processor of the information processing apparatus, the display to sequentially switch objects, which are each associated with a date, displayed on the display based on the display switching instruction;
   controlling, by the processor, the display to stop switching objects for a predetermined period of time when a predetermined object associated with a predetermined date period is displayed on the display;
   controlling, by the processor, the display to resume switching objects displayed on the display upon determining that the predetermined period of time has elapsed;
   controlling, by the processor, the display to sequentially switch displaying objects on the display starting with an object associated with an earliest date;
   determining, by the processor, a number of objects displayed that are associated with a first date period and comparing the number to a predetermined threshold value when it is determined that a date associated with an object to be subsequently displayed on the display is outside the first date period;
   determining, by the processor, the predetermined date period to be the first date period when the number of objects displayed that are associated with the first date period is greater than the predetermined threshold value; and controlling, by the processor, the display to sequentially switch displaying objects on the display that are associated with a second date period that is longer than and includes the first date period when the number of objects displayed that are associated with the first date period is less than the predetermined threshold value.

18. A non-transitory computer-readable medium including computer-program instructions, which when executed by an information processing apparatus, cause the information processing apparatus to perform a method comprising:

receiving a display switching instruction to switch an object displayed on a display; and controlling the display to sequentially switch objects, which are each associated with a date, displayed on the display based on the display switching instruction;

controlling the display to stop switching objects for a predetermined period of time when a predetermined object associated with a predetermined date period is displayed on the display;

controlling the display to resume switching objects displayed on the display upon determining that the predetermined period of time has elapsed;

controlling the display to sequentially switch displaying objects on the display starting with an object associated with an earliest date;

determining a number of objects displayed that are associated with a first date period and comparing the number to a predetermined threshold value when it is determined that a date associated with an object to be subsequently displayed on the display is outside the first date period;

determining the predetermined date period to be the first date period when the number of objects displayed that are associated with the first date period is greater than the predetermined threshold value; and controlling the display to sequentially switch displaying objects on the display that are associated with a second date period that is longer than and includes the first date period when the number of objects displayed that are associated with the first date period is less than the predetermined threshold value.

* * * * *